US009406405B2

(12) United States Patent
Rogers

(10) Patent No.: US 9,406,405 B2
(45) Date of Patent: Aug. 2, 2016

(54) FUSION ENERGY DEVICE WITH INTERNAL ION SOURCE

(71) Applicant: Joel Guild Rogers, Vancouver (CA)

(72) Inventor: Joel Guild Rogers, Vancouver (CA)

( * ) Notice: Subject to any disclaimer, the term of this patent is extended or adjusted under 35 U.S.C. 154(b) by 0 days.

(21) Appl. No.: 14/545,719

(22) Filed: Sep. 28, 2014

(65) Prior Publication Data

US 2016/0093406 A1    Mar. 31, 2016

(51) Int. Cl.
*G21B 1/05* (2006.01)
*G21B 1/17* (2006.01)
*G21B 1/15* (2006.01)

(52) U.S. Cl.
CPC .. *G21B 1/05* (2013.01); *G21B 1/15* (2013.01); *G21B 1/17* (2013.01)

(58) Field of Classification Search
USPC .......................................................... 376/100
See application file for complete search history.

(56) References Cited

U.S. PATENT DOCUMENTS

| 4,826,646 | A  |   | 5/1989  | Bussard |         |
|-----------|----|---|---------|---------|---------|
| 7,482,607 | B2 |   | 1/2009  | Lerner  |         |
| 8,059,779 | B2 |   | 11/2011 | Greatbatch |      |
| 8,537,958 | B2 |   | 9/2013  | Laberge |         |
| 8,891,719 | B2 |   | 11/2014 | Howard et al. |   |
| 2008/0187086 | A1 |   | 8/2008 | Bussard |         |
| 2010/0284501 | A1 | * | 11/2010 | Rogers | G21B 1/17 376/107 |
| 2010/0284502 | A1 | * | 11/2010 | Piefer | H05H 6/00 376/190 |
| 2014/0023170 | A1 |   | 1/2014  | Slough  |         |
| 2014/0203706 | A1 |   | 7/2014  | Rostoker |        |
| 2014/0219407 | A1 |   | 8/2014  | Wong    |         |
| 2014/0247913 | A1 |   | 9/2014  | Laberge |         |
| 2014/0301518 | A1 |   | 10/2014 | Mcguire |         |

OTHER PUBLICATIONS

Robert L. Hirsch, "Where to Look for Practical Fusion Power", 14th U.S.-Japan IECF Workshop speech, Oct. 16, 2012, reprinted Oct. 19, 2012 in New York Times, downloaded Dec. 11, 2014 from http://dotearth.blogs.nytimes.com/2012/10/19/a-veteran-of-fusion-science-proposes-narrowing-the-field/, 6 pages.

Mscheffer, "Lockheed Martin announces compact Fusion Reactor plans", Apr. 17, 2013, downloaded Dec. 9, 2014 from http://www.fusenet.eu/node/400, 2 pages.

Charles Chase, "Google Solve for X Forum Feb. 7, 2013", transcribed Feb. 11, 2013 from https://www.solveforx.com/moonshots/charles-chase-on-energy-for-everyone, 3 pages.

(Continued)

*Primary Examiner* — Sean P Burke

(57) ABSTRACT

An improved fusion reactor design with provision for supplying plasma fuel inside a model reactor without consuming additional power in the process. Embodiments provide free choice of useful fuels from the full range of fusible isotopes. Other embodiments provide means of selectively extracting up-scattered electrons from the plasma, followed by replacing them with electrons of corrected energy. Computer simulations show fusion reactors constructed with these inventive improvements will demonstrate increased net-power compared to other fusion reactors of similar size. The Specification of the invention leads immediately to staged reactor development, starting from small-scale model-reactors, moving on to larger and larger scale models, culminating with commercial power plants.

2 Claims, 24 Drawing Sheets

(56) References Cited

OTHER PUBLICATIONS

Guy Norris, "Skunk Works Reveals Compact Fusion Reactor Details", Aviation Week and Space Technology Magazine, Oct. 15, 2014, downloaded Dec. 9, 2014 from http://aviationweek.com/technology/skunk-works-reveals-compact-fusion-reactor-details, 4 pages.

Robert W. Bussard, "Shoulg Google Go Nuclear?", Google Tech Talk Lecture Nov. 9, 2006, p. 1 and p. 8, downloaded Dec. 10, 2014 from http://askmar.com/Fusion.html via link to http://www.askmar.com/ConferenceNotes/Should Google Go Nuclear.pdf, 3 pages.

Robert W. Bussard, "Polywell Program Results and Final Conclusions", EMC2 Internal Report Dec. 2, 2006 downloaded Dec. 10, 2014 from http://askmar.com/Fusion.html and via link to http://www.askmar.com/Fusion_files/2006-12-02 Final Results and Conclusions.pdf, 4 pages.

Mark Duncan, "Polywell 'Current' Status", downloaded Dec. 10, 2104 from http://askmar.com/Fusion.html, 1 page.

Jaeyoung Park et al., "High Energy Electron Confinement in a Magnetic Cusp Configuration", pre-print submitted Jun. 1, 2014 for publication in Physics of Plasmas journal, downloaded Dec. 10, 2014 from http://askmar.com/Fusion.html and via link to http://arxiv.org/pdf/1406.0133v1.pdf, 13 pages.

Robert W. Bussard, "Electron Leakage through Magnetic Cusps in the Polywell Confinement Geometry", 1991 EMC2 internal report EMC2-0191-02 (reformatted) downloaded Dec. 10, 2014 from http://askmar.com/Fusion.html, 7 pages.

J.G. Rogers et al., "The DRAGON facility for nuclear astrophysics at TRIUMF-ISAC: design, construction, and operation", Nucl. Instr. and Meth. A, vol. 498, (2003) 190-210, 21 pages.

Wikipedia, "Composite Simpson's rule 'p. 3 of 6'", downloaded Dec. 11, 2014 from http://en.wikipedia.org/wiki/Simpson's rule, 1 page.

EECS, "OOPIC: 2d Plasma Simulation", Electrical Engineering and Computer Sciences, College of Engineering, UC Berkeley, California, downloaded Dec. 14, 2012 from http://www.eecs.berkeley.edu/XRG/Software/Description/oopic.html, 1 page.

Tech-X, "OOPIC Pro User's Guide Verion 2.0.0", (2008) 1-66 111-114, Tech-X Corporation, Boulder, CO, 70 pages.

Joel G. Rogers, New Design Features for Polywell, presented at IEC2013 15th Workshop on Inertial Electrostatic Confinement Fusion, Oct. 7, 2013, Uji, Kyoto, Japan, downloaded Dec. 12, 2014 from http:www.iae.kyoto-u.ac.jp/beam/iec2013/program.html and http://www.iae.kyoto-u.ac.jp/beam/iec2013/presentation/4-2.pdf, 21 pages.

Wikipedia, "High beta fusion reactor" modified Dec. 8, 2014, downloaded Dec. 9, 2014 from http://en/wikipedia.org/wiki/High_beta_fusion_reactor, 3 pages.

Robert L. Hirsch, "Tokamak Fusion and IEC", speech at 16th US/Japan Workshop on Fusion Neutron Sources for Nuclear Assay and Alternate Applications, Madison, WI, (Oct. 1, 2014) p. 1 11-18 31, downloaded from http://iec.neep.wisc.edu/usjapan/16th_US-Japan/presentationlist.htm and http://iec.neep.wisc.edu/usjapan/16th_US-Japan/Hirsch_Banquet/Hirsch_Wisc.%202014%20U.S.-Japan%20Conf.%20Talk.pdf, 11 pages.

Jaeyoung Park, "Polywell—A Path to Electrostatic Fusion", presented at US-Japan Workshop on Fusion Neutron Sources for Nuclear Assay and Alternate Applications, Madison, WI, (Oct. 1, 2014) pp. 1-41, downloaded from http://iec.neep.wisc.edu/usjapan/16th_US-Japan/presentationlist.htm and http://iec.neep.wisc.edu/usjapan/16th_US-Japan/Wed_AM/2014%20US%20Japan%20Workshop%20EMC2%20IEC%20Polywell.pdf, 42 pages.

Joel G. Rogers "Comment on 'High Energy Electron Confinement in a Magnetic Cusp Configuration'", email with attachments from J.Roggers to J.Park, Oct. 17, 2014, 11 pages.

Matthew Carr, "Low beta confinement in a Polywell modelled with conventional point cusp theories", Physics of Plasmas, vol. 18, issue 11 (2011) 112501, published on-line, 14 pages.

\* cited by examiner

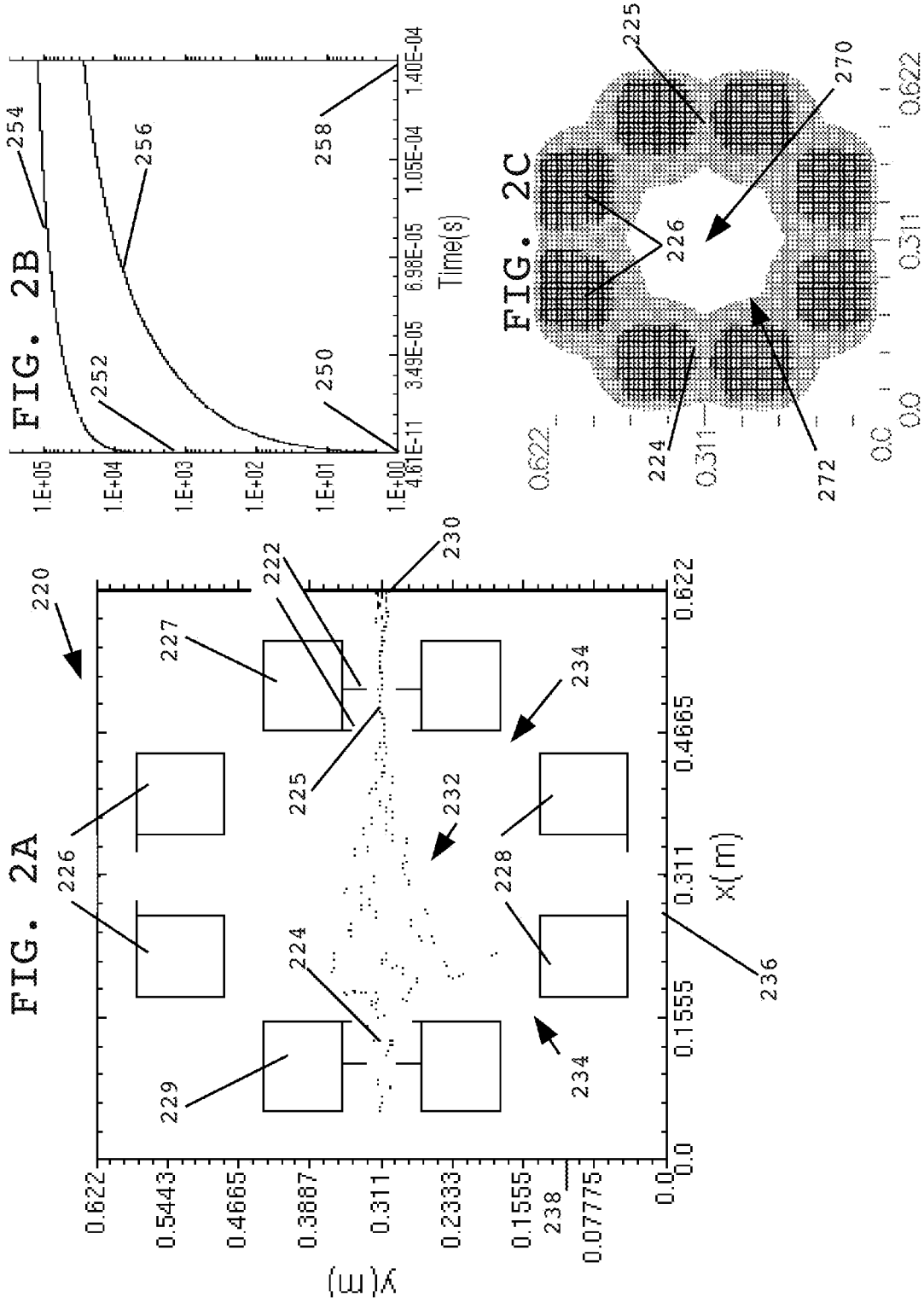

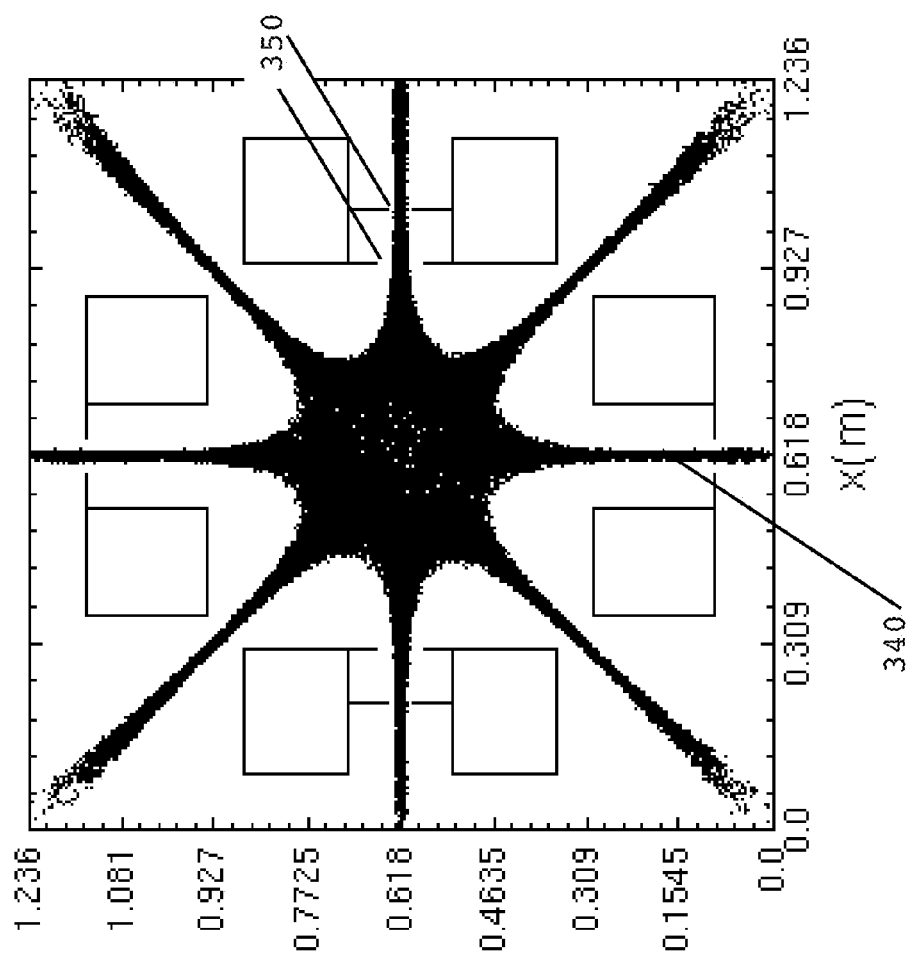
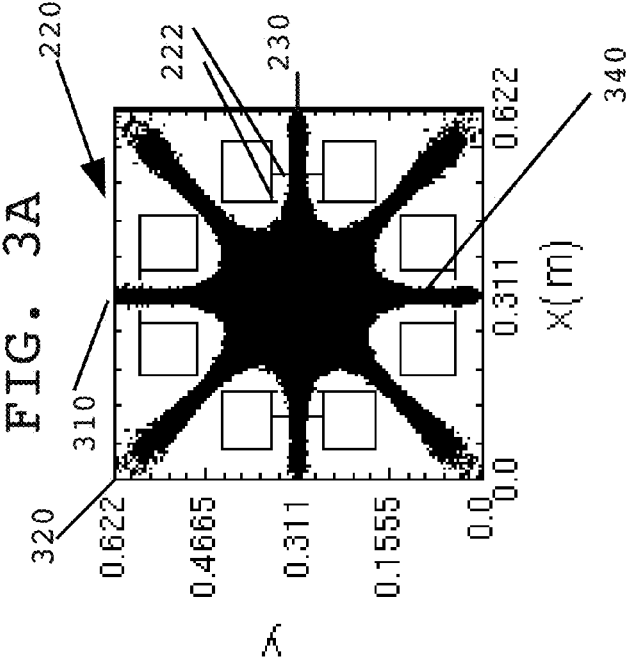

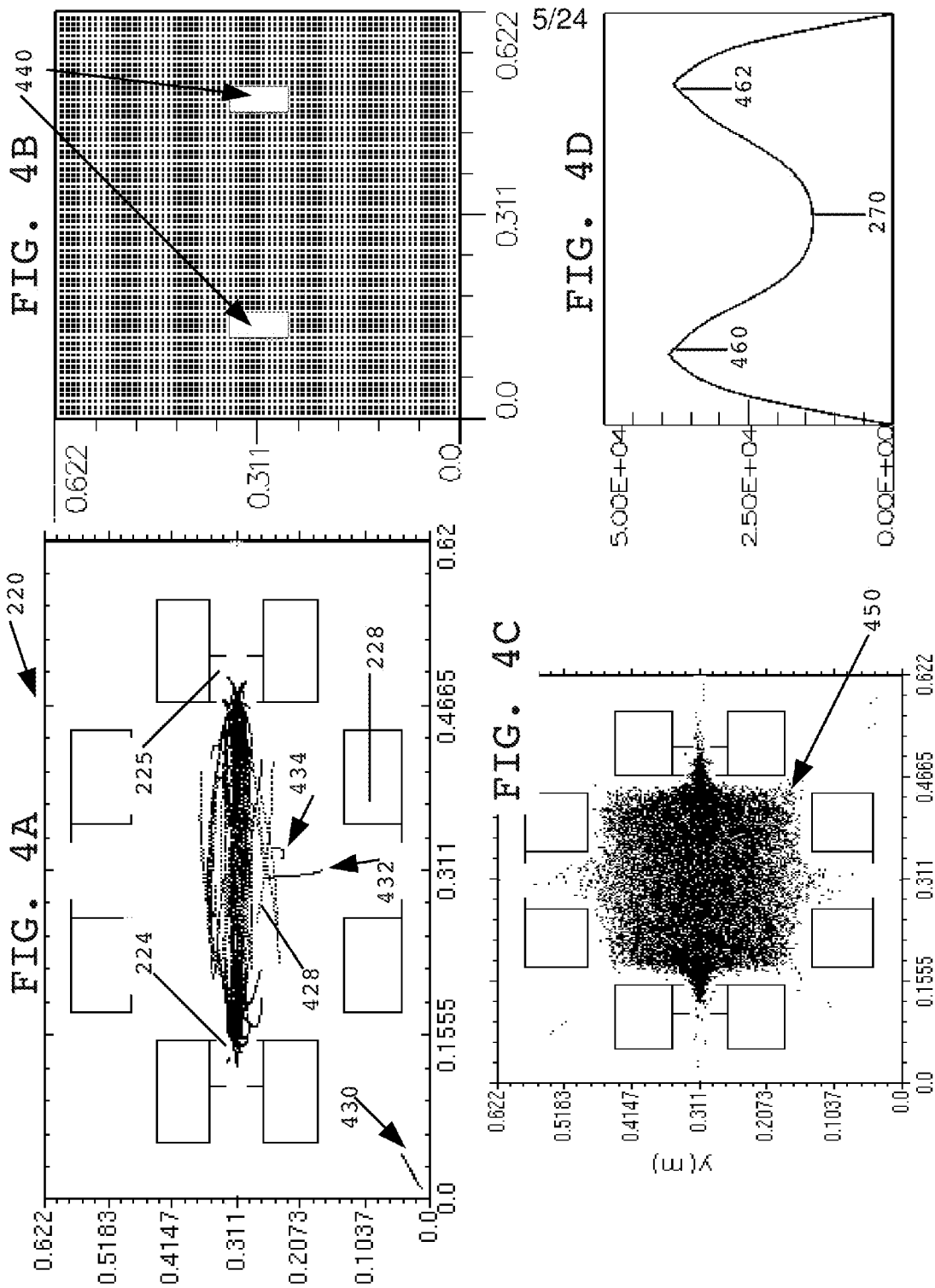

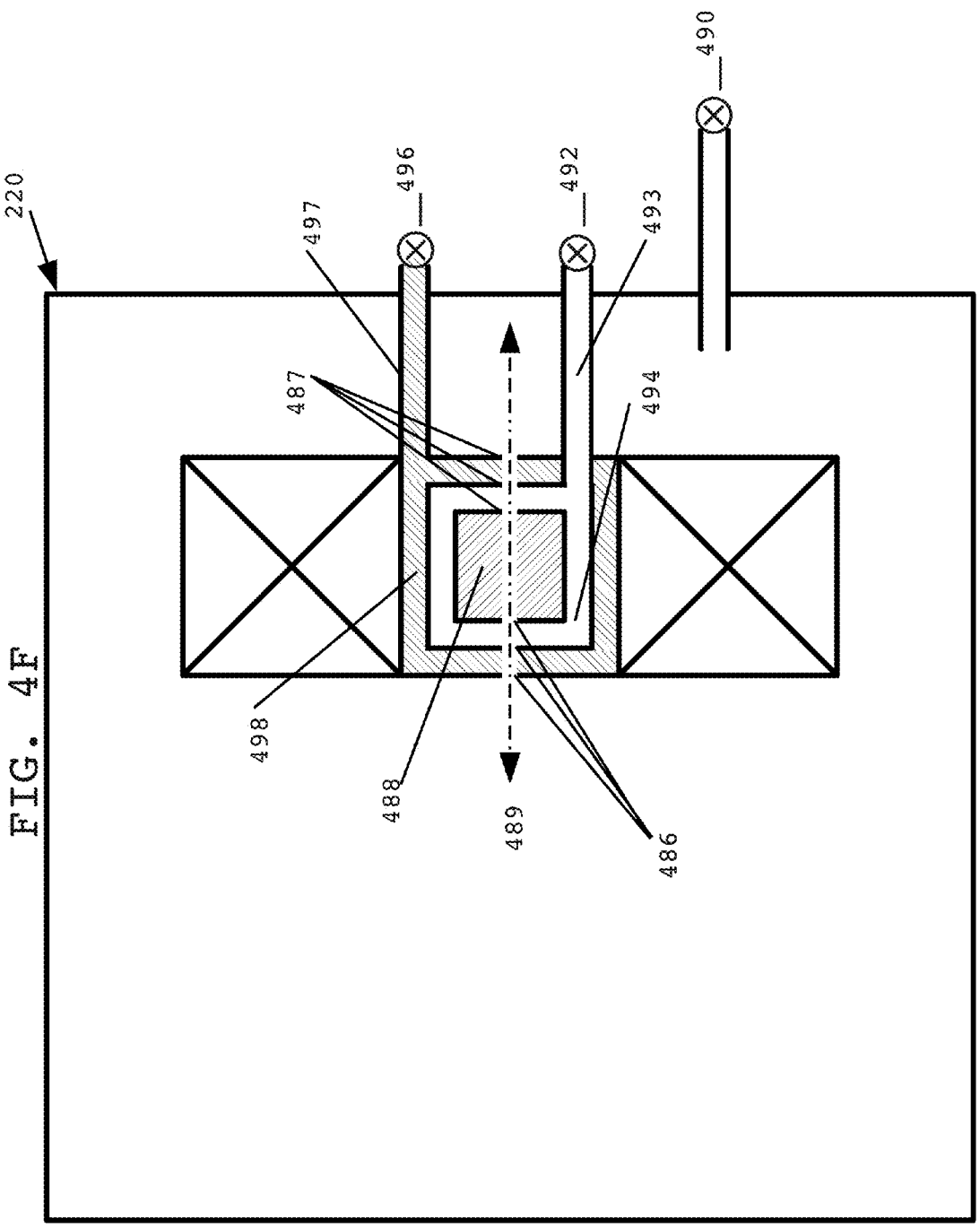

FIG. 5A

Second.inp// Description block 11-Jun-2014
{Simulation Source Code created for 2014 patent application by Joel G. Rogers}
Variables
{
radiusScale = 0.75          // Magnets' size scaling for predicting breakeven
currentScale = 1.0          // Downscale magnet current from max in spec
// Coil magnets' description block. Terminology is borrowed from GMW catalog.
magID = magOD -(magOD-radiusScale*0.115)*sqrt(currentScale)    // Inside
magOD = radiusScale*0.345       // Outside diameter of GMW serial #11801864
magHeight = radiusScale*0.133*sqrt(currentScale)    // Height
magCornerGap = .04       // Gap at 4 almost touching points
magScaleF = currentScale*radiusScale^2    // ^B field scales with X-section area of coil
magCurrent = magScaleF*70*466    // Amp-turns circulating according to GMW spec
//
// Simulation's parameters block, including macroparticle counts, geometry, etc.
ElectrostaticFlag = 5   //=0 for electromagnetic, 5 for electrostatic mode
np2c = 6e8          // Number of particles per macroparticle from e-Emitter.
np2clons = np2c     // Ions equal electrons assuming quasineutral core
magTankSpaceY = magHeight/2     // Horizontal clearance magnet to tank
magTankSpaceY = magTankSpaceX+magHeight+magCornerGap   // Vertical clearance
tankIDX = magOD+2*(magCornerGap+magHeight+magTankSpaceX)  // Room for T/B coils
tankIDY = magOD+2*magTankSpaceY // Tank vertical I.D.
diameterInCellsY = radiusScale*96       // y-diameter in cells, must be even
cellSize = tankIDY/diameterInCellsY     // Compute PIC cell size from magOD
//Code continues in FIG. 5B.

FIG. 5B

```
x1origin = tankIDX/2-(tankIDX/2)%cellSize    // Integerize central x-cell
x2origin = tankIDY/2-(tankIDY/2)%cellSize    // ditto central y-cell
tankIDX = 2*x1origin   // Horizontal diameter as an even integer of cells
tankIDY = 2*x2origin   // ditto vertical diameter
diameterInCellsX = tankIDX/cellSize    // Nearest even integer to tankIDX
yRound = 0.5*cellSize        // Shifts magnets Yi up to align w/ cell apertures
xRound = 0 //.5*cellSize     // ditto needed for magOuterAperture below
//
// Electron beam electrical parameters definition block
530 ──  elecEnergy = 50000              //Bias volts on magnets = max e-energy
531 ──▶ Uemax = 3e8*sqrt(((elecEnergy/511e3)+1)^2-1) // Max electron velocity(m/s)
532 ──  timeStep = cellSize/(Uemax*sqrt(2))    // Courant condition from Birdsall&L
533 ──  elecIgnitionCurrent = 2.0   // Amps from electron emitter must be > 0
        elecInjectionEnergy = 0     // emitted-energy c.f. W work function = 4.5
//
// Electron emitter/extractor geometrical parameters definition block
        emitCathodeDia2 = cellSize// e-emitter half-diameter
534 ──▶ emitGunInset = cellSize        // emitter distance from R tank wall
        emitTemp = 1200*(0.025/300)    // @1200degK E=.025eV per roomtemp(300degK)
536 ──  extractorDiameter2 = magID/2   // electron extractor half-diameter
537 ──  extractorInset = cellSize      // extractor distance from B wall
//
//Code continues in FIG. 5C.
```

FIG. 5C

```
// Gas cell geometrical descriptor block
cellHeight = magHeight/2-cellSize              // thickness of gas along bore of magnet
cellOutset = 0  //cellHeight/2 // distance mag inner face to center of cell
cellOuterAperture = 4*cellSize        // outer apertures
magOuterAperture = cellOuterAperture+2*cellSize  // aperture outer mag flange
magOuterApertureOutset = cellOuterAperture = magHeight  // outer aperture outset from mag face
cellInnerAperture = cellOuterAperture+4*cellSize  // inner apertures
cellX = tankIDX/2-magTankSpaceX-magHeight+cellOutset-cellSize  // shorthand
cellTRtrim = 1*cellSize        // top-right trim on analyticF in MCC
//
```
← 540

```
// MCC gas properties description block. 1 or 2 gas cells in opposing bores
collisionFlag = 1// Choose collisionFlag = 0,1 to dis-, en-able MCC code
gasCellCountR = 1       // 1 for RHS gas cell, 0 for none R
gasCellCountL = 1       // 1 for LHS gas cell, 0 for none L
gasPressure = 1e-4      //Torr. Double it for diatomic gas(H2, D2, etc.)
gasDensity = (gasPressure/760)*(6.02e23/.0224) // atoms/m^3 ideal gas
gasBkgdDensity = gasDensity*0.001 // Choked aperture reduction factor
gasBkgdDiameterX = tankIDX-2*cellSize  // bkgd width < tank dia.
gasBkgdDiameterY = tankIDY-2*cellSize    // ... and must leave room for gas cells
ecxFactor = 1.0 // adj. ionization rate by adj. e+ion cross sec
//                                                              553
// User Diagnostic plot definitions block
DiagTimeInterval = 2.5e-6  // seconds to average time histories
//
//Code continues in FIG. 5D.
```
← 550
  552
  554
  555
  556

Code continues in FIG. 5D.

FIG. 5D

```
// Tabulate wire positions in 8 boxes starting bottom-left then CCW
Mu = 4*PI*1e-7           // Permeability of free space in SI units
wS = Mu*magCurrent/2/PI  // B-field per distance from wire, Formulary p.20
560 ──── X1 = x1origin-magOD/2-(magOD-magID)/4+xRound
561 ──── X1 = X1 - (X1%cellSize)
         Y1 = x2origin-magOD/2-magCornerGap-magHeight/2+yRound
         Y1 = Y1 - (Y1%cellSize)
         X2 = x1origin+magID/2+(magOD-magID)/4+xRound
         Y2 = Y1
         X3 = x1origin+magOD/2+magCornerGap+magHeight/2+xRound
         X3 = X3 - (X3%cellSize)
         Y3 = x2origin-(magOD+magID)/4+yRound       563
         Y3 = Y3 - (Y3%cellSize)
         X4 = X3
         Y4 = x2origin+(magOD+magID)/4+yRound
         Y4 = Y4 - (Y4%cellSize)
         X5 = X2
         Y5 = x2origin+magOD/2-magCornerGap+magHeight/2+yRound
         X6 = X1
         Y6 = Y5
         X7 = x1origin-magOD/2-magCornerGap-magHeight/2+xRound
         X7 = X7 - (X7%cellSize)
         Y7 = Y4
         X8 = X7
         Y8 = Y3
564 ──── }         // end Variables block
         //Code continues in FIG. 5E.
```

FIG. 5E

```
Region     // One and only region, encompassing the rest of the .inp file
{
Grid
J = diameterInCellsX   // Required cell x-diameter
x1s = 0                // Required origin in meters
x1f = tankIDX          // Required upper limit
K = diameterInCellsY   // Required cell y-diameter
x2s = 0
x2f = tankIDY
Geometry = 1           // Required specifier; selects Cartesian geometry
n1 = 1.
n2 = 1.                // Uniform grid of cells size in both directions
}   // end Grid block
Control
dt = timeStep          // Only "timeStep" or literal works here
ElectrostaticFlag = ElectrostaticFlag   // Copy from Variables block above
// B-fields from 8 wires along z-axis ala Jackson's "Classical Electrodynamics"
B01analytic = wS*(-(x2-Y1)/((x1-X1)^2+(x2-Y1)^2)+ (x2-Y2)/((x1-X2)^2+(x2-Y2)^2)- (x2-Y3)/((x1-X3)^2+(x2-Y3)^2)+ (x2-Y4)/((x1-X4)^2+(x2-Y4)^2)- (x2-Y5)/((x1-X5)^2+(x2-Y5)^2)+ (x2-Y6)/((x1-X6)^2+(x2-Y6)^2)- (x2-Y7)/((x1-X7)^2+(x2-Y7)^2)+ (x2-Y8)/((x1-X8)^2+(x2-Y8)^2))
B02analytic = wS*((x1-X1)/((x1-X1)^2+(x2-Y1)^2)- (x1-X2)/((x1-X2)^2+(x2-Y2)^2)+ (x1-X3)/((x1-X3)^2+(x2-Y3)^2)- (x1-X4)/((x1-X4)^2+(x2-Y4)^2)+ (x1-X5)/((x1-X5)^2+(x2-Y5)^2)- (x1-X6)/((x1-X6)^2+(x2-Y6)^2)+ (x1-X7)/((x1-X7)^2+(x2-Y7)^2)- (x1-X8)/((x1-X8)^2+(x2-Y8)^2))
}   // end Control block
//Code continues in FIG. 5F.
```

FIG. 5F

```
Species
    name = electrons
    m = 9.11E-31        // electron mass
    q = -1.60e-19
    collisionModel = 1
}
MCC // gas in one or two gas cells + bkgd gas everywhere else
{
    collisionFlag = collisionFlag // 1 to enable, 0 to disable MCC
    x1MinMKS = x1origin-gasBkgdDiameterX/2 // create a visible border
    x1MaxMKS = x1origin+gasBkgdDiameterX/2
    x2MinMKS = x2origin-gasBkgdDiameterY/2
    x2MaxMKS = x2origin+gasBkgdDiameterY/2
    gas = H
    analyticF = gasBkgdDensity+gasDensity*( (gasCellCountR)*(step(x1-(x1origin+cellX)) - step(x1-(x1origin+cellX+cellHeight-cellTRtrim))) + (gasCellCountL)*(step(x1-(x1origin-cellX-cellHeight)) - step(x1-(x1origin-cellX-cellTRtrim))) ) * ( step(x2-(x2origin-magID/2)) - step(x2-(x2origin+magID/2-cellTRtrim)) )
    eSpecies = electrons // reuse existing Specie to save colors
    ecxFactor = ecxFactor
    iSpecies = ions
    x1MinMKS = cellSize
    x1MaxMKS = tankIDX-4*cellSize //round down +ve
    x2MinMKS = cellSize
    x2MaxMKS = tankIDY-4*cellSize //ditto
}        //end MCC
```

580 → Species
582 → MCC
584 → gas = H
585 → analyticF
586 → eSpecies = electrons
588 → //end MCC

FIG. 5G

```
}            // end of Conductor for tank wall
}
//
// Define extractor which also accumulates f(x,E) spectra
Dielectric
    name = e-Extractor
    QuseFlag = 0    // drain off charge of impacting particles
    IdiagFlag = 1    // Accumulates spill on the one segment
    Ihist_avg = DiagTimeInterval/timeStep    // time binning unit length
    Ihist_len = 10000                        // max number of time bins
    nxbins = 2*extractorDiameter2/cellSize    // # bins spanning extractor
    nenergybins = 100
    energy_max = elecEnergy    // eV range of 2d diagnostic
    A1 = x1origin-extractorDiameter2 // OR extractor relative to bottom wall
    A2 = x2origin-tankIDX/2+extractorInset // central cell minus side cells
    B1 = x1origin+extractorDiameter2 // vertical extractor
    B2 = x2origin-tankIDX/2+extractorInset // central cell plus side cell
} // end Dielectric
//
// Define 8 magnet boxes, each w/ 4 walls, pumping aperture(s)
Equipotential
    name = magBox
    C = elecEnergy
    QuseFlag = 0         // drain off charge of impacting particles
    IdiagFlag = 1        // Accumulate f(x) spill on first surface
```

590 →

592 —

598 —

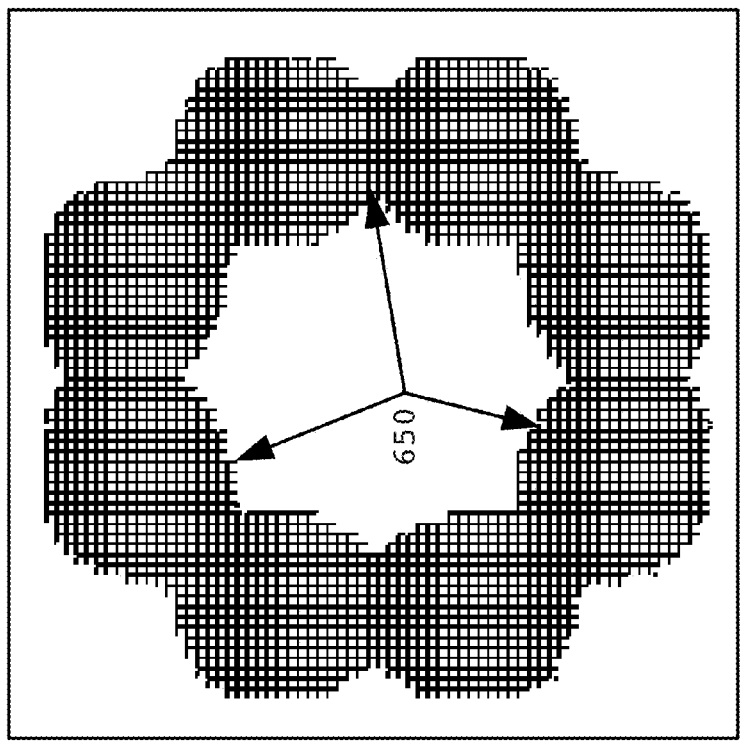
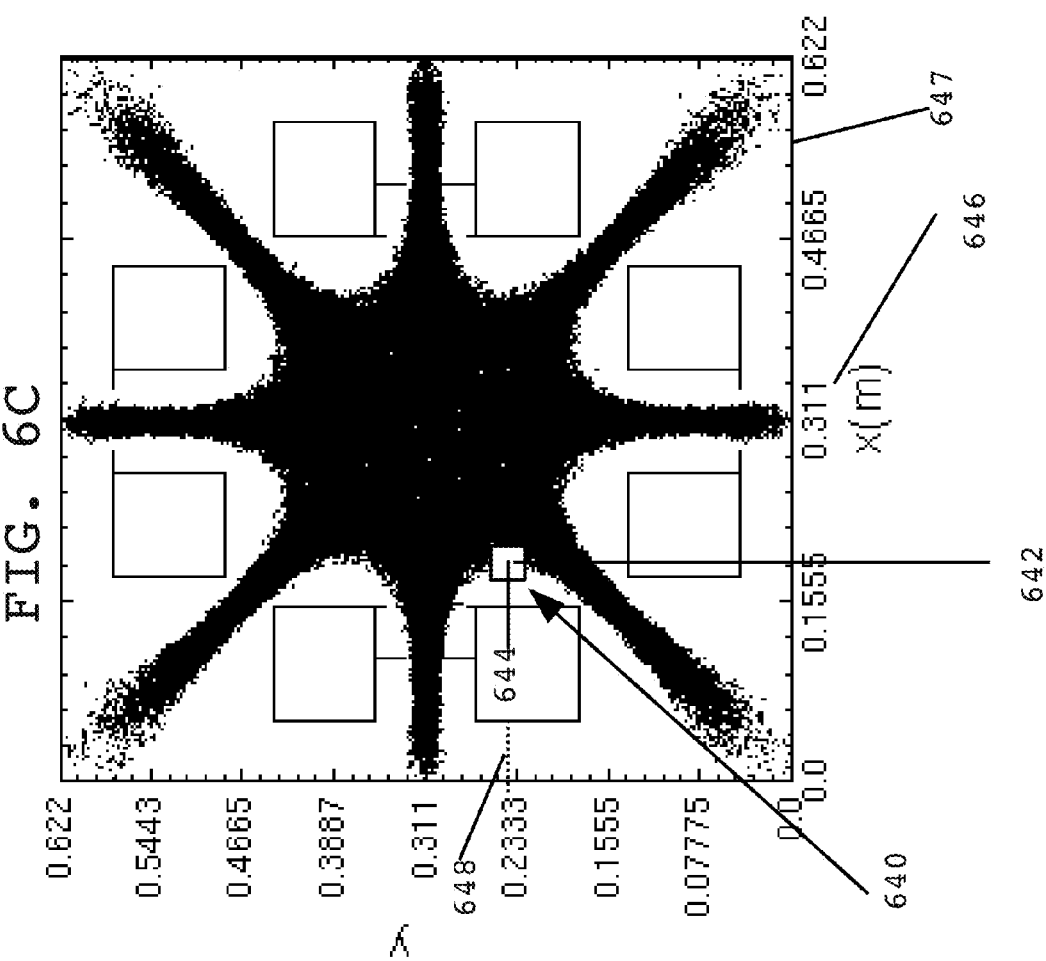
FIG. 6C
FIG. 6D

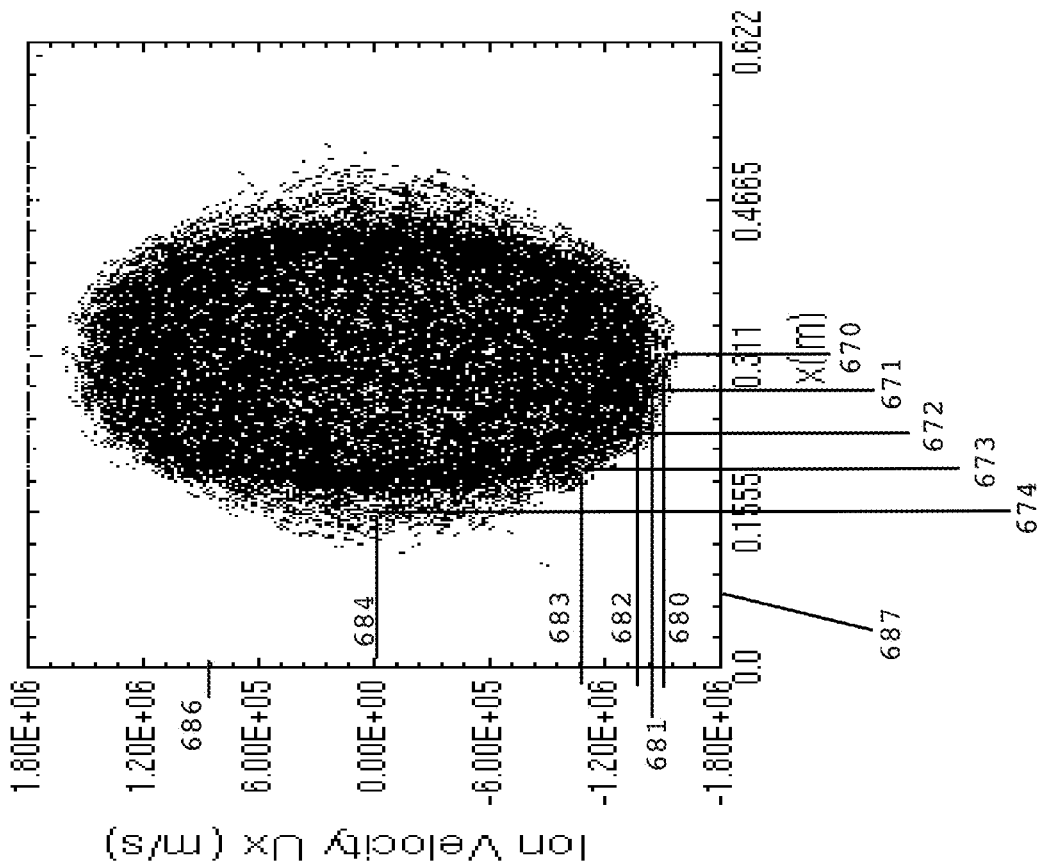
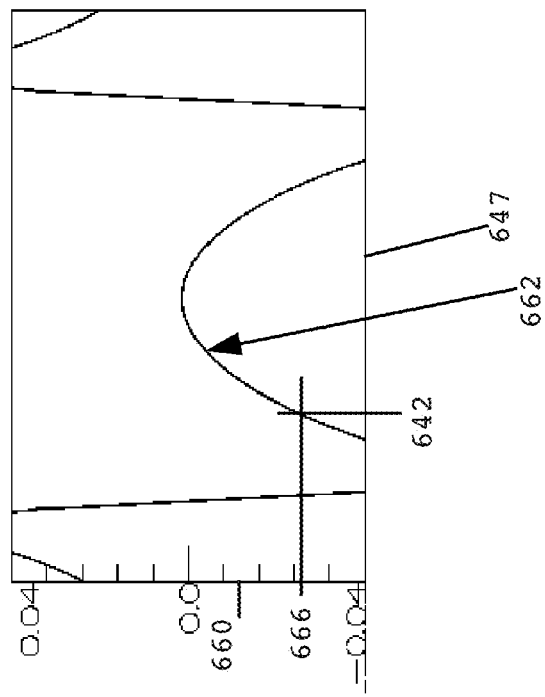

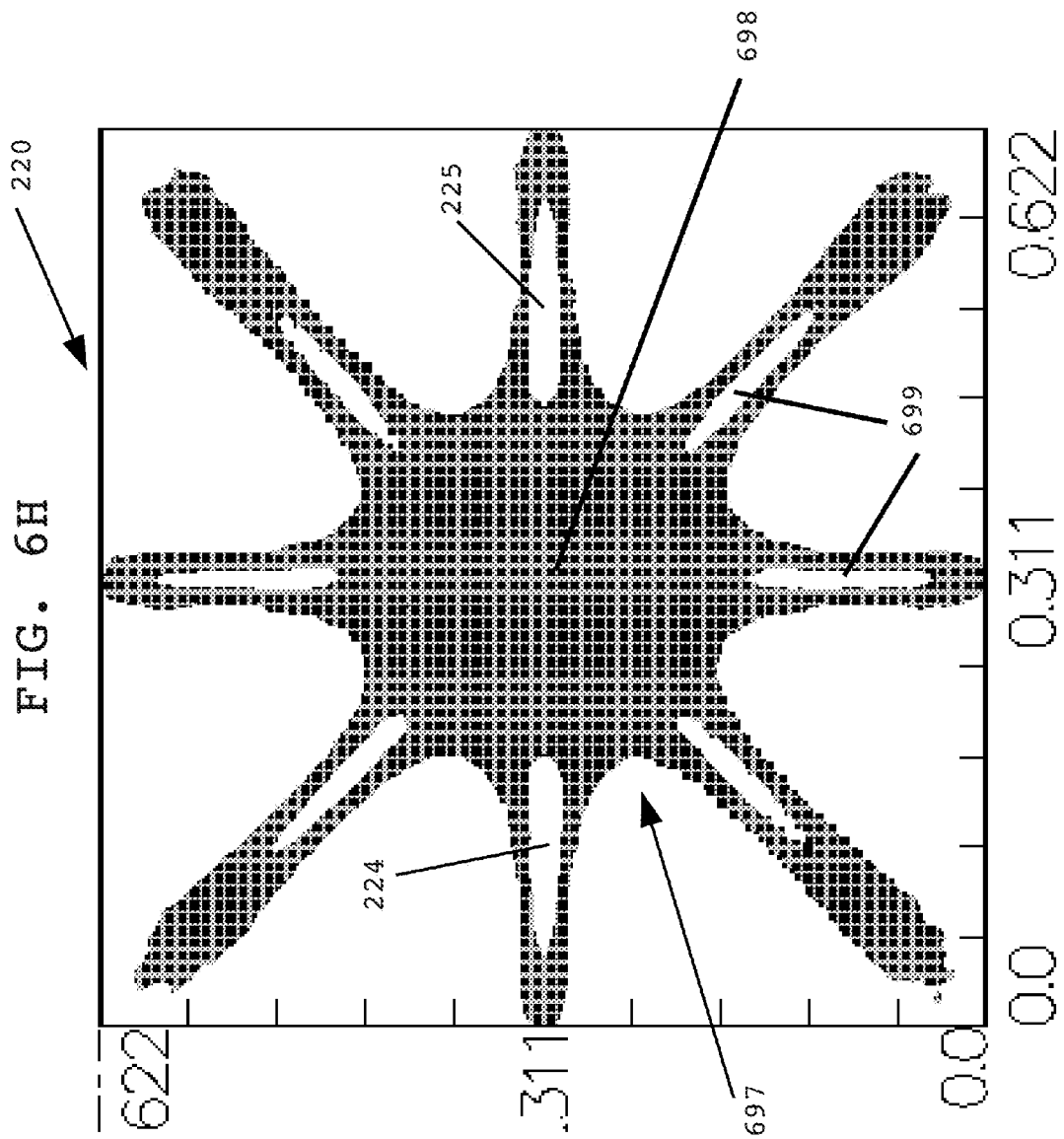

FIG. 7

| N | $x_N$ (m) | U (m/s) | $MU^2$ (keV) | $\sigma$ ($m^2$) | $4\pi x^2 U\sigma x_1$ ($m^6$/s) | Shell's Weight | Partial $\Sigma$ ($m^6$/s) |
|---|---|---|---|---|---|---|---|
| 0 | 0 | -1.50e6 | 44 | 2.5e-30 | 0 | 1/3 | 0 |
| 1 | 0.039 | -1.44e6 | 41 | 2.2e-30 | 2.4e-27 | 4/3 | 3.2e-27 |
| 2 | 0.078 | -1.35e6 | 36 | 1.8e-30 | 7.3e-27 | 2/3 | 4.9e-27 |
| 3 | 0.117 | -1.08e6 | 24 | 1.0e-30 | 7.3e-27 | 4/3 | 9.7e-27 |
| 4 | 0.1555 | 0 | 0 | 0 | 0 | 1/3 | 0 |
| $\Sigma_{0-4}$ | | | | | | | 1.78e-26 |

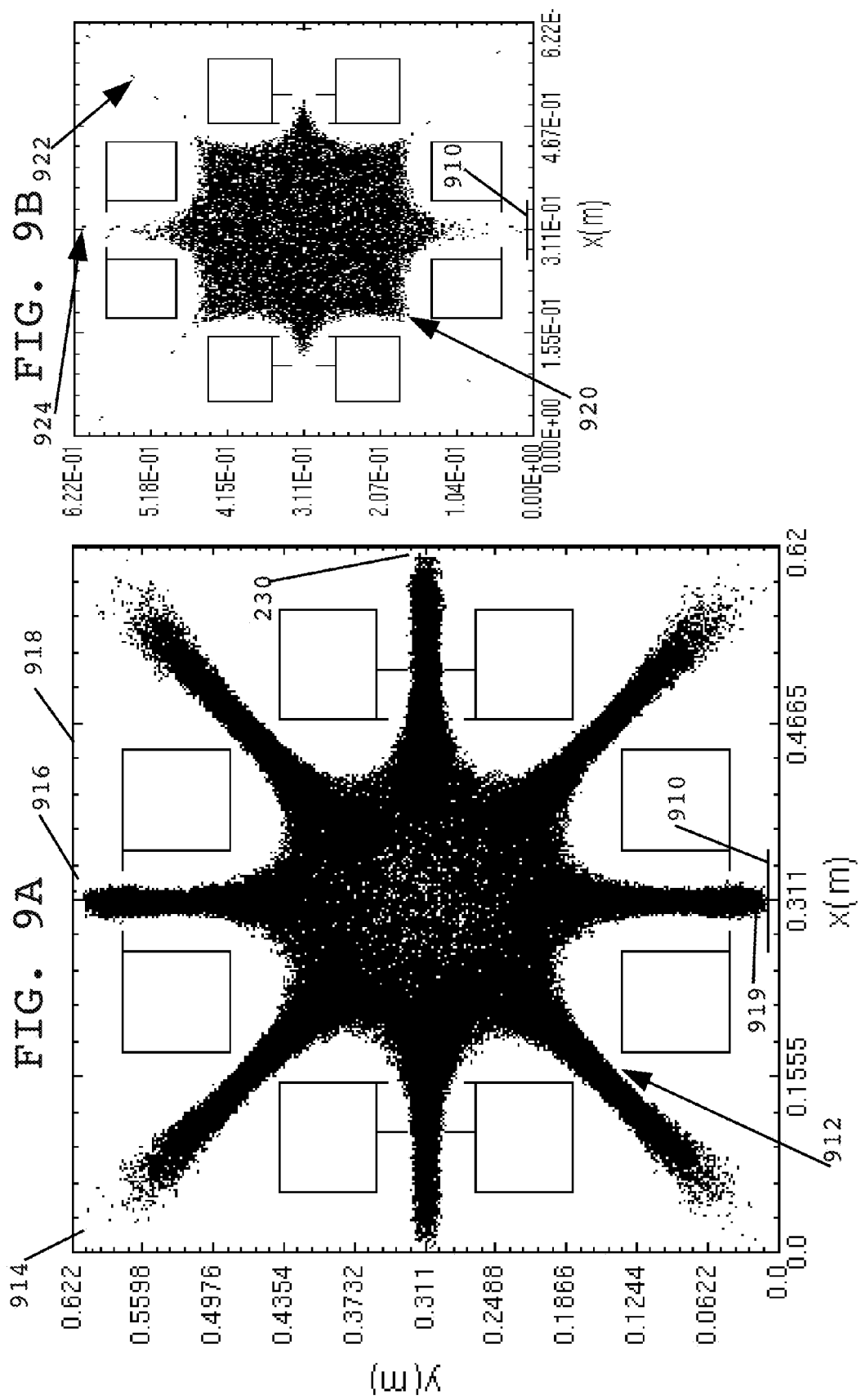

FUSION ENERGY DEVICE WITH INTERNAL ION SOURCE

BACKGROUND

1. Field of Invention

The invention relates to the design of plasma based fusion energy devices, specifically to the incorporation of apparatus for providing ionized fuel inside such devices and for improving the power balance of such devices.

2. Prior Art

The Need for Fusion Fueled Power Plants

The energy needs of the world are growing exponentially. Energy consumption is projected to double by the year 2050 and to meet these growing needs a thousand new coal-burning power plants are planned and/or under construction. These power plants will cost approximately 4 trillion dollars to build. Even worse than this expense, burning coal increases air pollution and carbon emissions. These side effects cause global warming and degrade the health of people around the world.

Nuclear power plants offer an attractive alternative to coal powered power plants. Nuclear fission reactors operate like a slow atomic ("A") bomb, giving off energy from splitting heavy plutonium or uranium atoms into smaller atoms. France generates most of its electricity from fission reactors and has achieved a good safety record. Reactors in some other countries have not had such good safety records. Three-mile Island, Chernobyl, and Fukushima are examples of reactors which have accidentally melted down and devastated the local environment. These disastrous meltdowns have created widespread mistrust of fission reactors as a practical alternative to coal burning plants.

Nuclear fusion reactors do not melt down and do not pollute. They are designed to operate like a slow and safe hydrogen ("H") bomb, fusing light isotopes of hydrogen, helium, and/or boron. Fusion devices are classified by the methods used to confine and heat a plasma of fuel ions mixed with electrons. Since the early 1950's, much research has been directed toward developing different fusion concepts. At this time the concept known as "tokamak" has become the favorite of the international fusion community. ITER, the latest multinational tokamak experiment, is currently under construction in the south of France. ITER will cost tens of billions of dollars to build and operate. Unfortunately, the first power plant based on ITER will not be ready until the mid-2040's at best. And worse, the complicated design of ITER makes it doubtful that it will ever be used for commercial power generation.

At a recent international fusion conference, senior D.C. Energy Adviser Robert Hirsch criticized ITER, "First, we have to recognize that practical fusion power must measure up to or be superior to the competition in the electric power industry. Second, it is virtually certain that tokamak fusion as represented by ITER will not be practical."

ITER and other tokamak designs have serious disadvantages when compared to Inertial Electrostatic Confinement (IEC) fusion. The tokamak has a toroidal shape, leading to magneto-hydrodynamic (MHD) instabilities. Instabilities cause excessive plasma losses through the outside edge of the torus. In ongoing attempts to patch the loss points, the design of the tokamak has evolved to incorporate an expensive, super-conducting magnet design. In contrast, IEC devices confine the plasma into a quasi-spherical shape, which is MHD stable. Stability allows IEC devices to have a simpler design than ITER. By overcoming ITER's drawbacks, as pointed out by Hirsch (above), these simpler IEC designs will be more acceptable to the power industry.

One example of an IEC design intended for power production was disclosed in a 2004 U.S. Pat. No. 8,059,779 to Greatbatch. The Greatbatch patent claims, "An electrostatic fusion device, comprising: a vacuum chamber; a potential well disposed in said vacuum chamber; a partial vacuum environment in said vacuum chamber containing fusion reaction ions; . . . ." (Here ends the quotation from Greatbatch.) Unfortunately, Greatbatch's patent lacks any description of how the "fusion reaction ions" came to be inside the potential well in the first place. Getting the ions into the potential well is a big problem not dealt with in the Greatbatch patent. Without an adequate fuel supply the proposed 2004-Greatbatch device cannot produce useful energy.

The Polywell Reactor Concept

The most promising example of an IEC fusion device was disclosed in pending U.S. Pat. 2010/0284501A1 by Rogers, entirely incorporated herein by reference. The 2010-Rogers application teaches an improvement on the well-known Polywell IEC reactor design. Polywell was originally patented by Robert Bussard in 1989 U.S. Pat. No. 4,826,646. Polywell has been the subject of extensive research by Energy Matter Conversion Corporation (EMC2) of Santa Fe, N. Mex. Bussard served as the CEO of this Company until his death in 2007. The Company's research was continuously funded by the U.S. Navy from 1991 to 2014. Shortly before his death, Bussard wrote a final report documenting his concerns about the unsolved problems with Polywell.

Bussard's final report, "Polywell Results and Final Conclusions," is hereinafter referred to as 2007-Bussard. The following excerpts from 2007-Bussard retain the same paragraph numbering as in the original report:

4. "Large scale vacuum pumping is required to avoid high-voltage arcing. But such vigorous pumping produces a core fuel density so low that it cannot produce significant fusion rates inside the machine . . . . Thus, some means must be found to ensure large electron density within the machine."

5. "This requires that the ionization (of neutral gas) density within the machine must be very large relative to that outside; and this can be attained only by neutral gas injection directly into the machine, followed by subsequent very rapid ionization of this gas, before it can escape into the exterior region. In small machines this is difficult . . . ."

6. "Thus, in small systems there is a big incentive to attempt to fuel the machine with ions injected from ion guns . . . [but] they can not be fully magnetically shielded . . . . In this situation, it appears that the only way to test these principles in small machines is to try to use capacitor discharge drives . . . ."

11. "Thus, full-scale machines and their development will cost in the range of ca $180-200 million, depending on the fuel combination selected . . . . USNavy costs expended to date [i.e. 2007] in this program have been approximately $18 million over about 10 years . . . ."

Only one public announcement has come from EMC2 since Bussard's death in 2007. In 2014, a research paper entitled "High Energy Electron Confinement in a Magnetic Cusp Configuration" was published by EMC2. First author of the paper was Dr. Jaeyoung Park, CEO of the Company. This paper, hereinafter called 2014-Park, reports experiments confirming the existence of the "wiffle-ball effect." Coined by Bussard in 1991, "wiffle-ball effect" is a term used to describe the diamagnetic closing of electron-loss channels at high plasma density. The existence of the wiffle-ball in Polywell is essential if the Polywell design is to be used for practical power production. Wiffle-ball was predicted theoretically by Bussard in 1991 but had not been seen experimentally until the work reported in 2014-Park. The 2014-Park paper is timely and important for validating the Polywell concept.

The machine design disclosed by this patent application goes far beyond the work reported in 2014-Park. The main flaw of the Park paper is that their experimental device operated in pulsed mode and without proper cooling. In pulsed mode, fusion energy output lasts only for a tiny fraction of a second. Net-power reactors must operate for months and years, not milliseconds. In addition, the power to heat the plasma came from external plasma guns. By nature, these guns are hopelessly inefficient for net energy production. To operate in a net-power mode, plasma-heating power must come from a high-voltage electron injector, not from a plasma injector. No high-voltage power supply was used in the work reported in 2014-Park. Without efficient plasma heating there is no hope that a Polywell device will ever produce more power than it consumes just to stay hot.

Small-scale Polywell devices always consume more power than they produce. On the other hand, building a large-scale (i.e. break-even) device would cost hundreds of millions of dollars. To attract private investors it is now necessary to build and test structurally-correct, small-scale machines. Then keeping to a proven design, larger and larger scale-models can be built. At each stage of development the performance of the scale-model reactor can be compared with computer simulations. Once tested, the simulations can then be used to predict the performance of the next larger scale-model. In this way, designing the expensive net-power machines can be approached gradually and with confidence. Polywell, when properly fueled, can reach break-even and still avoid the complexity of tokamaks.

Problems with Polywell—FIGS. 1A, 1B

Pulsed operation, as described in 2007-Bussard and 2014-Park, is inadequate for demonstrating the Polywell principle. When the machine is operated pulsed, power is produced for only a tiny fraction of a second at a time. A viable power-reactor must demonstrate long-term, steady-state operation to earn the confidence of the power companies.

FIG. 1A shows a drawing of a magnet module (200) from the prior art. This drawing is copied from FIG. 3c of 2010-Rogers. The module shown was designed for steady-state, not pulsed, operation. According to the design, six or more similar modules are mounted on the faces of a polyhedron. Inside the polyhedron a plasma of electrons and ions is confined and heated. An ion gun (460) injects ions along the axis of one of six coil magnets (410). Finding a suitable place to position the ion gun was the main problem with this design. The central axis of the magnet must be kept open to allow high-energy electrons to circulate in and out of the core. The problem was that there was no workable position for the ion gun, i.e. where it avoids being hit by electrons.

Electrons are born in an electron source (414). From the source, the electrons accelerate along the coil axis, i.e. in an upward direction in the Figure. Trapped electrons form a potential well inside the polyhedron. The potential well accelerates and traps ions born in the ion gun. The potential well has a roughly circular shape, like a volcano. Newborn ions are emitted from the source positioned at a point high on the rim of the well. The ions then fall down the inner wall of the potential well. Ions stream continuously into the core, each ion accelerated to fusion energy. Once in the core, each ion bounces many times back and forth across the well. After many passes through the center of the reactor, each ion either fuses or up-scatters out of the well. Whether lost to fusion or up-scattering, lost ions must be continuously replaced from the ion source to maintain the plasma density and temperature at constant values.

Input power to the reactor is provided by a high-voltage power supply, not shown in this Figure. The power enters the magnet on wires inside insulated legs (404). The power supply biases the magnets on all (six or more) modules to a high-voltage, typically in the range 10-500 kilovolts. The positive voltage on the magnets attracts the negatively charged electrons. Electrons accelerate from the ground-potential source (414) to the center of the coil. Momentum carries the electrons through the magnet and on into the core of the reactor. The electron energy is transferred to ions through the action of the potential well. The well has the feature that the magnitude of the ion's energy is approximately equal to the magnitude of the incoming electron's energy.

The voltage of the power supply is selected to give the ions the optimum energy for fusing. Different fuel choices require different voltages. FIG. 1B shows a graph of the fusion cross-section for four useful fuel choices. The curve labeled "DT" (102) shows the cross-section for fusing ions of deuterium (D) with ions of tritium (T). This reaction has the highest cross-section among all the possible light element combinations. This is the fuel choice of the ITER project.

The "DD" curve (104) shows the cross-section for fusing deuterium ions with deuterium ions. The "DD" fuel choice has a lower cross-section than "DT." Because of the lower cross-section, a D+D fueled power-reactor will be bigger in size than a D+T reactor producing the same power level. However, size is not the only selling point of a reactor design. Drawbacks with tritium fuel are that tritium is radioactive and expensive. These drawbacks are not shared with deuterium. Deuterium is stable and plentiful compared to tritium. D+D fuel is called an "advanced fuel" in the prior art.

A major advantage of the subject invention over ITER is that, in some embodiments, the new design burns D+D fuel in a break-even reactor with a reactor size projected to be smaller than ITER. Avoiding the troublesome tritium as fuel is a great step forward from the prior art.

Returning attention to FIG. 1A, in the prior art the ion gun (460) is not shielded by the magnetic field. The ion gun attracts electrons and thus bleeds them from the confined plasma. To maintain the density and temperature of the plasma, lost electrons must be replaced by fresh electrons that draw energy from the high-voltage power supply. The input power required to replace the lost electrons reduces the power balance of the model reactor. Greater-than-unity power balance is needed for net-power operation. Power balance can always be increased by making the reactor larger. But then the resulting break-even Polywell reactor size would be even larger than ITER. Until solved by this invention, prior-art fueling solutions lead to unacceptably large reactor sizes.

Other features of the prior art, as indicated by FIG. 1A (205), (400), (405), (409), and (418), may prove useful in building and testing model reactors according to the invention. These features would function as described in 2010-Rogers, as incorporated herein.

It might be tempting to modify the 2010-Rogers design by moving the ion gun OUTWARD from where it is shown in FIG. 1A. If the ion gun were located behind the magnet, it would be better shielded by the magnetic field. The ions might then be shot inward along an axis of the cylindrical coil. To accomplish this, the velocity of the ions coming out of the ion gun would need to just match the height of the flank of the potential well at the position where they enter the core. The height of the flank of the potential dictates a magic velocity at which the ions can enter the well and be trapped. However, if the velocity is even a tiny amount higher than this magic velocity, the ions will fly across the well and escape the opposite side. The need for precise adjustment of the ion velocity results in an impractically small operating range for the reactor. The idea of moving the ion guns outside the magnets will not work due to this drawback.

The following "thought experiment" is proposed to illustrate the drawback: Suppose we wish to fill an extinct volcano with soccer balls. The volcano is like the potential well in an IEC reactor. The soccer balls are like fuel ions. The force of gravity is like the electrostatic force acting on the ions. We imagine the inside of the volcano as a perfectly smooth, frictionless bowl. The insides of the bowl rise to a circular rim all around. Outside the rim the flanks of the volcano fall away to level ground on all sides. The potential well is invisible in the IEC reactor; thus, we imagine the volcano to be invisible. Suppose it is shrouded in mist so that we cannot see it. We stand on level ground and kick the first ball toward the volcano. The ball rolls into the mist and then comes rolling back. Gradually, we kick the soccer ball harder and harder. Finally, we kick it hard enough that it rolls all the way up to the rim and falls into the volcano. But suppose we kicked it a little too hard. It rolls across the bowl, up the far wall, over the rim, and is lost. We adjust the strength of our kicks until some of the balls don't come back and don't exit the far side of the volcano. But even so, we still lose a lot of soccer balls. Minor variations in the strength of our kicks and in the height of the rim always cause most of the balls to be lost over the rim. Our efforts to trap all the soccer balls in the volcano are unsuccessful. And so is the problem of fueling Polywell with ion guns also intractable.

In addition to the problems described above, ion guns have another serious problem. They consume a lot of power to produce only a tiny amount of ion current. The typical ion gun, such as the commercial one shown in 2010-Rogers (FIG. 4G), produces a maximum current of around 0.1 microamperes of ions. The ion current needed to stabilize the plasma in small-scale Polywell is in the milliampere range. It would take thousands of ion guns operating in parallel to produce even 1 milliampere of ions. Needless to say, operating thousands of ion guns is not practical for a myriad of reasons.

The following conclusions summarize why existing ion sources are NOT suitable for fueling a Polywell type IEC reactor:

(1) The reactor can only operate in millisecond-pulse mode. If the pulse lasts longer than a millisecond, the high-voltage arcs and fries the magnets.

(2) Commercial ion sources are too big and too weak to be used inside the bore of the electromagnet. They cannot be shielded and they produce too little current.

(3) Injecting ions from external ion guns is impractical because the ions cannot efficiently cross the flanks of the potential well.

From the above analysis we see an apparatus for fueling an IEC reactor is needed. Without it fusion power cannot become a practical reality. The present patent application teaches how to build and use such an apparatus.

SUMMARY

Fueling a Steady-State IEC Device

A steady-state fusion energy device solving the above described fueling problems consists of a vacuum tank, coil electromagnets arranged on the faces of a polyhedron, electron-emitters mounted on the inner surfaces of the vacuum tank, a high-voltage power supply to bias the magnets, and most importantly, gas-cells mounted inside the bores of the magnets. The magnetic fields combine with the bias on the magnets to compress the electrons into narrow beams flowing in and out through the magnets. Locating the gas-cells at the points where the electron beams are narrowest allows the gas to be largely confined by pairs of metal plates with small holes to let the beams pass in and out of the cells. The holes' small diameters limit the flow of neutral gas out of the cells. Leaking gas must be pumped away by vacuum pumps to maintain a low pressure outside the gas-cells. The lower the leakage rate, the less expensive are the vacuum pumps. Vacuum pumps already represent a major portion of the capital cost of IEC reactors. The technique of maintaining a pressure differential across "choking" apertures is called differential pumping. The design and usage of differentially pumped gas-cells in nuclear physics experiments is familiar from the scientific literature. This invention is believed to be the first application of differential pumping to fuel fusion reactors.

The immediate use of the embodiments disclosed will be in building and testing small-scale model-reactors. Small-scale reactors consume more power than they produce, but they must be built and tested first before committing billions of dollars to develop net-power reactors. The size of the scale-models will be increased step-by-step. With each size increase, the models will approach closer and closer to break-even. Constructing larger and larger scale models is a development path similar to the path that tokamak development has taken over the past 50 years. Fortunately, with the advantage of MHD stability, these embodiments have a much better chance of success than tokamaks ever did.

The differentially pumped ion source, a central element of the embodiments, will be crucial both in building scale-models and in building net-power reactors. Larger model reactors require larger amounts of ions. Larger and larger amounts of ions can be produced economically by simply turning up a regulator-knob to control the pressure of the gas in the gas-cells.

Electrons circulate in and out through the bores of the magnets. When an electron approaches one of the tank walls, it is slowed by a retarding electric field. Electrons stop just short of hitting the tank walls, reverse their trajectories, and fall back into the core under the influence of the electric field. Electrons circulate in and out of the reactor core many times until they up-scatter, hit the tank wall, and are lost. The continual loss of electrons forms a steady power drain from the steady-state reactor. Power drain is the main limiting factor to getting net-power from small-scale reactors. Large-sized reactors produce more fusion power than the electrons' power drain. The break-even reactor size is the size that produces the same amount of fusion power as the input power required to maintain the plasma. A predictable break-even size characterizes each reactor design. The smaller the size of the break-even reactor, the more economical the design is to build and operate. This invention leads to smaller break-even reactors.

Continuous electron injection maintains a potential well that traps ions. In the embodiments of the invention disclosed, the same electrons also create fuel ions inside the reactor. The physics of ionization of gas by fast electrons is well understood. Monte Carlo modeling was used to simulate the production of ions, including effects of electron-velocity, electron-density, gas-pressure and gas-temperature. The computer algorithm that does the modeling was developed at Berkeley with hundreds of man-years of labor invested over several decades. The algorithm is described in Birdsall's 1991 publication, "Particle-in-Cell Charged-Particle Simulations Plus MonteCarlo Collisions with Neutral Atoms, PIC-MSS", hereinafter called 1991-Birdsall.

Gas is fed through a narrow-gauge tube into the gas-cells at a rate fast enough to just balance ions consumed by fusion plus ions lost to hitting internal structures. In order to avoid wasting drive power, it is important that the power lost to ions hitting internal structures be made smaller than the electron power loss described above. A certain minimum rate of loss to up-scattered electrons is unavoidable. However, the power lost to escaping ions can be, and has been, greatly reduced by the design features of these embodiments. By reducing the power lost to ions to be less than to electrons, the power balance of the model reactors was vastly improved over 2014-Park.

Multiple gas-cells can be used by placing similar cells in more than just one magnet. An advantage of using multiple cells is that two different ion fuel species can be supplied by different gas-cells. This allows the fuel gas mixture to be adjusted in real-time while the reactor is running. The density of the gases in the gas-cells can be optimized by varying the mixture for maximum power output. For example, using the the $p+B^{11}$ fusion reaction, one gas-cell could produce hydrogen ions (p) and another gas-cell could produce boron-11 ions.

Once created by gas ionization, most ions accelerate from their birthplace into the core through the inner aperture of the gas-cell. The energy gained by each ion in this initial acceleration depends only on the distance from its birthplace to the center of the potential well. By minimizing the spacing between the apertures, the initial ion velocity varies only over a narrow range of velocities. This allows the ion energy to be precisely adjusted to the exact ion energy that maximizes fuel reactivity. This optimum energy can be determined for each fuel choice by analyzing the cross-section data shown in FIG. 1B.

Some ions are also produced outside the gas-cells due to the necessary leakage of some gas out of the gas-cells through the apertures. These ions do not fall down the potential well at the place required for them to reach fusion energy. Because of the steep fall-off of the reactivity with energy, many ions born outside the gas-cells will never fuse. These ions are wasted. They needlessly consume drive power.

The complete operation of a model reactor has been simulated by particle-in-cell techniques combined with Monte Carlo techniques. Different fuel mixtures will result in different sizes for the break-even reactor. A cube-shaped reactor fueled by D+D has been modeled in detail and found to predict a break-even reactor size of 18-25 meters. Fueling with D+T would give a much smaller reactor, but the D+T fuel choice may be unattractive because tritium (T) fuel is not only expensive but also radioactive. D+D is often called an "advanced" fuel because it avoids the problems inherent with tritium. An important feature of the embodiments is that the predicted IEC reactor size is smaller than ITER, even though the IEC reactor burns advanced fuels. Thus, the break-even IEC reactor is expected to be simpler and smaller, and therefore less expensive than any break-even tokamak, including ITER.

Correcting the Over-Optimistic Size Prediction of the Prior Art

In the present patent application, computer simulation was used to predict the sizes of break-even reactors constructed according to the embodiments. The reason for relying on simulation was that building full-scale reactors is too expensive to be undertaken without reliable theoretical guidance. Instead, trial and error experiments have traditionally been done with computer models to save the expense of constructing unproven designs that do not work. The most relevant computer simulation prior to 2010-Rogers is found in the patent application of Bussard, as reported in US20080187086A1, hereinafter called 2008-Bussard.

The main difference between 2008-Bussard and this application is the predicted size of the break-even reactor. Both applications rely on computer simulations. Both analyze a theoretical model comprised of six electromagnets arranged on a cubic polyhedron. But 2008-Bussard predicts the break-even D+D reactor would be 1.5 to 2.5 meters diameter, while this Specification says a similar design would need to be 25 meters diameter to reach break-even. Careful analysis of 2008-Bussard was made in an effort to uncover the source of his vastly different predictions for the size of the break-even reactor.

The difference discovered was that 2008-Bussard's computer simulation failed to properly account for the transverse momentum imparted to ions reflected from the edge of the "quasi-spherical" potential well. Bussard's simulation assumed that the well was perfectly spherical, not quasi-spherical. A perfectly spherical well would indeed result in convergence of in-falling ion positions to form a dense core at the center of the cube. Such convergence was not seen in the more realistic simulation disclosed in this Specification.

To understand where 2008-Bussard went wrong, selected passages of the publication will be briefly analyzed here. The bracketed [numbers] below were copied from Bussard's USPTO publication. These numbers can serve as reference points to the USPTO's text to further validate the analysis. Quoting from 2008-Bussard:

"[0060] According embodiments of the invention, particle injection (ion or electron) may be along the magnetic cusp field axes, . . . . Of course, in any realistic source of electrons (and of ions) there will always be a transverse component of energy, transverse to the radial motion due to the well gradient, that will prevent some of the particles from reaching the exact center of the potential well. Thus there will always exist a central 'core' whose size (rc) will depend on the ratio of transverse energy at the edge of the well (dEtrans) to the well depth (Ewell), such that the fractional core size will be approximately $<rc>=(rc/R)=(dEtrans/Ewell)^{1/2}$."

"[0064] . . . the convergence of the quasi-spherical geometry of the polyhedral configurations of interest increases the local dynamic pressure by the square of the inverse ratio of radii from the outer (electron injection) radius to the inner (ion dynamic pressure confinement) radius, rc . . . ."

"[0071] . . . In-falling ions will converge as the inverse square of the radius, thus the reaction rate will tend to vary as the inverse fourth power of the radius. This very rapid dependence ensures that nearly all of the fusion energy generated in such a device will be generated in and around the center of the (structurally-empty) cavity . . . ."

"[0072] Numerical calculations show that the ion current densities required for total fusion power output at 'useful' levels for certain applications is much larger than those required for power balance makeup against electron losses. To achieve this state requires a current multiplication or 'gain' (Gj) achieved by the recirculation of ion (and electron) currents across the machine volume many times, until a sufficient ion density is achieved . . . it is clear that there must exist a size sufficiently large that the 'gain' may be unity (Gj=1), and that no current multiplication is required for operation of the machine at a breakeven power balance. Numerical calculations show that this size is approximately $R \cong 10\text{-}20$ m, . . . ."

"[0208] . . . collective phenomena beyond start-up (from low- to high beta) . . . have been readily modelled successfully by a major plasma phenomenological code (the EIXL code)

developed by EMC2 since 1990. This is a 1.5-dimensional Vlasov-Maxwell code, . . . which includes such phenomena as central core inertial-collisional compression effects which can apply to core ion compression in Polywell devices."

Here ends the quotation from 2008-Bussard.

The following numbered paragraphs analyze the errors of the preceding "quoted" paragraphs, keyed to the same paragraph [numbers] used by the USPTO.

The term "radial motion due to the well gradient" in that paragraph is misleading. The motion, due to the well gradient, is by no means "radial." The well has a scalloped edge due to the bumpy nature of the confining magnets' field. The formula for "rc" at the end of the paragraph is incorrect because the in-falling ions travel on curved paths, not the radial paths assumed. The formula describes straight-line paths which do not exist.

The phrase "the convergence of the quasi-spherical geometry" is self-contradicting. The "quasi-spherical geometry" produces divergence, not "convergence." The simulation in 2008-Bussard describes an idealized spherical geometry, not the realistic "quasi-spherical geometry" of the actual device.

The first statement, "In-falling ions will converge" is probably correct, at least for the first pass of newborn ions. The second statement, "thus the reaction rate will tend to vary as the inverse fourth power of the radius," does not follow logically from the first statement. It is certainly not correct. The in-falling ions may indeed converge, but only on their first pass. The convergence is lost on subsequent bounces. The ions bounce many times back and forth before they fuse. Their directions gradually change, in random directions, from their original direction. After many bounces the accumulation of small turns has wiped out any convergence the ions might have had on their first pass through center.

The paragraph says "output at 'useful' levels . . . is much larger than those required for power balance makeup against electron losses." This statement is unrealistically optimistic. In this paragraph Bussard seems to be saying that lesser power levels, which he admits could be improved by simply going to larger reactors, would be useless; that is, the opposite of "useful." In the present patent application the applicant discloses a useful design in which the break-even output power is definitely greater than the electron losses. The design results in a larger reactor than Bussard predicted. "Larger" break-even size is definitely not "useless" break-even size. "Useless" is a subjective term that loses its impact once it is realized that convergence does not exist.

In this paragraph the simulation code used by Bussard is called "a 1.5-dimensional Vlasov-Maxwell code." The jargon "1.5-dimensional" is the well-known name for a code one-dimensional (1D) in spatial variation and 2D in velocity. The meaning of this jargon would be obvious to anyone skilled in the art of plasma simulation. The simulated in-falling ions were confined by the simplicity of the code to travel along purely radial orbits. By assuming spherical symmetry, convergence was artificially imposed on the simulation results. In contrast, the present invention is supported by a 2.5-dimensional PIC code, which is inherently 2D in the spatial variable (x and y) and, by the way, 3D in velocity. As will become obvious in the description of the embodiments to follow, 2D spatial simulation is sufficient to show the greater complexity of the ion's trajectories. The trajectories certainly do not converge as claimed by Bussard.

The existence of a convergence radius "rc" was postulated by Bussard in his paragraph [00060], quoted above. The existence of such a convergence radius was not confirmed by any measurement or realistic simulation in 2008-Bussard. The only simulation documented in 2008-Bussard is the "1.5-dimensional Vlasov-Maxwell code," just discussed. No further details of the code are disclosed in the 2008-Bussard publication beyond those shown in the paragraph [0208] quoted above. It seems likely that the "core ion compression" feature claimed for the code was added into the basic physics by assuming a value of a hypothetical transverse energy for the ions at birth. The value selected for the transverse energy then would become an ad hoc parameter that could be chosen to produce any desired value for "rc," the core radius. The value <rc> equal to 0.1 was chosen "as an example" in 2008-Bussard. This assumed value of "rc" resulted in a small break-even reactor-size prediction, but its assumption seems to be unsupported either by experiment or adequate theory.

The PIC simulation presented in this Specification is 2.5-dimensional, in other words 2-dimensional in space and 3-dimensional in velocity. The extra spatial dimension led to predicting increased transverse momentum as a natural result of the ions' multiple reflections on the quasi-spherical potential well. A flat density profile resulted, reaching from cube center all the way out to the magnets. In the terminology of 2008-Bussard, such a flat density profile would be described by Gj=1. According to paragraph [0072] above, Gj=1 would produce a break-even radius of 10-20 m. Bussard called this radius "practically infeasible" in the same paragraph. However, once Bussard's quest for central convergence is abandoned, his break-even prediction comes into agreement with these PIC results.

Obviously, a 10-20 meter break-even radius is not perfect, but it is feasible. Fortunately, there is another, better way to obtain a small break-even reactor size. This better way is disclosed as the second embodiment of this invention.

DRAWINGS

Brief Description of Figures

FIG. 2A shows computer generated central section, simulated electrons plotted as dots.

FIG. 2B shows a graph of simulated electron- and ion-counts during reactor start-up.

FIG. 2C shows the 2D electrostatic potential voltage mapped with 3 levels of gray-scale.

FIG. 3A shows positions of 100 thousand simulated electrons plotted as black dots.

FIG. 3B shows electrons as black dots in reactor 2-times larger than the one in FIG. 3A.

FIG. 4A shows time-lapsed positions of ions at an early time after time-zero.

FIG. 4B shows gas density, PIC-cells inside 2 gas-cells coded white, outside coded black.

FIG. 4C shows a snapshot of ion positions in 2D, at a time nearly at steady-state.

FIG. 4D shows a snapshot of the potential voltage on a section-line through cube center.

FIG. 4F shows a section drawing of a gas-cell incorporating 3-stages of pumping.

FIGS. 5A-5G show selected segments of source-code, compiled at start each simulation.

FIG. 6C shows a snapshot of electron positions, waist position marked by small square.

FIG. 6D shows potential voltage coded white below and black above bounding potential.

FIG. 6E shows the magnetic field's component By on a horizontal line through waist.

FIG. 6F shows a snapshot of steady-state ion positions in velocity vs. position space.

FIG. 6H shows a 2D density plot of electrons, cusp trapped electrons shown in white.

FIG. 7 shows a table of plasma parameters contributing to a volume integral of reactivity.

FIG. 9A shows snapshot of electrons' in an embodiment including an electron-extractor.

FIG. 9B shows a snapshot of ions in the same reactor, not shown to scale.

DRAWINGS

Figure 1B:
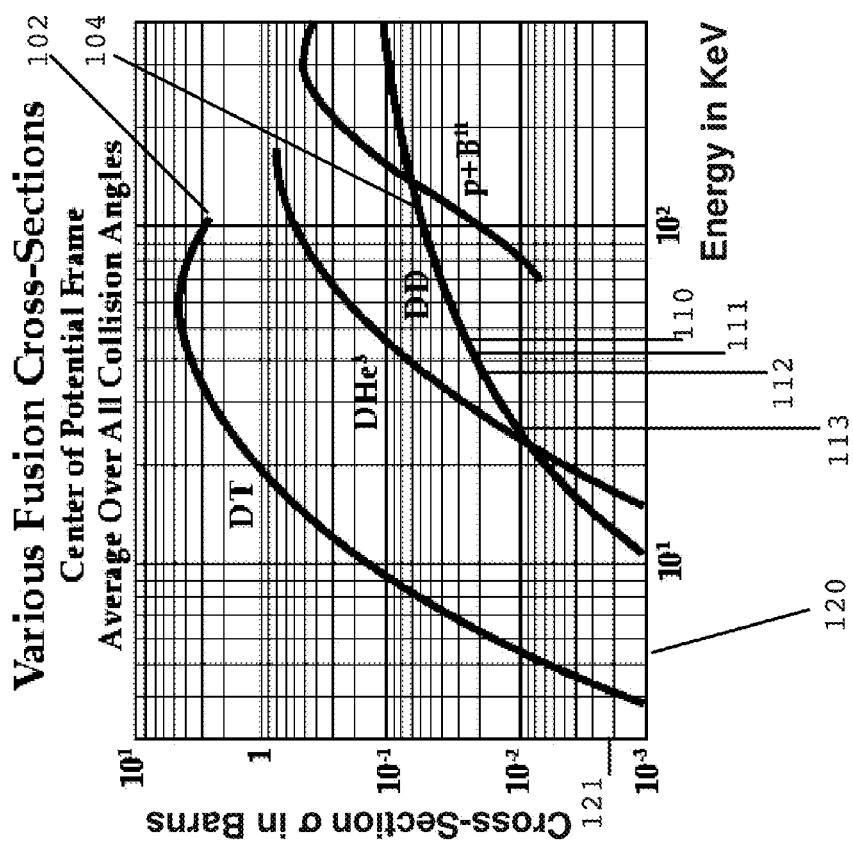
FIG. 1B shows graphs of fusion cross-sections for 4 different fuel choices.

Reference Numerals 200 prior art magnet module. 205 module vacuum flange. 400 spacer flange. 404 hollow leg. 405 insulating section. 409 chamfered edge. 410 magnet box. 414 electron gun. 418 gas nozzle. 460 internal ion source.

102 graph of DT cross-section. 104 graph of DD cross-section. 110 highest sampled ion energy. 111 2nd-highest ion energy. 112 3rd-highest ion energy. 113 4th-highest ion energy. 120 energy axis. 121 cross-section axis.

220 vacuum tank. 225 gas-cell. 230 electron emitter. 282 copper magnet coils. 222 cell aperture plates. 224 left-hand gas-cell. 225 right-hand gas-cell. 226 top-magnet coil. 227 right-hand magnet coil. 228 bottom-magnet coil. 229 left-hand magnet coil. 230 electron emitter. 232 simulated electron positions. 234 gap between adjacent magnets. 236 horizontal (x) position scale. 238 vertical (y) position scale.

250 origin of Time axis. 252 particle counts axis. 254 graph of electrons' counts. 256 graph of ions' counts. 258 end of Time axis.

270 center-point of potential. 272 equipotential contour.

310 face cusp-line. 320 corner cusp-line. 340 narrowest part of cusp.

350 reduced-size apertures.

428 fast ion near center. 430 ion born in tank corner. 432 ion born near magnet. 434 ion born near center.

440 gas concentrated in gas-cells.

460 ions' left-hand bounce point. 462 ions' right-hand bounce point.

470 diagnostics, 10% background gas. 472 diagnostics, 1% background gas. 474 diagnostics, 0.1% background gas. 475 energy scale in electron-volts 476 graph of average electron energy. 477 ion energy with 10% background. 478 ion energy with 1% background. 749 ion energy with 0.1% background. 480 Time axis, background test. 481 Time of density declining. 482 Time of density leveling.

486 3-pairs of apertures on left. 487 3-pairs of apertures on right. 488 gas-cell with mulltistage pumping. 489 path of electrons recirculating. 490 vacuum pump pumping tank. 492 pump pumping inner volume. 493 pipe to inner volume. 494 inner volume. 496 pump pumping outer volume. 497 pipe to outer volume. 498 outer volume.

510 brace opening Variables' block. 512 typical comment line. 513 blank comment line. 514 typical variable definition. 516 equals symbol for assignment. 518 typical assignment expression. 520 linear variable dependence. 521 quadratic variable dependence. 522 magnet current scaling. 524 magnet definition block. 525 assigning magnets' corner gap. 526 operational parameters block. 527 cells per size scaling factor. 528 assigning PIC cell-size. 529 cell count per tank diameter.

530 magnets' bias-voltage. 531 electrons' initial velocity. 532 time-step vs. Velocity. 533 electron emitter current. 534 extractor definition block. 536 assigning extractor size. 537 assigning extractor position.

540 gas-cell definition block. 550 gas-fill definition block. 552 assigning gas density. 553 background/cell density ratio. 554 assigning background density. 555 assigning electron ionization factor. 556 assigning diagnostic-time duration.

560 typical wire coordinate. 561 modulus operator usage. 563 example of assigned-variable usage. 564 brace ending Variables Block.

570 simulation control block. 571 assigning initial values. 572 automatic x-coordinate. 573 automatic y-coordinate. 574 assigning "Bx" magnetic field. 576 assigning "By" field. 580 defining electron properties. 582 Monte-Carlo Collisions block. 584 assigning neutral gas properties. 585 pre-loading PIC-cells with gas. 586 use of ionization scale factor. 588 brace ending MCC block.

590 extractor properties block. 592 charge-bleeding option. 598 end of extractor definition block.

610 y-axis ions per square-meter. 612 x-axis, 0 to 0.62 meters. 624 left-hand ion surface. 626 right-hand ion surface. 620 ions' central density level.

622 electrons' central density level. 630 electrons' trapped in cusps. 640 white box marking waist. 642 x-coordinate of waist. 644 y-coordinate of waist. 646 central x-coordinate. 647 x-axis spanning tank edge. 648 extended horizontal lead line.

650 equipotential at electrons' surface.

660 $B_y$ scale calibrated in Tesla. 662 $B_y$ as a function of x. 666 line marking $B_y$ value.

670 line at x-center position. 671 one x-interval off center. 672 two x-intervals off center. 673 three x-intervals off center. 674 four x-intervals off center. 680 ion velocity at center. 681 velocity 1-off center. 682 velocity 2-off center. 683 velocity 3-off center. 684 velocity 4-off center. 686 ions' x-velocity axis. 687 ions' x-position axis.

690 boundary of interior electrons. 692 interior electron's trajectory. 694 exterior electron's trajectory. 696 limiting exterior B-field line.

697 2D plot of electron density. 698 central-cell setting scale. 699 typical electron trapping regions.

700 table for numerical integration. 702 index of table entries. 704 x-positions of integrand sampling. 706 ion velocities sampled. 708 ions' kinetic energy (doubled). 710 angle averaged cross-section. 712 integrand at sample points. 714 Simpson's rule weight factors. 716 integrand samples to be summed.

802 ions' tank loss current. 804 nine-microsecond time span. 806 average loss current extrapolated. 808 loss-axis calibrated in amperes.

812 bottom corner ion loss spectrum. 813 face-cusp ion loss spectrum. 814 top corner ion loss spectrum. 816 ions' energy origin. 817 ions' energy maximum. 818 ions' average energy. 819 ions' position axis.

832 electron's energy-spectrum. 834 electrons' lost-energy axis. 836 electrons' energy centroid.

910 electron-extractor electrode. 912 steady-state electron positions. 914 typical corner-cusp endpoint. 916 typical face-cusp endpoint. 918 tank wall clear of losses. 919 electrons in cusp at extractor.

920 ions' 2D positions, 2nd embodiment. 922 ions escaping in corner cusp. 924 ions escaping in face cusp.

1002 ions' x-velocities vs. x-positions, 2nd embodiment. 1020 electron loss current on tank. 1022 ion loss current on tank. 1024 latest time in start-up. 1026 average electron loss current. 1028 average ion loss current.

1030 position axis, 0 to 0.62 m. 1032 max potential measured in volts. 1040 electrons' spectrum on electrode. 1042 electrons' position axis. 1044 cell at midpoint of electrode. 1048 electrons' energy axis.

1050 1st embodiment loss vs. Time. 1052 current constant at 2.0 amperes. 1060 electrons' loss on extractor. 1062 ions' loss on extractor. 1064 electron current 1.3 amperes. 1065 ion current 0.008 amperes.

DETAILED DESCRIPTION

Figure 2:
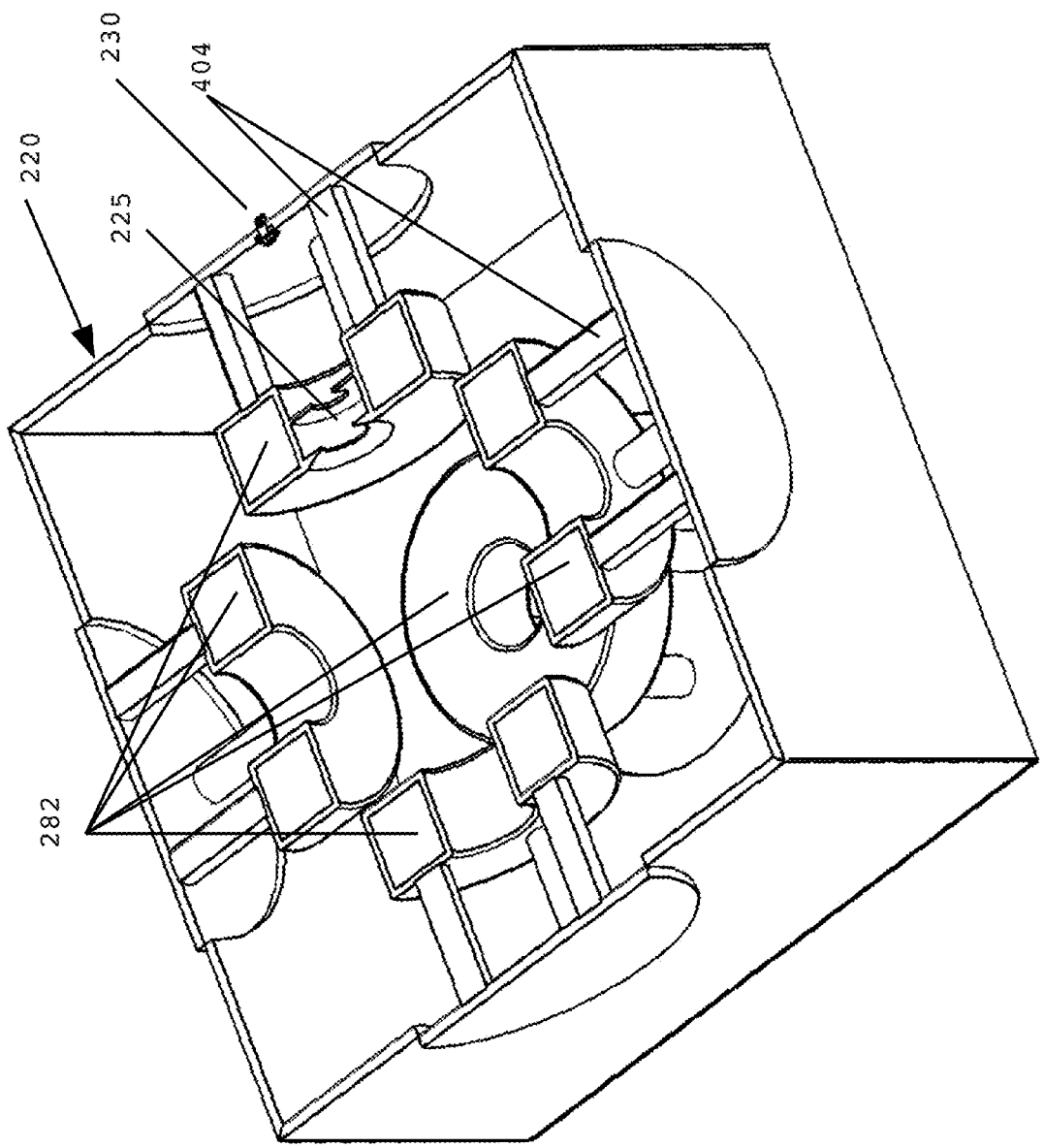
FIG. 2 shows a cut-away isometric projection of one embodiment of a cubic IEC reactor.

FIG. 2—Preferred Embodiments

The basic device according to the First Embodiment consists, as summarized above, of a vacuum tank enclosure containing coil magnets arranged one-for-one on the faces of a polyhedron. The magnets are biased to a high voltage by an external power supply. The power supply is wired to the magnets through hollow support-legs. At least one electron-emitter, mounted on the inside of a tank wall, sends electrons down the bore of one of the magnets. The electrons collect inside and form a potential well centered on the center of the polyhedron. Positioned in the bore of (at least) one of the magnets is a gas-cell containing a fuel-gas or, alternatively, a mixture of fuel-gases. Ions produced in the gas-cell(s) enter the core and mix with the electrons to form a plasma. The ions are trapped in the potential well. The plasma is heated by the incoming electrons. The ions of the plasma fuse, producing energy by the same process that powers the sun.

The device burns the fusion fuel and produces fast particles. The fast particles flow out and their energies are converted to electricity. Choices of fuels are available to burn. FIG. 1B shows 4 graphs of fusion cross-sections for 4 fuel choices. As an example, take the D+D fuel choice (104). Fusing deuterons would produce an equal mixture of p+T and n+$He^3$ as fast, final-state particles. In this case the total energy of the fast particles would be 3.7 million-electron-volts (MeV) per D+D ion-pair burned. The reactor's power output is the spatial integral of power density. Power density is the product of 3.7 MeV, multiplied by the fuel's reactivity, and that multiplied by the ion-density-squared.

Alternatively, D+T fuel may be chosen. In this case the final-state particles would be a 3.5 MeV $He^4$ particle plus a 14.1 MeV neutron. The final-state energy in this case is the sum of the two particles' energies, 17.6 MeV. This fuel choice has the advantage of producing more energy per fusing pair than D+D. Also, D+T has a much higher fusion cross-section, as seen in FIG. 1B (102). Higher energy and higher cross-section would lead to a smaller sized reactor producing the same power as one burning D+D. These advantages would make D+T the fuel of choice if small reactor size were the only selection criterion. But size is not the only criterion.

Various characteristics, other than size, weigh against D+T as a fuel. Although the reaction produces more energy per fusion than D+D, most of the energy is carried by the neutron. Neutron energy is difficult to convert to electricity. Most of the neutrons hit the magnets and deposit their energy as heat. This heat mixes with the resistive heat from the magnet power supplies. Recovering the neutron energy requires a heat exchanger and turbine operating a Rankine cycle. The Rankine cycle is approximately 40% efficient. Obtaining a higher efficiency would be an advantage, not available burning D+T fuel.

The energy carried away by the DD reaction's charged particles, p, T, and $He^3$, can be converted directly to electricity by an external power recovery grid. Unlike the neutrons, charged particles are steered out of the core by the magnets. A collector for energetic charged particles can be located outside the tank, mounted to align with the faces and corners of the polyhedron. These are the directions in which the reaction products emerge.

Direct electrical conversion is the subject of the 2011-Greatbatch patent which teaches the advantages of direct conversion over the Rankine cycle. The efficiency of direct conversion is approximately a factor-of-two higher than the Rankine cycle. This improved efficiency would not be enough to overcome the lower cross-section of D+D compared to D+T. But D+T also suffers from the problem of handling radioactive tritium as a reactor fuel. This factor alone would make D+D preferable to D+T as a fuel.

The fueling apparatus disclosed herein works equally well with either type of the energy conversions just described. For the purpose of comparing the embodiments with the prior art, the efficiency of electrical conversion was assumed to be 50%, intermediate between the Rankine cycle and the direct conversion method. The Rankine cycle could be used either with this invention or with the energy devices of the prior art, most of which propose to burn D+T fuel. Direct conversion does not work well with D+T fuel, because most of the energy is carried by the neutron. Only the less-efficient Rankine cycle works with the D+T fuel choice.

Power balance is conventionally defined as the ratio of fusion power-out to drive power-in. Power-out is converted to electricity from particles' energy with well-known efficiencies, symbolized by the Greek "η." The value of η depends on the type of energy conversion employed. For comparison of the performance of the embodiments with the prior art, a value of η equal to 0.5 was assumed in this Specification. This value of η=0.5 is equivalent to an efficiency of 50%, as discussed in the previous paragraph.

Power-in is partially supplied by recycling the thermal energy of particles lost from the plasma and the thermal energy lost by the magnets' resistive heating. The required drive power was assumed to be reduced by the efficiency of this recycling. A fraction η of the lost energy from the plasma was assumed to be re-injected as electron energy. This fraction of the lost energy was recycled, thus not actually lost for good. The efficiency factor describing this recycled energy is a factor of 1.0 minus the recovery efficiency of the fusion power, η. The numerator of power-balance contains the factor η. The denominator contains the factor (1−η). The ratio η/(1−η) conveniently evaluates to unity because η was assumed to be equal to 0.5.

The benefit of using direct conversion with its increased efficiency was deemed less important to simulate than the other features of the reactor. By choosing η to be 0.5, efficiency could be factored out of the power balance expression. Ignoring the possible advantages of improved efficiency on ion power balance was an assumption made to reveal the much larger advantages due to the other features of the embodiments.

In constructing a reactor according to the invention, a polyhedron may be selected to be any of the many three-dimensional solids which can be inscribed in a sphere. The list of possible polyhedra includes the five Platonic solids (tetrahedron, cube, octahedron, dodecahedron, icosahedron)) and any other solid which can inscribed in a sphere (soccer ball, truncated-cube, geodesic sphere, etc.). For simplicity in illustrating the principle of the invention, a cube has been selected for detailed analysis. The cube was selected for the purpose of illustrating an example without limiting the scope of the embodiments to any particular shape of polyhedron.

FIG. 2 shows a simplified drawing of a cubic reactor. A vacuum tank (220) encloses six magnets, five of which are shown (282) in this cutaway drawing. The sixth magnet, mounted on the top face of the cube, was removed from the cutaway to show the insides of the tank. The inner faces of the magnets delimit and surround a cube-shaped open space, called the "core" of the reactor. In addition to the magnets (282), the essential components shown are an electron-emitter (230), hollow legs supporting the magnets (404) and, most importantly, a gas-cell (225) supplying the fuel ions.

Figure 1A:
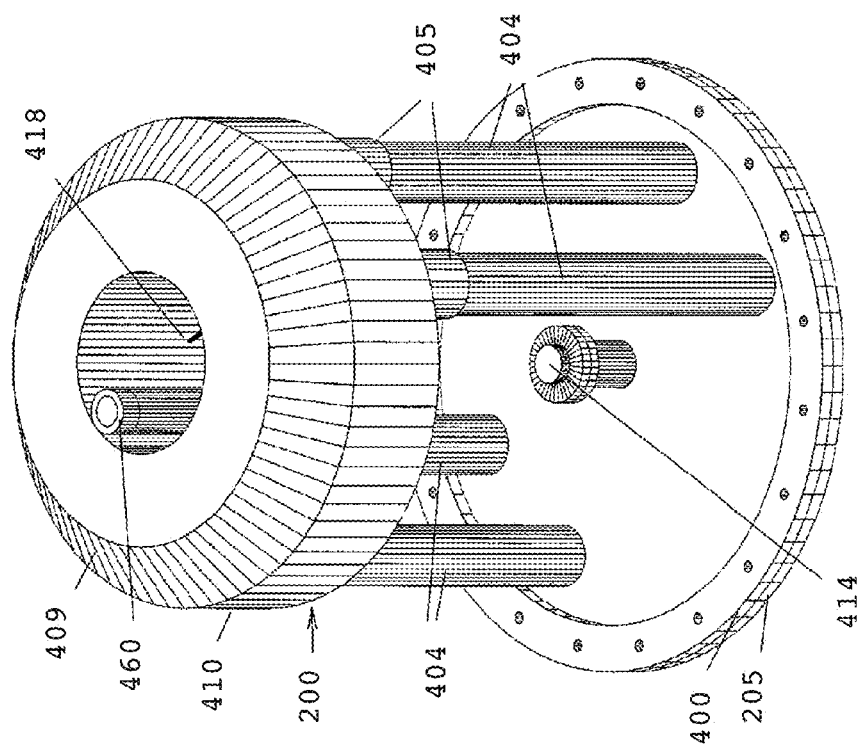
FIG. 1A shows Prior-Art IEC-reactor module, including an interior ion gun.

The location and the structure of one or more gas-cells (225) are the main improvements of the First Embodiment over the prior art. Other structural features of the prior art, as represented in FIG. 1A, may prove useful and so are retained. These other features are described in 2010-Rogers, as incorporated herein.

First Embodiment

FIG. 2A

FIG. 2A shows a cross-sectional drawing of one embodiment of the claimed IEC device, including vacuum tank (220), pumping apertures (222), two gas-cells (224, 225), 4 magnets (226, 227, 228, 229), an electron-emitter (230) and a snapshot of simulated "electron macro-particles" (232).

In simulation, each "electron macro-particle" represents 600 million actual electrons. Macro-particles represent groups of electrons and ions. They have the charge and mass of 600 million actual particles but, they are treated as a single particle to speed up the simulation on the computer. For brevity, "electron macro-particles" and "ion macro-particles" will be simply called "electrons" and "ions" in the remainder of the Specification.

FIG. 2A, minus the reference numerals and lead lines, was made by a two-dimensional (2D) particle-in-cell (PIC) simulation program called OOPIC Pro, purchased from Tech-X Corporation of Boulder, Colo. Software having the same functionality is also available free on the Internet from The University of California, Berkeley, under the name XOOPIC. To represent a three-dimensional (3D) cubic reactor in 2D simulation, the cube was symbolically cut by a section-plane passing through the cube's center.

The program models the evolution of a plasma in a sequence of time steps. The computer screen displayed diagnostics of the electrons' and ions' kinetic energy, density, velocity, and 2D-positions at the end of each time step. The snapshot of electron positions in FIG. 2A (232) was made 5 nanoseconds, which equaled 100 time-steps, after the start of the simulation. At each time step the positions of the electrons were displayed. The successive positions of each electron were close together in the display, thereby creating the illusion of motion. Each electron appeared to move from left to right in the real-time display of which FIG. 2A is a snapshot.

Time-Zero, Start-Up, and Formation of the Central Potential

FIGS. 2B and 2C

"Time-zero" is defined to be the moment of turning on the electron-emitter. At time-zero the interior of the tank is empty of plasma particles. After time-zero, steady-state conditions will be gradually approached over the first 500 microseconds of electron injection. The sequence of rising plasma density from time-zero to steady-state is called "start-up." The entire time evolution of the plasma divides into start-up and "steady-state." In principle, steady-state can last forever, since all the plasma parameters have become constant in time. In practice, the simulation program was halted as soon as the parameters stopped changing from time-step to time-step. Plasma diagnostics made at the end of start-up were used to compute the steady-state plasma density and particle energies as functions of position in two dimensions.

FIG. 2B graphs the numbers of electrons (254) and ions (256) in the entire simulated area, as functions of time. The first time marked on the "Time" axis (250) is one time-step, 46.1 picoseconds, on a logarithmic scale. The vertical axis (252) measures the electron counts (254) and ion counts (256) at each time step. A count of one, at the bottom of the vertical scale (250), is equivalent to 6e8 actual electrons or ions. The last time on the "Time" axis (258) reads "1.40E-04." Using more conventional units, this time is 140 microseconds. By this time, the electron and ion counts had risen to be almost constant in time. Steady-state was fully established approximately 500 microseconds after time-zero, at which time the two curves (254 and 256) had become level and parallel.

Power to heat the plasma is injected by accelerating electrons. The electrons are born in the electron-emitter (230). From there they accelerate to the left and enter the core through the right-hand magnet (227). The electrons are confined by the combined effect of the magnetic field from the 4 magnets and the electric field imposed by the bias voltage applied to the magnets. The electrons spontaneously form an electrostatic potential well. The bottom of the well is located at the center of the polyhedron. The potential well accelerates ions from their birthplace in the gas-cells into the center of the core. Once inside, the ions bounce back and forth. Each ion's kinetic energy varies periodically from maximum at the center to a minimum near zero at the edge of the potential well.

Important features of the magnets are the open gaps (234) at the corners where the magnets closely approach each other. The width of these gaps (234) was determined by trial and error using the simulation. The gaps were made as small as possible without impeding the electrons' corner trajectories. The smaller the gaps, the smaller was the leakage rate of electrons out the gaps. Smaller electron leakage rate means longer electron confinement time, and therefore bigger power balance for the reactor.

A horizontal scale (236) and a vertical scale (238) of FIG. 2A measure distances in meters along the sides of the tank. The dimension of the cubic vacuum tank simulated is 0.622 meters along each edge. This size is appropriate for a small-scale, cubic reactor that could be built and tested, at the time of this writing, for about a million dollars.

Except for the electron-emitter (230), all the physical elements shown in FIG. 2A are metal conductors. Important elements not shown in FIG. 2A are the hollow legs (404) shown in FIG. 1A. These hollow legs insulate the tank (at ground potential) from the magnets (at bias voltage). The magnetic fields perfectly shield the legs from being impacted by plasma particles. Because no particles can touch the legs, leaving them out of the simulation makes no difference to the plasma. Including them would only waste computer time. Of course the legs would necessarily be incorporated when constructing an actual reactor. Legs physically hold the magnets in place and electrically insulate the magnets from the tank.

FIG. 2C shows a snapshot of the two-dimensional (2D) electrostatic potential, made after steady-state had been reached. Each small white square of the Figure represents one cell of the simulated area inside the tank. The cells are bounded by white lines where the potential is low, gray lines where the potential is medium, and black lines where the potential is high. The highest potential was reached inside the magnets, a typical one of which is labeled (226). Inside the magnets, the potential was held constant by the high-voltage power supply. Electrons were attracted toward the magnets by their positive potential. By design, the magnetic field kept electrons away from hitting the magnets. This effect was called "magnetic shielding" by Bussard.

For the simulated model reactor, the bias voltage on the magnets was selected to be 50 kilovolts. The voltage in the gas-cells (224 and 225) was adjusted to be half this bias voltage at the end of start-up. This adjustment was accomplished by watching the diagnostic display of the voltage changing step by step during start-up. At time-zero the voltage at the gas-cells was 50 kilovolts, the same as at the magnets surrounding them (227 and 229). As the number of ions increased with time, the voltage in the gas-cells (224 and 225) decreased. The rate of production of ions was adjusted by trial and error. The higher was the ions' production rate, the higher was the ions' density and the lower was the ions' potential voltage at the gas-cell. A voltage of 50% of the applied voltage (50 kilovolts) was selected as a compromise between ion density and ion energy, both of which are desired to be as high as possible.

The fraction 50% is not a magic number, only a convenient target for tuning the reactor. The velocity of the trapped ions depends on the voltage difference from gas-cell to center, not on the absolute voltage at the gas-cell or at the center. Different combinations of voltage and ion density may be tuned to maximize the fusion output. The embodiments are not limited to the particular voltage and density simulated. A wide range of voltage-density combinations is claimed as possible useful variants of the embodiments.

Newborn ions, in falling from the gas-cells to the center (270), gain 25 kilo-electron-volts (keV) of kinetic energy. Choosing this amount of ion energy optimized the fusion reactivity for deuterons fusing with deuterons. D+D fuel was chosen for optimizing the reactor design for a number of reasons. Deuterium is plentiful in seawater and so the cost of fuel was considered negligible in the economic analysis of the embodiments. Secondly, the gas in the gas-cell was pure deuterium gas, not a mixture of deuterium and tritium. This allowed a single gas-cell to be simulated without sacrificing the convenience of adjustable mixing of isotopes. For these reasons and others, the simulation describes a reactor running on D+D fuel. The same physical reactor design will also be shown to work efficiently to burn D+T fuel. Because of its higher cross-section and fusion energy, choosing D+T fuel provides the advantage of a smaller break-even reactor size, desirable to save construction costs.

The same simulation diagnostics were used to estimate the size of both D+D and D+T fueled reactors. The charge of the deuteron and triton are the same and the masses of the two ions are nearly the same. It was not necessary to rerun the simulation changing only one of the two ion masses to be the triton mass. The simulation's diagnostic results were simply adapted from D+D to D+T by changing one multiplicative factor in the formula for power density. Using the same simulation results for both fuels saved valuable computer time.

Electron Orbits and Reactor Scaling

FIGS. 3A and 3B

FIG. 3A shows the steady-state positions of all the electrons inside the tank (220). Each electron is represented by a black dot. Eight spokes of high electron-density radiate from the tank center to the tank walls. In four directions the spokes connect to the centers of faces, as with the labeled one (310) connecting to the center of the top face. In the other 4 directions, spokes connect to the corners, for example the labeled one (320) connecting to the top left corner. The 8 lines along the spokes are called "cusp-lines." Cusp-lines fall along the 8 directions where the magnetic field vector points radially, either outward-from or inward-to center. In the faces (310), the vector points inward, toward tank center. In the corners (320), the vector points outward, away from tank center. Electrons travel freely in and out of the central cloud along the cusp-lines. Along the 8 lines where the magnetic field points radially, the field does not impede radial motion. By nature, magnetic fields exert force only perpendicular to charged-particles' velocity vectors. Parallel to the cusp-lines and free of any magnetic forces, the electrons move under the influence of electric forces only, free of any magnetic forces.

Being free of magnetic forces, each electron moving along the cusp-lines feels only the electric force from the other electrons. Collectively, the effect of the other electrons are well described by the electrostatic potential function, as shown previously in FIG. 2C. The simulation running on-line showed approximately equal numbers of electrons moving both out-from-center and back-to-center along the 8 cusp-lines. As the electrons travel out from center, they are retarded by the electric force. From the arrangement of the positive voltages on the magnets, the electric field points toward the center along all 8 cusp-lines. The electric force prevents most electrons from hitting the tank walls. Most electrons stop, reverse direction short of the tank, and fall back toward the center along the same cusp-line they came out on.

Electrons gain energy by scattering from other electrons. This energy gain is called "up-scattering." Up-scattered electrons eventually hit the tank and are lost. This loss causes a drain on the plasma energy. The energy drain is balanced by injecting new electrons from the electron-emitter (230). Each new electron enters the core with a lower energy than that of the lost electron it replaces. The lower energy allows the new electrons to be captured in the well. Once captured, an electron makes many bounces back and forth along the cusp-lines. After many bounces, every electron up-scatters and hits the tank. The length of time that the average electron lives from its birth in the emitter until it hits the tank is called "electron confinement time." The longer the confinement time, the lower the power drain. Obtaining the longest possible electron confinement time was a design goal of the embodiments.

The process of electron replacement may be thought of as a one-for-one exchange of a bad electron for a good electron. This replacement goes on continuously. During steady-state, both the charge and energy of the trapped electrons are, by definition, constant in time. The physics principle of charge conservation makes the incoming current at the emitter (230) equal the outgoing current on the 4 walls of the tank (220). The emitter current is set as a fixed input parameter when the simulation is started. In an actual reactor it would be set by the human operator turning a knob that controls the reactor. Charge conservation automatically adjusts the loss current at the tank to equal the set current at the electron-emitter.

FIG. 3B shows simulated electron positions in a model reactor twice as big as in FIG. 3A. The important feature of 3B compared to 3A is the width of the cusp-lines. As the model reactor grows in size toward break-even, the magnetic field gets stronger in proportion to the reactor size. For a 2× larger reactor the magnetic field is twice as strong. The stronger field squeezes the electrons into tighter cusp-lines. This squeezing has the important effect that the apertures (222) of the gas-cells can be made smaller (350) as the reactor size increases. Smaller apertures mean lower gas leakage rate out of the gas-cells. The performance of the embodiments improves with increasing reactor size.

The leakage rate of gas out of the gas-cells is proportional to the area of the circular openings in the confining apertures (222 and 350) of the cells. The smaller the area, the smaller the flow rate. To avoid pressure rise, the vacuum tank (220) is pumped continuously by standard vacuum pumps, not shown in the Figure. The required pumping rate can be accurately calculated from a well-known formula for the rate of choked flow through a pumping aperture. The relevant formula is in the Wikipedia article entitled "Choked Flow." The formula shows that the rate of flow through each aperture is proportional to the area of the aperture times the internal pressure, but independent of the pressure outside the aperture.

The pumping rate of the vacuum pumps must be sufficient to maintain a low pressure outside the gas-cells. If the pressure rises above about 0.1 Torr, the background gas will breakdown in a process known as Paschen discharge. The pressure must be maintained smaller than this breakdown pressure to avoid shorting out the high-voltage power supply and spark-damaging internal components. The higher the gas leakage rate, the faster the pumps must pump. The cost of vacuum pumps is proportional to their pumping speed. The capital cost of vacuum pumps is a sizable fraction of the overall cost of building a reactor. As a feature of the First Embodiment, this cost has been minimized by careful design of the gas-cells.

Even more stringent than the pressure limit imposed by Paschen breakdown is the limit imposed by the need for maximum power balance. The leakage of gas out of the gas-cells forms a uniform-density background of gas throughout the tank. This background gas causes ions to be born where there should be only vacuum. These bad ions absorb energy from the potential well without paying it back in fusion energy.

Ion Confinement and Ion Production in Background Gas

FIGS. 4A-F

FIG. 4A shows a time-lapsed map of ion positions taken over a short time span centered at 13.5 microseconds after time-zero. Each ion's trajectory is indicated by a close-spaced track of black dots, one dot printed for each time-step.ABots are further apart where the velocity is high, as for a typical ion near center (428). Ions in or near the gas-cells (224 and 225) have low velocities. They are represented by dots spaced close together.

As is well known from the kinematics of electron-atom ionization, newborn ions have very low energies, in the electron-volt (eV) range. Once accelerated, they have energies in the keV range. As they bounce back and forth, each ion initially returns to its birthplace with the same low energy it was born with. This causes the dots representing each ion to be relatively close together in and near the gas-cells and relatively far apart near tank center.

FIG. 4D shows the potential along a line through the gas-cells and through the center of the tank. Newborn ions fall from their birthplace (either 460 or 462) down the slope of the potential toward the center of the tank. At the center the ions pass through the minimum of the potential (270); here they have maximum velocity, having converted most of their initial potential energy into kinetic energy.

The interior shape of the 2D potential was shown in FIG. 2C by the border of the central white-space (272). This interior shape is scalloped, not circular as claimed by Bussard. Because of this scalloping, ions change directions on each bounce at the edge of the potential well. Each ion turns toward center along a slightly different trajectory than the one it came out on. This causes the ion trajectories to depart more and more from their initial (horizontal) paths. At later times the interior space of the reactor becomes filled uniformly, as seen in FIG. 4C (450).

The early-time trajectories in FIG. 4A can be seen to deviate somewhat from the horizontal direction of their initial fall. Still, at this early time, most ions have horizontal trajectories. These horizontally moving ions are the "good" ions. A few "bad" ions are also visible in the Figure. Typical "bad" ions, (430), (432), and (434), exhibit trajectories differing from the predominantly horizontal direction of the good ions.

FIG. 4A shows several "bad" ions with velocities deviating from the majority. One such ion (430) was born in the corner of the tank, far from the gas-cells; it immediately accelerates toward the tank wall. It will be lost with no chance to fuse; even worse, this ion took kinetic energy from the potential on its way to the wall. This kinetic energy is lost to heat when the ion hits the tank wall. Some of this lost energy can be recovered, but most would be lost due to the relatively low efficiency of the Rankine cycle.

Another ion (432) was born near the bottom magnet (228); it is shown falling toward center, but with reduced speed from what it would have had if it had been properly born in one of the gas-cells. A third ion (434) was born near the center of the tank; it has severely defective speed because it had so little distance to fall. The two bad ions born inside the core (432 and 434) may eventually fuse. But to get enough energy to fuse they will rob energy from the good ions by up-scattering from them. This kind of robbery degrades the reactor's power balance and so was avoided, as much as possible, by design.

The ions born inside the core are more damaging to power balance than ions born outside. They are more numerous because there are more electrons inside the core to ionize the background gas. The density of gas is uniform inside and outside the core, but there are not so many electrons outside to ionize the gas. Thus, most bad ions are born inside the core.

Ion for ion, the ions born inside are worse than those born outside. Ions born inside rob the good ions of their energy by collisions. If a bad ion hits a good ion, the energy of the good ion is reduced. The amount of reduction varies from collision to collision, but the result is to reduce the good ion's chance to fuse. In effect, every collision between a bad ion and a good ion creates two bad ions. The effect of a bad ion born inside the core is multiplied by its collisions. The effect is much worse than the effect of a bad ion born outside the core. Reducing the rate of ion creation inside the core to an acceptable level was a design goal of the embodiment.

Bad ions are created by electrons' ionizing the background gas that has leaked out of the gas-cells. These ions are "bad" because they have low speed and therefore low fusion reactivity. They rob energy from the power supply or from the good ions, reducing the power balance of the reactor. By design, the percentage of bad ions was kept to a minimum by confining the gas to remain mostly inside the gas-cells. The object of the design is to make the density of the background gas much lower than the density of gas in the gas-cells. To accomplish this, the apertures confining the gas were made as small as possible.

FIG. 4C shows a snapshot of ion positions made 92 microseconds after time-zero. By this time most ions have deviated from their initially horizontal trajectories. In steady-state the ion cloud (450) uniformly fills a bounded area inside the magnets. The shape of the boundary of the ion cloud (450) is the same as the scalloped shape of the potential (272), discussed in reference to FIG. 2C. The DIRECTIONS of the ion velocities are random inside the boundary. However, the instantaneous SPEED of each ion is determined by its momentary position in the potential well. Ions near the center of the well have maximum speed. Ions near the edges (460 and 462) of the well have speeds approaching zero.

FIG. 4B shows a map of the gas density in each PIC cell of the simulation. PIC cells are represented as small black squares where ever the gas density is lower than the gas density inside the gas-cells. PIC cells located inside the 2 gas-cells, where the density is higher, are shown as filled-in white rectangles. This Figure was made by manually replacing each colored cell displayed by the simulation program by black or white squares, as appropriate for low or high gas-density.

To see how much background gas density can be tolerated, the simulation was repeated with different levels of background gas density. Results of these simulations were reported by the applicant at the 15th Workshop on Inertial Electrostatic Confinement Fusion, held Oct. 3-5, 2013, in Kyoto, Japan. A verbatim record of the applicant's presentation, entitled "New Design Features for Polywell," is available on the web. The applicant's slide presentation, hereinafter called 2013-Rogers, is referenced in the applicant's Information Disclosure Statement.

Figure 4E:
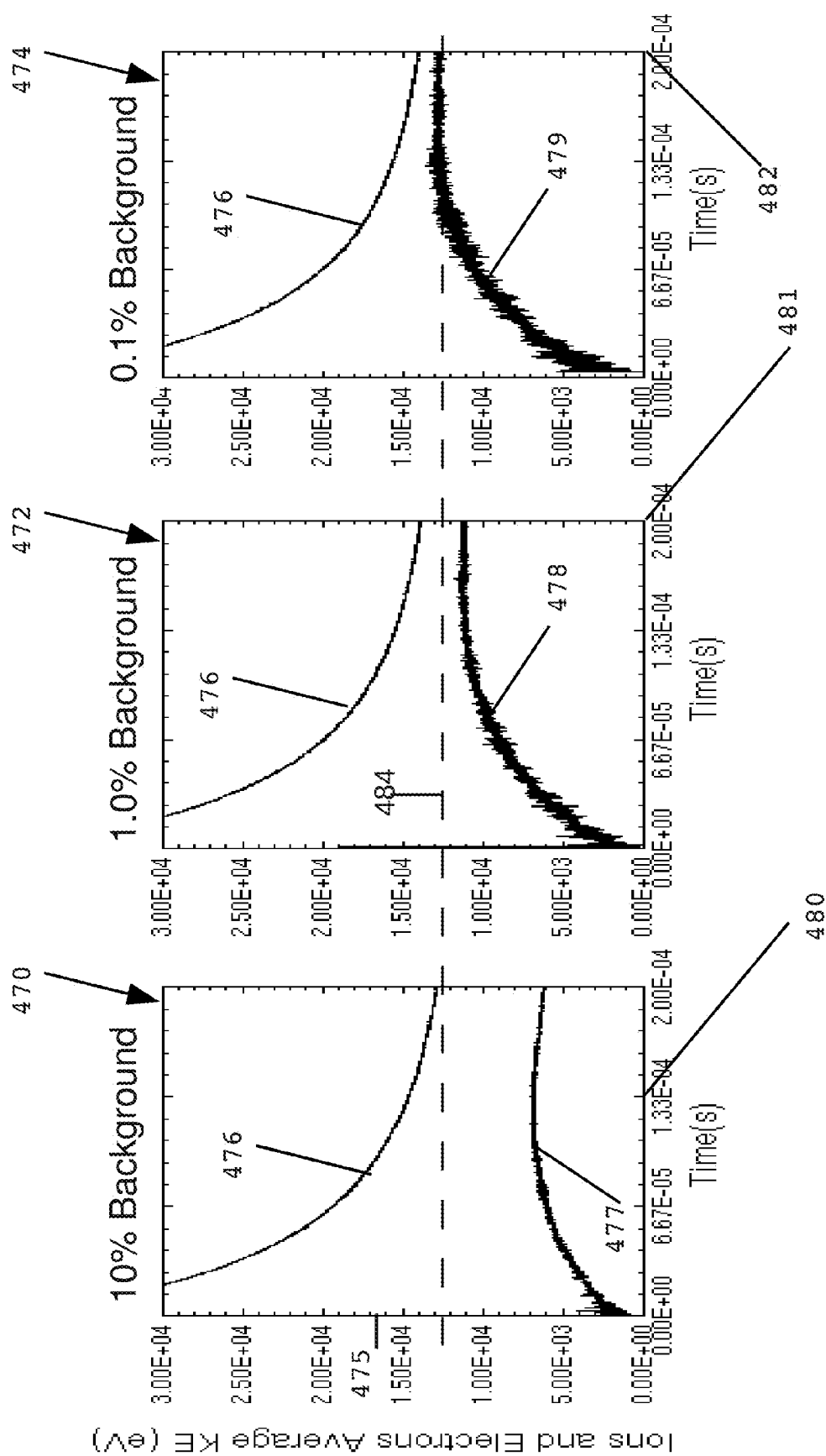
FIG. 4E shows 3 time-sequences of plasma energy, with 3 densities of background gas.

FIG. 4E is adapted from the 2013-Rogers slide entitled "200 Microseconds of Start-up Plasma Generation." Diagnostics from three different simulations are shown, one with 10% background density (470), one with 1.0% background density (472), and one with 0.1% background density (474). The three panels show the average kinetic-energies of electrons (476) and the respective, average ion-energies (477, 478, and 479) as functions of time during start-up. The energy scale (475) is marked in electron-volts (eV). The "Time" scale (480) shows the simulated time in seconds, measured from time-zero. Over the first 200 microseconds, the electrons' average energy (476) falls from 50 keV to about 12 keV. The final electron energy is approximately the same in all three simulations, shown by the dashed line (484).

For the highest background gas density, shown in the left-hand panel (470), the ion energy (477) rises with time until around 133 microseconds (480), then declines with time. The average energy does not reach a high enough value to make useful fusion. As the ion density rises, the average energy of the ions declines toward zero.

For the 1.0% background gas run (472), the ion energy approaches the electron energy, but still shows a slight tendency to decline after 200 microseconds (481). The start-up background-gas-level was reduced still further in the far right-hand panel (474). Here the average ion energy becomes level at the latest time (482), indicating steady-state has been reached. The average ion energy levels off at 12.5 keV, shown by the dashed line (484).

It is to be expected that the average ion energy should be half the well depth at steady-state. This average value is a result of both the periodic motion of the individual ions and also the shape of the well that holds them. The well, shown in FIG. 4D, is approximately triangular between the bounce points of the ions (460 and 462). The average kinetic energy of each ion in such a triangular well is the average of the ion's 25 keV energy at center (270) with its zero energy at the bounce points (460 and 462). The average of any number with zero is half the number. The average ion-energy (484) in FIG. 4E (474) is the same as would be expected from this analysis of the well shape from the FIG. 4D plus the expected ions' periodic motion in the well. This agreement confirms that the ions' motion is maximum at the center and near-zero at the outside edge of the well.

The diagnostics in FIG. 4E show that, for useful fusion yield, the background gas density must be kept 100 to 1000 times smaller than the density in the gas-cells. Except for the simulations in FIG. 4E (470 and 472), all the simulations of this Specification have been done with a background gas level $1/1000$ the level in the gas-cells. This produces the maximum power output of the three levels tested.

Maximum power output would require the most expensive vacuum pumps. In a commercial reactor, extra fusion power might not be worth the extra cost for capital equipment. This Specification of the First Embodiment covers a wide range of cost-to-performance ratios, any which might be judged useful by the eventual users of the new technology, i.e. the power companies.

One useful variation on the gas-cell design as simulated will utilize a technique known as "multistage differential pumping." Multistage differential pumping was successfully used in a physics experiment as described in the journal publication "The DRAGON facility for nuclear astrophysics at TRIUMF-ISAC," hereinafter called 2003-Rogers. This publication was written by the applicant with minor assistance from his 21 experimental collaborators. The publication describes operation of apparatus in which the gas pressure in a gas-cell was reduced six orders-of-magnitude from inside to outside the cell. It was found that the most economical use of vacuum pumps dictated six pairs of apertures be used to confine the gas. Six orders-of-magnitude was accomplished with six pairs of apertures. This established a rule-of-thumb that one pair of apertures should be added to the design for each order-of-magnitude pressure drop required.

The embodiment described in this Specification requires, as a maximum, a factor of $1/1000$ gas density drop. At these pressures gases behave ideally, both inside and outside the gas-cells. For ideal gases, pressure and density are known to be proportional. The required factor of $1/1000$ drop in density is equivalent to three orders-of-magnitude drop in pressure. The experience of 2003-Rogers dictated that 3 pairs of apertures would provide economical pumping for the present embodiment. FIG. 4F shows a gas-cell design having 3 pairs of apertures, instead of only one pair. The design would be more complicated to fabricate and operate than the design shown in FIG. 2 (225), as simulated. The extra complexity would make for more economical vacuum pumps at the cost of extra engineering in fabricating the gas-cells. The more complex design could prove to be the preferable design in practice, considering trade-offs between engineering and operating expenses. The principle of differential pumping is the same whether by single or multiple stages. Both are covered by the Specification of the First Embodiment.

FIG. 4F shows section drawing of a gas-cell, including 3 stages of pumping and 3 pairs of apertures (486 and 487). Gas is fed into a central cell (488) at a pressure chosen to produce the rate of ions needed to maintain steady-state. Electrons (489) recirculate back and forth through the gas, causing it to ionize. The ions pass out of the gas-cell through the inner set of 3 apertures (486), to be captured in the potential well. For simplicity, the outer apertures (487) are shown the same size as the inner apertures (486), but in reality the sizes of each aperture would be preselected to fit the size of the electron beam at the different positions of the apertures. Each aperture would be made just big enough to pass the electrons without cutting into the beam. In general, the smaller the apertures the better they will contain the neutral gas and the lower will be the pumping requirements for the whole reactor.

Three "different" vacuum pumps are shown (490, 492, and 496), hence the name "differential" pumping. One pump (490) pumps on the volume of the vacuum tank (220). This pump is powerful enough to maintain the background gas pressure throughout the tank at a pressure approximately three orders-of-magnitude lower than the pressure in the gas-cell (488). To maintain this low pressure, the pump (490) is assisted by simultaneous pumping by the other pumps (492 and 496).

The second pump (492) connects through the tank wall onto one end of an insulated, hollow leg (493), as described in 2010-Rogers. The leg (493) connects on its other end to an enclosed volume (494) surrounding the gas-cell. The pump (492) is preselected to make the pressure in the volume (494) approximately 1/10, or one order-of-magnitude lower than, the pressure in the gas-cell (488). A third pump (496) connects to a a similar leg (497), which in turn connects to a volume (498) outside and surrounding the inner volume (494). This third pump (496) maintains the pressure in the outer volume (498) to be 1/100, or two orders-of-magnitude less than the pressure in the gas-cell.

Each of the three pumps (490, 492, and 496) reduces, by approximately an order-of-magnitude, the pressure of gas passing through the pumped volumes (220, 494, and 498). The foregoing discussion and FIG. 4F illustrate the principle of multistage differential pumping. It is to be understood that the principle, as described, applies broadly to gas-cells and pumping volumes of different sizes, different pressures, different numbers of pumping stages, and other variations that might be found to improve the cost-to-performance ratio of model reactors. Such variations are within the scope of the claimed First Embodiment.

To simulate the action of the gas inside and outside the gas-cells the simulation program used Monte Carlo techniques to model the physics of the electron-atom ionization process.

The Structure of the Simulation Program and its Use

FIGS. 5A, B, C, D, E, and F

At the beginning of each simulation run, the computer reads and compiles source code from a file stored on the computer's disk. A complete listing of code for a typical run can be found in the preceding section of this Specification. FIG. 5A reproduces the first page of source code. A "Variables" Block is begun by an opening brace (510) in the Figure. The Variables Block listing continues over FIGS. 5B, 5C, and 5D, ending with a closing brace (564) in 5D.

In FIG. 5A, the Variables Block contains two types of code lines, "comments" and "assignments." Comment lines begin with a double-slash (//). A typical comment line (512) introduces a block of related code, in this case describing the magnets (524).

"Assignments" create symbol names and assign numeric values to each. A typical assignment statement is the one defining the symbol "radiusScale" (514). The defined symbol is followed by an equals sign (516) which is followed by an alphanumeric expression (518).

The value assigned to "radiusScale" specifies the simulated magnets' size relative to a standard magnet specified in a catalog. Other assignments about the magnets depend linearly (520) or quadratically (521) on "radiusScale." The only change in the input file needed to double the model reactor size was to double the value of "radiusScale." The value of "radiusScale=0.75" (518) shown in FIG. 5A produced the simulation shown in FIG. 3A. To make FIG. 3B, only the one assignment statement (514) was changed to read "radiusScale=1.5," not shown.

The structure of the code specifying the magnets (524) incorporates well-known engineering relationships between magnet size and B-field strength. A small magnet was selected for simulation from the GMW Associates catalog. The relevant page of the catalog is shown in FIG. 4C of 2010-Rogers as incorporated herein. Among all the magnet sizes shown in the catalog, magnet current (522) was seen to scale quadratically with size (521). Assigning a "radiusScale" value larger or smaller than unity simulated a non-standard magnet not found in the catalog. Once optimized in simulation, such non-standard magnets were available to be ordered from any of several magnet manufacturers, including GMW.

The Variables Block consists of comment lines interspersed with assignment-statements. A blank comment line (513) introduces a sub-block of code (526) describing operational parameters of simulation. A crucial operational parameter is the PIC cell-size, assigned as "cellSize" (528). The computer run-time to reach steady-state is proportional to the number of cells in the simulation. Cells uniformly tile the entire area inside the tank walls. This makes the computer run-time inversely proportional to the 2nd power of the PIC cell-size. The smaller the cell-size, the slower was the simulation's run-time.

To minimize the real-time to reach steady-state, the value of "cellSize" (528) was made as large as possible. There was a practical limit to how large it could be. If it were made too large, artifacts showed up as asymmetries between opposite and adjacent corners' electrons' densities; all 4 corners should have similar plasma densities by symmetry arguments. Artifacts from too-large cell-size are called "under-sampling" artifacts.

To avoid under-sampling artifacts, the PIC cell-size needed to be smaller than the smallest feature of the plasma's spatial distribution. Empirically, the smallest feature was found to be the diameter of the cusp-electrons' distributions, shown in FIG. 3A (340). This feature got smaller as the model's size increased, as seen in going from FIG. 3A (340) to FIG. 3B (340). To accommodate this shrinking feature, "cellSize" (528) was coded to be inversely proportional to "radiusScale." The optimum proportionality constant turned out to be 96 (527). This constant produced a span of 72 (=0.75*96)

cells across the tank-dimension, as coded by variable "diameterinCellsY" (529). Thus, the total number of cells in the simulation was 72*72=5184.

FIG. 5B shows the section of the Variables Block controlling electrical characteristics of the electron-emitter (531). This section contains the assignment of "timeStep" (532), the time-interval from one iteration of the simulation to the next. The value of "timeStep" is most important to the efficient functioning of the simulation program. The computer time to reach steady-state was inversely proportional to the value of "timeStep." To make the simulation run fast, "timeStep" was made as large as possible. Its value depends on the maximum electron velocity "Uemax" (531), which in turn depends on the electron drive energy, "elecEnergy" (530).

The expression assigned to "timeStep" (532) computes the time it would take the fastest electron to traverse one cell. If the simulations' time-step was made larger than this time, electrons in one cell could skip over a neighboring cell inside a single time-step. Such skipping was forbidden by the internal structure of the simulation software. The program only considers placing particles into the same cell or into the 8 adjacent cells. It does not consider the possibility that a fast particle might travel across more than one cell in one time-step. Skipping a cell would cause the program to paralyze, aborting the simulation and losing the diagnostics. In the code line just prior to assigning "timeStep," the velocity of the first (and fastest) electron from the electron-emitter is assigned to "Uemax" (531). This velocity was a function of the electrons' initial potential energy in volts (530), the electrons' mass in energy units (511e3 electron-volts), and the speed of light (3e8 meters per second). Computed thusly, the value assigned to "Uemax" (530) was then the velocity of the first electron to fall into the core. To allow for up-scattering, initial "Uemax" was scaled up by an empirical factor. The assigned "timeStep" (532) was verified by trial-and-error to be small enough to avoid paralysis. The assigned value produced the shortest possible computer time for the simulation to reach steady-state.

Another section of Variables Block specifies the geometrical characteristics (534) of the electron-emitter and electron-extractor. The added feature of electron-extractor distinguishes the Second Embodiment from the First Embodiment. This code listing is for the Second Embodiment. To convert it to simulate the First Embodiment, it was only necessary to change the two variables "emitGunInset" (534) and "extractorinset" (537) to both be equal to zero.

FIG. 5C shows the portion of the Variables Block specifying fuel-gas distribution. The upper section (540) specifies the size and location of the gas-cells. The lower section (550) specifies the pressure, density, and temperature of the gas inside and outside the gas-cells. Background gas density (554) is specified as a multiplicative factor "0.001" (553) times the gas-density "gasDensity," specified inside the cells (552).

FIG. 5D shows the end portion of the Variables Block. The mounting positions of 4 identical magnets, with sizes and spacings described in FIG. 5A (524), are here specified by assigning the horizontal (X) and vertical (Y) positions of 8 wires. Although the magnets in the catalog are wound from many turns of wire, the simulation simplifies each coil to be a single pair of wires. The wires are located at the centers of the 8 rectangles shown in FIG. 2A (226, 227, 228, and 229). The rectangles represent metal boxes fitted to the scaled magnet coils. The boxes keep all the plasma particles away from the wires. To a good approximation, the magnetic fields at the surfaces of the boxes are the same as they would be from the actual coils. The magnetic field from one wire is well known to be a simple function of the distance to the wire. The total magnetic field in the simulated plane was represented by the superposition of 8 single-wire fields. The single-wire formula reads from pg. 20 of the Plasma Formulary.

The wire positions depended on the magnet dimensions (524) and also, importantly, on the size of the gaps between the magnets, "magCornerGap" (563). This variable was first assigned in the Variables Block, as shown in FIG. 5A (525), and then used in FIG. 5D (563) to assign the 8 wire positions. Varying the gaps by assigning different values to "magCornerGap" was used to adjust the relative electron losses through face cusps vs. corner cusps. The scope of the embodiments includes a range of gap values, not just the value shown assigned (525).

Following the last line of the Variable Block (564), the Region block begins. This block encompasses the remainder of the compiled source code. FIG. 5E shows the first section of the Region block. The Region block consists of compiler-defined structures describing objects of the simulation. The first of these structures, "Grid" (570), assigns the spacing of the PIC cells and dimensions of the simulation area.

The next block of code, "Control" (571), assigns operational parameters of the simulation. Of special interest is the assignment of a magnetic-field spanning the area of the simulated central plane. Compiler symbol "B01analytic" (574) represents the x-components of a 3-vector of magnetic field values to be used by the simulation. The assignment statement of "B01 analytic" (574) looks like a simple scaler assignment. But actually, 72×72 values were assigned to a 2D matrix of x-components. By compiler convention, special symbols x1 (572) and x2 (573) in the assigned expression take on each and every one of the cells' x- and y-coordinates, respectively. A similar code line (576) assigned the symbol "B02analytic" to be a 72×72 matrix of the y-components of the vector field. "B03analytic," not shown, was implicitly assigned by the compiler to be a 72×72 matrix of zeros. By z-symmetry, the z-component of B-field vanished everywhere in the central-plane. There was no need to explicitly assign "B03analytic."

Some additional explanation of the "B01 analytic" assignment (574) is needed. According to the formula for magnetic field from the Plasma Formulary, pg. 20, the magnitude of the field at a point near a wire is inversely proportional to the distance from the point to the wire. At zero distance from a wire the formula evaluates to an infinite value. The compiler was not asked to assign an infinite value; otherwise it would have crashed. To avoid crashing the compiler, the value of the binary expression "(x1−X1)" (572) was carefully coded to guarantee it always had a non-zero value. This was accomplished by reassigning the value of the wire position "X1" in FIG. 5D (561), shifting it by a fraction of a cell from its position as initially computed (560). The shift was accomplished using the compiler's modulus (%) operator, as shown in FIG. 5D (561). The accurate value of "X1" was first computed (560); then the modulus operator was used (561) to subtract off a fraction of one cell-size, moving "X1" to the nearest cell boundary. Corrected to be on a boundary, "X1" avoided the centers of cells ("x1"). This made "(x1−X1)" non-zero for all the 72 values of "x1."

The correction just described shifted the position of the wire by a distance much smaller than the size of the magnet coils, "magID" and "magOD." The field at the surfaces of the magnet boxes was accurately represented and crashing was avoided. Other magnet wire coordinates, "Y1," "X2," etc. were similarly corrected in subsequent code following (561).

Continuing the discussion of the Region block, FIG. 5F shows two subsequent blocks of of code defining important compiler objects. The "Species" block (580) assigns the known mass and charge of electrons to the newly-defined name, "electrons." A similar block of code, not shown in the Figure but shown previously in section "Simulation Source Code Listing," assigns deuteron charge and mass to the name "ions."

Another important object in the Region block is defined by the "MCC" block of code (582). This block opens with a brace following "MCC" (582) and closes with a brace (588) at the bottom of the Figure. "MCC" stands for "Monte Carlo Collisions." MCC is the computing algorithm of choice for simulating gas ionization, as described in 1991-Birdsall. The "MCC" code block assigns values describing the properties of the gas in the gas-cells. The code statement "gas=H" (584) specifies the gas to be hydrogen. The statement "analyticF=" (585) populates each PIC cell with an initial number of gas atoms, depending on the specified gas-densities inside and outside the 2 gas-cells. At each time-step, a probability of ionization is computed for each PIC-cell, based on tabulated values for the known electron-hydrogen ionization cross-section. The probability is weighted by the number of electrons times the number of atoms in the PIC-cell. A random number (hence the term Monte Carlo) is generated by software to determine whether the ion is lucky enough to be born, according to the weighted probability. When an ion is born, an atom disappears and an extra electron, the one originally in the atom, is also born.

Minor differences in cross-section between hydrogen, deuterium and tritium gases were ignored. This is a good approximation, as observed in measured ionization cross-sections by those skilled in the art. That the 3 isotopes have the same cross-section also makes logical sense. An extra neutron or two added to the relatively tiny hydrogen nucleus does not change the cross-section for an incoming electron removing the much-bigger bound-electron.

The assignment of the variable "ecxFactor" (586) illustrates a subtle feature of the Region block. The equals sign in this case connects two identical symbols. On the right-hand side is the variable "ecxFactor, assigned in FIG. 5C (555). On the left-hand side is the same symbol, "ecxFactor", but with a different meaning. Used on the left-hand side of equals in the Region block, it specifies that the simulation program will take a predefined action. The action in this case is to adjust the Electron Cross Section (ecx) by a constant multiplier. The assigned numeric value of "ecxFactor" (555) modifies every electron-atom interaction by multiplying the tabulated cross-section value by the assigned "ecxFactor" value.

The applicant's habit of reusing action symbols as variables of the same name simplifies the code. By reducing the number of symbols, fewer symbol names need be remembered by the programmer. This was usually done in cases such as the symbol "ecxFactor," where the assigned variable is only used in one type of assignment in the Region block code. In this example, "ecxFactor" (555) was assigned the value unity; thus, it had no effect as a multiplier. In other simulation runs it was assigned non-unity values.

Optimizing the embodiments required many runs of the simulation program. Input variables were changed in trial-and-error fashion from run to run. To follow the plasma growth from time-zero to steady-state typically required 100 hours of computing time for each simulation run. The simulation software allowed some crucial parameters to be manually adjusted mid-way during the start-up period. The simulation could be halted by choosing an on-line menu selection called "dump." The action of "dump" was to save the instantaneous state of the plasma-distribution and the gas-distribution on the computer's disk. "ecxFactor" and, optionally, other variables of the input file were then edited and a new input file written to disk. After the "dump," the modified input file and plasma/gas distributions were read by the computer and time-steps resumed from the time of the "dump." The technique of varying crucial parameters during start-up allowed the computer to reach steady-state faster than it would have restarting from time-zero.

A Formula for Extrapolating Power Balance to Find Break-Even Reactor Size

Optimizing the design of a net-power reactor will be accomplished by building and testing a series of larger and larger scale-model reactors. To start this development chain, the simulation was used to design the smallest practical scale-model reactor. A small magnet was selected from the catalog of a well-known commercial supplier of electromagnets. A cubic reactor based on the catalog selection was simulated. The vacuum tank was made large enough to contain six identical magnets in a cubic array. With adequate corner gaps, this tank size turned out to be 0.622 meters (m) diameter. Next, the electron drive current and ion production rate were optimized by trial and error. Different combinations of these two (electron and ion) parameters were tested. An optimum set of parameters was chosen as the one that produced the biggest power balance.

Power balance is defined to be the ratio $P_{out}/P_{in}$, where $P_{out}$ is the fusion power output at steady-state and $P_{in}$ is the drive power input under the same conditions. $P_{out}$ and $P_{in}$ were determined separately from the steady-state plasma diagnostics. Maximizing the power balance fixed the design of the small-scale reactor.

The component factors of the power-balance expression scale with reactor size according to known relationships. Once the power-balance of the small-scale model was determined by simulation, the power-balance of larger and larger models could be predicted. A formula was derived to express power-balance as an analytic function of reactor size. By definition, the power balance is unity at break-even. Setting the derived formula for power-balance equal to unity, the resulting equation could be inverted to find the size of the break-even reactor. Small size is desirable to compete with other types of power plants. The invention produces a prediction of smaller break-even reactor than other fusion-energy designs such as tokamaks.

The scaling of the magnet size to break-even size was accomplished by increasing the inside-diameter, outside-diameter, and height of the coils by a multiplicative factor. By the nature of electromagnets, the magnetic field increased by the same factor. The linear increase in field strength with reactor size produces an exponential scaling of the power balance with size. The exponential relationship between power balance and size is the following: $D_b/D_m=(Q_b/Q_m)^s$, where $D_b$ is the outside-diameter of the magnet in the Break-even reactor, $D_m$ is the corresponding magnet diameter in the small scale Model, $Q_b$ is the power balance of the Break-even reactor (=1 by definition of break-even), $Q_m$ is the power balance of the Model reactor simulated, and "s" is a scaling exponent determined as described below. This equation was solved for $D_b$ to calculate the size of the magnets in a break-even reactor.

The model's power balance $Q_m$ (=$P_{out}/P_{in}$) was calculated by separately determining the numerator $P_{out}$ and denominator $P_{in}$. $P_{out}$ is well known to scale with magnet size as the product of density-squared times volume. The variation of density with size contributes a 4th power scaling to $P_{out}$. The variation of volume with size contributes an additional 3rd power scaling. The product of these two factors causes $P_{out}$ to vary as the 7th power of magnet size. The 7th power scaling of $P_{out}$ with size derives from basic physics principles familiar to anyone skilled in the art of plasma physics. On the contrary, $P_{in}$ depends on the details of the construction of the embodiments according to the invention. This section describes the determination of $P_{in}$ for the First Embodiment.

The denominator of $Q_m$ is $P_{in}$. $P_{in}$ is largely determined by the power loss of electrons hitting the inside of the tank. Some of the lost electrons escape the core through the face cusps out the centers of the six magnets. Some of the electrons escape through corner cusps. The area of the face cusps shrinks with the size of the model reactor, as seen in FIGS. 3A and 3B. The area of the corner cusps expands with the size of the model. The net effect of these two loss channels on electron power loss depends on the relative area subtended by the face cusps compared to the corner cusps. This is a detail of reactor performance which was indirectly extracted by analysis of simulation diagnostics. The details of the analysis are described in the next section. The result of the analysis is that $P_{in}$ varies as the 2nd power of size. Combining the 7th power scaling of the numerator with the 2nd power scaling of the denominator causes the ratio to scale as the 5th power of size. In other words, for the First Embodiment, "s" equals 5. Knowing the value of "s" allowed the expression for break-even power balance, $D_b/D_m = (Q_b/Q_m)^s$, to be solved for $D_b$ to find the size of the break-even reactor.

Fusion power output, $P_{out}$, was computed from a textbook expression for power density as a function of plasma density and reactivity. From Glasstone and Lovberg's textbook, the power density of a D+D plasma is given by the following expression: $\frac{1}{2} n^2 \langle R \rangle E_f$, where "n" is the ion density measured in units of ions per unit volume, $\langle R \rangle$ is the ions' reactivity, and $E_f$ is the energy gained per Fusing ion-pair. The masses of the ions and the ionization cross-section differed little between deuterium and tritium gas. This allowed the computer simulation to be run just once for both fuels, thus saving computer time.

The simulation was tailored to describe the D+D fueled reactor. The D+T fueled reactor performance was derived by multiplying the fuel reactivity by the ratio of cross-sections from FIG. 1B, while keeping the density and velocity the same as simulated for D+D. The following sections disclose separately the technique for evaluating the ions' density and reactivity.

Evaluating the Ion Density for Calculating the Power Balance

Figure 6B:
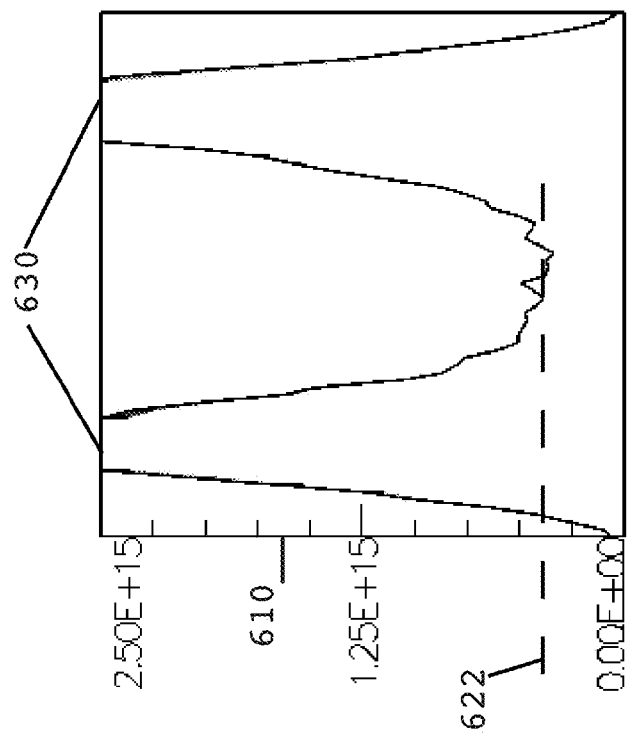
FIG. 6B shows electron-density along the same section line as in FIG. 6A.
Figure 6A:
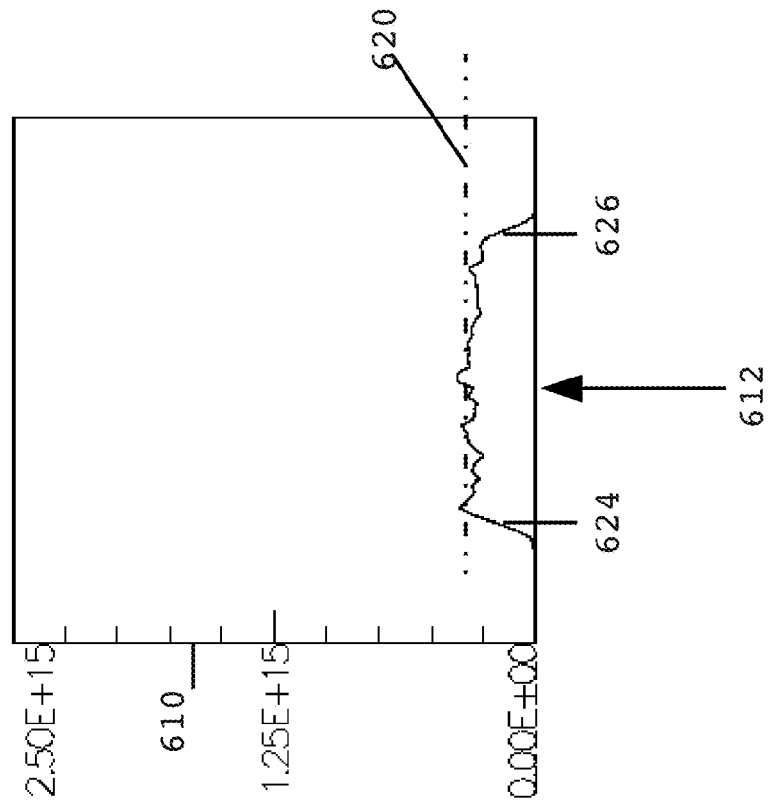
FIG. 6A shows ion-density per square meter, along a section line through cube center.

FIGS. 6A, B, C, D, E, and G

The textbook formula for power density contains the square of ion density "n" as a factor. This ion density is a 3D volume density, measured in units of ions per unit-volume. The simulation predicts 2D ion density ($N_i$) measured in units of ions per unit-area. The symmetry of the cubic reactor allowed straightforward calculation of the 3D density "n" from the simulated 2D density, $N_i$.

FIG. 4C showed that the 2D density $N_i$ was uniform inside a square boundary. Since the density was uniform in x and y, symmetry demanded it was also uniform in z. The cubic ion cloud is well modelled as a stack of plasma slabs identical to the central one simulated. The 3D density was calculated as the simulated 2D density divided by the simulated slab thickness. The simulation of $N_i$ would be the same for any assumed slab thickness. However, the need for magneto-hydrodynamic (MHD) stability imposed a minimum slab thickness, which was also the optimum thickness from the point of view of maximizing "n." For the optimum slab thickness, the outward electron pressure just balances the inward magnetic pressure at the surface of the plasma cloud.

FIG. 6A shows the simulated ion density $N_i$ along a line through the center of the cube and the centers of the gas-cells. The vertical scale (610) is marked in units of ions per square meter. This Figure gives quantitative meaning to the above statement that the steady-state ion density $N_i$ is uniform inside the plasma cloud. The horizontal scale (612) spans the tank diameter, 0 to 0.622 m. The Figure shows the ion density is uniform from the center of the slab (612) out to sharp cutoffs at the positions of the gas-cells (624 and 626).

FIG. 6B shows the simulated electron density along the same central section line as in FIG. 6A. The vertical scale (610) is the same as in both Figures. The central electron density, shown by the dashed line (622) is slightly higher than the corresponding central density for ions, shown by the dotted line (620). A slight excess in number of electrons in the central region is an essential feature of the embodiment. The excess negative charge attracts ions toward the center of the cube. The resulting potential well first accelerates and then traps the ions from the gas-cells.

The potential difference required to accelerate ions to 25 keV, optimum for D+D fusion, is the same for small-sized or large-sized reactors. As the size of the model reactors increases toward break-even, the central density of electrons will become more and more nearly equal to the density of ions. The condition of near-equality of density is called "quasi-neutrality," a general characteristic of stable, bulk plasmas. At break-even size, the same number of excess electrons will spread over a larger volume than in this small-scale model. The fractional excess of electron-density naturally decreases to be approximately one part per million at break-even. The difference between the dashed line (622) and dotted line (620) is a measure of the goodness of the quasi-neutral approximation. Even in this case of the smallest of scale-model reactors, the approximation is already quite good.

Quasi-neutrality made the central electron density approximately equal to the ion density. This allowed the ion density to be well enough determined by finding the central electron density. The next step in determining the ion density, needed for power balance, was to find the central electron density.

The electron density shown in FIG. 6B has prominent peaks (630) at the positions of the two gas-cells. These peaks show an increased concentration of electron density along the cusp-lines passing through the right and left magnets. Low-energy electrons are produced continuously by the process of gas ionization. The process is complex, but accurately simulated as described by the MCC feature of the simulation, as discussed above. Gas ionization acts as an auxiliary source of free electrons inside the gas-cells (224 and 225). These "ionization-electrons" add to the electrons from the regular electron emitter (230).

From the well-known kinematics of the ionization process, ionization-electrons have much lower energy than the electrons inflowing from the emitter (230). Due to their lower energies, ionization-electrons become temporarily trapped in the cusps by the combined effect of magnetic and electric forces in the cusp regions. The potential peaks in FIG. 4D (460 and 462) were designed to accelerate and trap ions inside the potential well. As a side-effect, the peaks also trap low-energy electrons outside the potential well. Eventually, ionization-electrons up-scatter and enter the core, but this process takes time. How long the ionization-electrons reside in the cusps depends on the relative rates of the independent processes of ionization and up-scattering.

FIG. 6H shows a 2D map of steady-state electron density (697) inside the tank (220). Selected PIC cells were included or excluded based on their electron density. Cells with density values more than one-half the central-density (622 and 698) and less-than 5× the central-density were plotted as small black squares delimited by gray lines. Cusp-trapped electrons appeared as 8 elliptical white regions, two of which are labeled (699). In these 8 regions the density was more than 5-times the central density. The area of each white region is proportional to the number of electrons trapped in the respective cusp. Judging from the areas, the counts in cusps containing the gas-cells (224 and 225) exceeded the counts in the other cusps (699), by about a factor-of-two. Ionization-electrons must wait for up-scattering to move them from their birthplace.

The physics creating cusp-trapped electrons was disclosed by a University of Sydney research group in 2004 in a journal article entitled "Low beta confinement in a Polywell modeled with conventional point cusp theories." The article, hereinafter called 2004-Sydney, showed by 3D simulation that confined electrons naturally form themselves into two separated clouds.

Figure 6G:
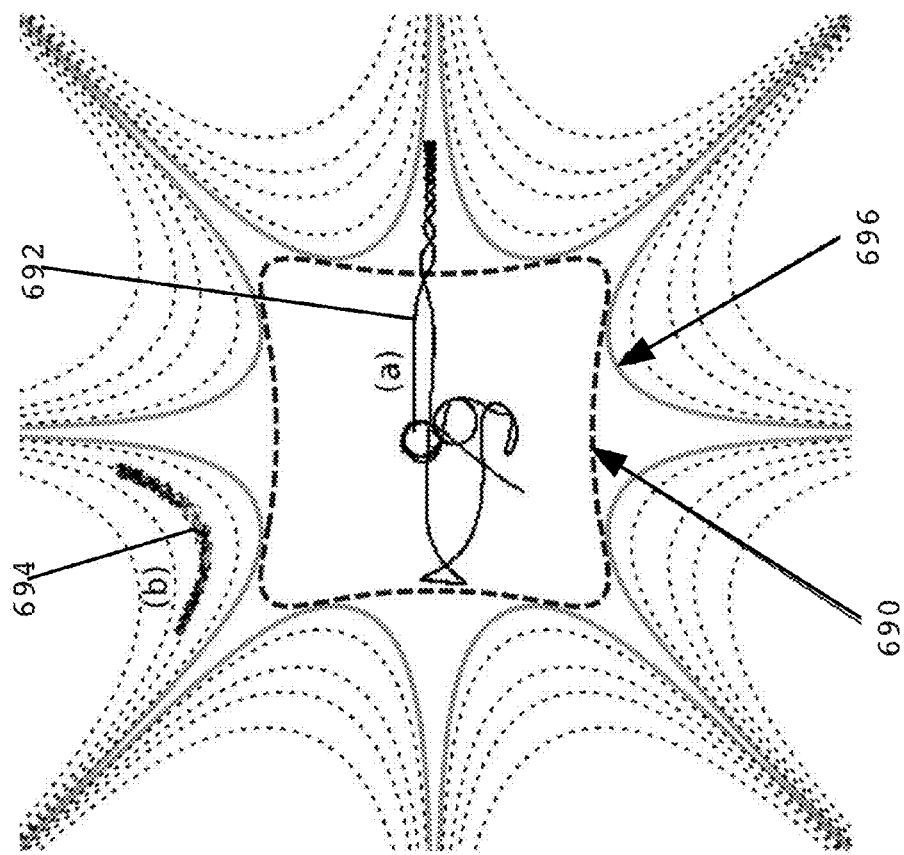
FIG. 6G shows 3D simulation of magnetic field lines and electrons' (a) and (b) trajectories.

FIG. 6G is adapted from "FIG. 6." of 2004-Sydney. The interior region (690), shown bounded by a dashed line, would be uniformly populated by electrons confined by the magnetic field. The trajectory (692) of one such electron is shown by the solid line labeled "(a)." Typically, the interior orbits turn randomly when they pass near the center of the cube. At the center, the B-field vanishes by symmetry and the electrons there became disoriented. Their random turnings at center would cause electrons to fill the interior space uniformly.

2004-Sydney also disclosed the presence of an external group of electrons, pressing inward on the magnetic field. The trajectory (694) of one such electron is shown by the spiraling line labeled "(b)." These electrons traveled back and forth between cusp-lines and did not enter the core region (690). The simulation used by 2004-Sydney researchers omitted electron-electron scattering. In their case, electrons on external orbits remained forever trapped, oscillating back and forth, always along the same magnetic field lines. The simulation in the present Specification was more complex. It included a rigorous description of electron up-scattering. In this case electrons live in the cusps for only a limited time after being born there from electrons' ionizing gas atoms. Up-scattering would move these low energy electrons inward from the cusps into a region of lower B-field. Eventually, they would reach a limiting field line (696), between the exterior and interior regions. From there they would continue to up-scatter, entering the interior region and becoming trapped with the electrons from the emitter. Combining the concept of up-scattering with the 2004-Sydney publication can explain the physics behind cusp trapping of electrons.

What looks like a mountain (460 and 462) to a positive ion looks like a valley to a negative electron. Ionization-electrons become temporarily trapped in these valleys. These low-energy electrons eventually up-scatter out of the cusps and join the energetic electrons re-circulating through the central region. The presence of the excess electrons in the cusps does not cause power drain or otherwise impact the reactor's power balance. For the purpose of determining the interior ion density, they could be ignored. Only the central electron density (620) was needed to compute the ion density. Quasi-neutrality was used to determine the ion density "n" from the central electron density.

Maximum, i.e. optimum, central-electron density was obtained when the outward plasma-pressure just equaled the inward magnetic pressure at the surface of the electrons' cloud. "Beta" is the accepted name for the ratio of plasma-pressure to magnetic-pressure. Equal pressures make the ratio Beta equal to unity. The formula for Beta is a simple function of electron density, electron energy, and magnetic field strength. Optimum electron density was simulated by setting the formula for Beta equal to unity. The resulting equation was solved for the electron density.

The ion density approximately equals the electron density due to the bulk plasma's characteristic quasi-neutrality. Computing electron density from the Beta=1 equation therefore also determined the approximate ion density at the surface, which also equals the ion density at the center (612). The ion density was uniform inside the surface; thus, finding the electron density at the surface determined the ion density everywhere inside the surface.

The known formula for Beta, from pg. 29 of the Plasma Formulary, is as follows: $Beta=(4.03e\text{-}11)(n_e)(T_e)/(B^2)$, where $n_e$ is the electron density in $cm^{-3}$, $T_e$ is the electron energy in electron-volts, and B is the surface magnetic field in gauss. Setting Beta to unity and solving for $n_e$ yielded the following expression for electron (=ion) density in units of particles per cubic centimeter: $n=n_e=B^2/(4e\text{-}11)/T_e$. In order to calculate the density it was necessary to evaluate the surface magnetic field B and surface electron energy $T_e$.

The outer surface of the plasma cloud is defined by the condition that the outward pressure of the electrons equals the inward pressure of the magnetic field. This condition of pressure matching facilitated computation of the three-dimensional (3D) electron density from simulation diagnostics. FIG. 6C shows a snapshot of the 2D positions of all the electrons, each electron represented as a black dot. The surface of the electron cloud is at the boundary between black and white regions. A point was selected on the surface, shown surrounded by a white-filled square (640). This point was chosen as a convenient point to evaluate electron density, $n_e$.

The position of the surface point (640) is marked by the intersection point of horizontal (644) and vertical (642) lead lines in FIG. 6C. At this x,y position the tangent to the electron-plasma's surface was oriented vertically, indicating that the vector B-field at that point also pointed vertically. The horizontal component ($B_x$) vanishes at this point. The vanishing of $B_x$ simplified the determination of the total B-field needed to evaluate 3D plasma density. The total B-field was equal to $B_y$.

The outline of the electron surface follows the interior shape of the potential well. Electrons start with zero kinetic energy at the tank wall. They accelerate into the core, driven by the positive voltage on the magnets. Because they were born with zero kinetic energy, an electron's kinetic energy is numerically equal to the potential voltage at the electron's position. The numerical value of the potential, measured in volts, is equal to the electrons' energy $T_e$, measured in electron-volts (eV). The electrons' energy at the surface of the electron cloud was evaluated by selecting an equipotential contour, shown in FIG. 6D (650), which matched the size and shape of the electrons' surface. The procedure for finding this contour from the simulation's diagnostic display was the following:

Cells of the PIC simulation were displayed as small white squares, as shown and each bounded by colored lines. Colors mapped the potential voltage in each cell. The color map was displayed using the Linux Operating System's "Impress" software program. "Eyedropper" is a feature of "Impress" which facilitates replacing ranges of displayed colors by an alternate color. Using the mouse, Eyedropper was guided by hand to replace each color by either black or white, depending on whether the voltage in the cell was above or below a chosen value. Black or white lines replaced the color spectrum originally displayed by the simulation. The equipotential contour (650) is visible as the locus of points on the boundary between white and black.

The simulation software codes 2D voltage using a rainbow of colors from white to magenta. Magenta represented the maximum voltage set by the bias-power-supply, 50 kilovolts. Light-blue was the color chosen by the simulation to color the contour matching the size and shape of the electron-bounding contour (650). In the convention of the simulation's color code, light blue coded 60% of the voltage coded by magenta. Sixty percent of 50 kilovolts is 30 kilovolts. The electrons' energy at the surface was, by this procedure, determined to be $T_e=30$ keV.

The remaining factor needed to compute ion density "n" was the magnitude of the surface magnetic field $B_y$. The coordinates of the surface point (640) were read from FIG. 6C and transferred to a 2D display of $B_y$ vs. x and y. The coordinates of the surface point, read from FIG. 6C (640), were x=0.19 m (642) and y=0.24 m (648).

FIG. 6E (662) shows a graph of $B_y$ along an x-section line passing through its 2D display. This Figure shows $B_y$ in Tesla on the vertical axis (660) vs x-position on the horizontal axis (647). The horizontal axis spans 0 to 0.622 meters. This Figure is a 1D graph made by extracting a horizontal section along the y=0.24 m line through the 2D $B_y$ diagnostic, not shown. The vertical lead-line (642) marks the x=0.19 m (642) abscissa of the surface point where the value of $B_y$ was evaluated. The horizontal lead-line (666) intersects the $B_y$ axis at the ordinate value –0.026 Tesla. This number of Tesla converts to 260 gauss, using the known conversion of magnetic units, 10,000 gauss equals 1 Tesla. This B-field value of 260 gauss is the surface B-field in the units appropriate to compute ion density from the standard Beta=unity formula.

Substituting the component values, B and $T_e$, into the expression for the Beta=unity gives the following value for 3D ion density: $n=n_e=B^2/(4e-11)/T_e$, which evaluates to $(260)^2/(4e-11)/(30e3)$ cm$^{-3}$ which equals 5.6e16 m$^{-3}$. This value of ion density was used to compute $P_{out}$, the numerator of the model power balance $Q_m$. The model power balance $Q_m$ determines the size of break-even reactors constructed according to these embodiments. The extrapolation to break-even was carried out using the exponential scaling formula described in the previous section of the Specification.

Power-Output Needed for Use in Computing Power Balance

FIGS. 6F and 7

Power output $P_{out}$ was computed as the volume integral of the power density. The power density was evaluated from the textbook formula $\frac{1}{2} n^2 <R> E_f$. The first and last of these factors, density "n" and fusion-yield $E_f$, were constant throughout the plasma volume. Only the reactivity <R> varied as a function of position inside the reactor. The reactivity <R> was integrated numerically over the ion-plasma's volume. The integrated reactivity was then multiplied by the constant density times the constant fusion-yield to compute the power output of the whole reactor.

The reactivity R is conventionally defined to be the product of ion-ion fusion cross-section times ion-ion relative velocity. At each position in the 3D volume of the plasma, the ion velocity varied from ion to ion among the many ions located at that position. The ions' reactivity values at each position were first averaged over velocity. The average reactivity <R> was then integrated over the volume of the ion plasma's cloud.

The integration of <R> was simplified using the approximate spherical symmetry of the potential. To a good approximation, the ion energy depended only on the radial distance of the ion from the cube center, not on its direction from cube center. This can be seen in FIG. 2C (272), which shows a 2D equipotential contour (272) deep in the well. In this Figure, the position of the equipotential (272) was chosen to be at the radial position where the ions had lost about half their kinetic energy on their periodic transit to the edge of the well. The contour is approximately circular, indicating that the equipotential in 3D is approximately spherical.

FIG. 6F shows each simulated ion as a black dot in $U_x$ vs. x phase-space. $U_x$ is the x-component of the ions' vector velocity U. The dots on the boundary of the black region represent ions moving horizontally, like the ions shown in FIG. 4A. For these ions the energy and velocity are simply related by $U=U_x$. The y- and z-components of velocity vanish for horizontally moving ions. FIG. 6F was used to measure ion velocity as a function of ion position.

The volume integral, required to compute power output, was approximated as a 1D numerical integral along the x-axis. This was a good approximation due to the spherical symmetry observed in the equipotential. With this approximation, the spatially varying part of the integrand simplifies to $4\pi x^2 \sigma U_x dx$, where the factor $4\pi x^2 dx$ is the volume of a spherical shell of radius x and thickness dx.

The remaining factor in the integrand is σ, the angle-averaged fusion cross-section originally published by Bussard in "Should Google Go Nuclear," hereinafter called 2006-Bussard. FIG. 1B of this Specification is similar to Bussard's FIG. 13 except that his original colored graphs were all converted to black. Also, a trivial labeling error was corrected. (From the Plasma Formulary, it was clear Bussard's "Millibarns" should have been typed "Barns.")

To obtain this graph, Bussard performed angle-averaging by transforming pairs of ions' velocities to the center-of-momentum (COM) frame, looking up the measured cross-section tabulated for that COM energy, and averaging the cross-section for every possible scattering-angle from zero to π radians. As labeled above the graph, the energy of the abscissa in FIG. 1B was the sum of the energies of the fusing ions. In this Specification, ion speed was determined from the diagnostic of potential voltage. Fusing ions have the same position when they fuse and therefore the same energy. The appropriate abscissa value was twice the ion's energy as determined from its position in the potential well.

With the simplification to spherical shape, the spatially varying part of the integrand became the following: $<R>=4\pi x^2 \sigma U_x \, dx$. This integrand was sampled at 5 points ($x_0$, $x_1$, etc.) and the integrands multiplied by weights according to Simpson's Rule of integration. From Wikipedia, Simpson's Rule applied to a 5-part integral was $<R>=[(1/3)R_0+(4/3)R_1+(2/3)R_2+(4/3)R_3+(1/3)R_4]x_1$, where $R_0$ was the value of the integrand at $x_0$ (=0, taken to be at cube's center), $R_4$ was the value of the integrand at $x_4$ (taken to be at the well's edge), and $x_1$ was the distance of the first sampling point from the cube's center. For 5-part integration, $x_1$ was one-fourth of the distance from center to edge. In Simpson's formulation, each of the samples, $R_0$, $R_1$, etc., represents the integral of the reactivity in a spherical shell of thickness $x_1$. The "Shell Weights" 1/3, 4/3, etc. are part of the definition of Simpson's Rule, as copied from Wikipedia.

FIG. 6F was used to find the ion velocity at 5 regularly spaced sample points in x, marked with vertical lines (670, 671, 672, 673, and 674) crossing the horizontal axis (687). Also shown are 5 horizontal lines (680, 681, 682, 683, and 684) marking the velocities at which the vertical lines intersect the elliptical boundary of the ions' velocity distribution. The five values of ion velocity U (=$U_x$) at the sample points were determined graphically, by reading the vertical $U_x$ scale at the 5 points where the horizontal lines intersect the vertical axis (686).

FIG. 7 shows a table (700) of the plasma parameters taken from the simulation diagnostics and combined to compute the volume integral of power density. Each column of the table is headed by a symbolic name. The column headed by "N" (702) contains five integers indexing the five values of ion-position sampled. Each successive column of the table lists the values of factors which were combined step-by-step to evaluate the 5 integrands, $R_0$, $R_1$, etc. Given in parenthesis are the physical units of each column's entries.

The second column heading "$x_N$" (704) represents the horizontal distance of a sample point from the center of the cubic reactor. The interval from sample-point to sample-point was computed by dividing the full radial extent of the ion's spatial distribution into four equal intervals. The full radial extent of the potential was previously computed from FIG. 6F as the distance from cube center (670) to edge of the potential well. The edge of the well is where the ion velocity falls to zero (674). The units of this column are meters (m), the same as the horizontal axis (687) in FIG. 6F.

The column heading "U" (706) represents the ions' velocity at the distance $x_N$ from the center. Each of the 5 values in this column (706) was read from the intersection points of the horizontal lines (680-684) in FIG. 6F with the vertical axis (686). The units of the entries in this column are meters per second (m/s), the same as the vertical axis (686) in FIG. 6F.

The column heading "$MU^2$" (708) represents the total energy of two fusing ions, as computed from their velocities. According to the standard formula, a particle of mass M and velocity U has kinetic energy $\frac{1}{2}MU^2$. The magnitudes of the two ions' velocities were the same; thus, their total energy was $2(\frac{1}{2}MU^2)$, which equals $MU^2$ (708). The column entries (708) were used as abscissa values to read the D+D fusion cross-section from FIG. 1B.

FIG. 1B shows lead lines (110, 111, 112, and 113) terminating at the appropriate fusion cross-section values on the "DD" curve (104). The "Energy" scale in FIG. 1B (120) was the scale chosen by Bussard in computing his FIG. 13. In the special case of this Specification, the fusing ions had the same energies, as determined by their position in the potential well. The units of energy used in this column were kilo-electron-volts (KeV), as chosen by Bussard for his horizontal scale (120).

The column heading "α" (710) represents the nuclear cross-section for fusion of the D+D fuel ions. The relevant values of a were read from the vertical scale (121) at the 4 vertical positions where the lead lines (110, 111, 112, 113) intersected the "DD" curve (104). The fifth entry in this column was entered as zero, the known fusion-cross-section for zero-energy ions. The units of a (710) in FIG. 1B were converted from barns to square-meters for entry in the Table, using the well-known conversion factor of 1e-24 square centimeters per barn.

The column heading "$4\pi x^2 U \sigma x_1$" (712) represents the complete integrand evaluated at the 5 sample points. Each value in this column was computed by multiplying together the values of the component symbols, $x_N$, U, σ, and $x_1$, from the same row of the table. The indicated units of the integrand ($m^6$/s) were chosen in keeping with the conventions of the standard mks system.

The column heading "Shell's Weight" (714) represents the multiplicative factors appropriate for the summation of integrand samples, as described previously. Shell weights were copied from the Wikipedia article defining Simpson's Rule.

The final column heading "Partial Σ" (716) represents the weighted integrand appropriate for direct summation to the desired volume integral of reactivity. At the bottom of this column is the sum of all the values in the column, 1.78e-26 $m^6$/s. This is the desired value of reactivity integrated over the volume of the model reactor.

To compute the power output of the entire reactor, the above-integrated reactivity was multiplied by the constant factors previously factored out of the power density. These factors were ion-density-squared and fusion energy gain. The total power output for the small-scale D+D fueled model reactor was computed as follows: $P_{out} = \frac{1}{2} n^2 E_f \int 4\pi x^2 <R> dx$ = (0.5) (5.6e16 $m^{-3}$)$^2$ (3.7e6 eV) (1.78e-26 $m^6$/s)=1.03e14 eV/s. Converting to watts, using the standard conversion factor of 1.6e-19 watts=1 eV/s, $P_{out}$=1.03e14×1.6e-19 watts=1.65e-5 watts.

Formulating the Power-Input for the Model Reactor

Figure 8B:
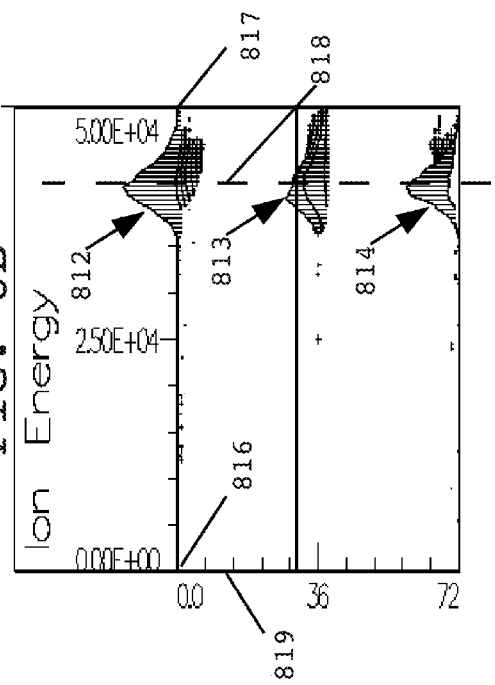
FIG. 8B shows the energy vs. position spectrum of ions hitting the left-hand tank wall.
Figure 8C:
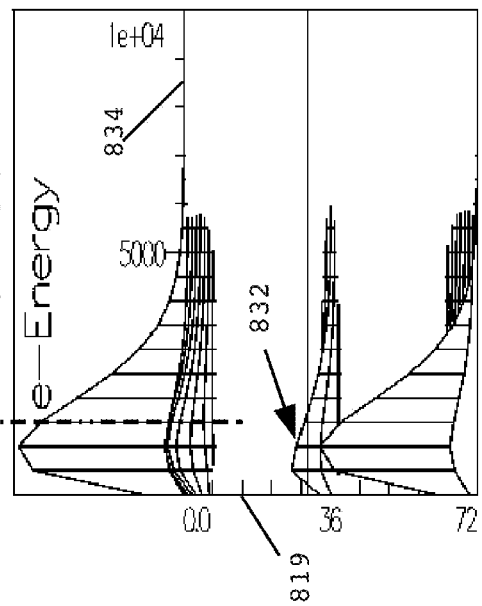
FIG. 8C shows energy vs. position spectrum of electrons hitting the left-hand tank wall.
Figure 8A:
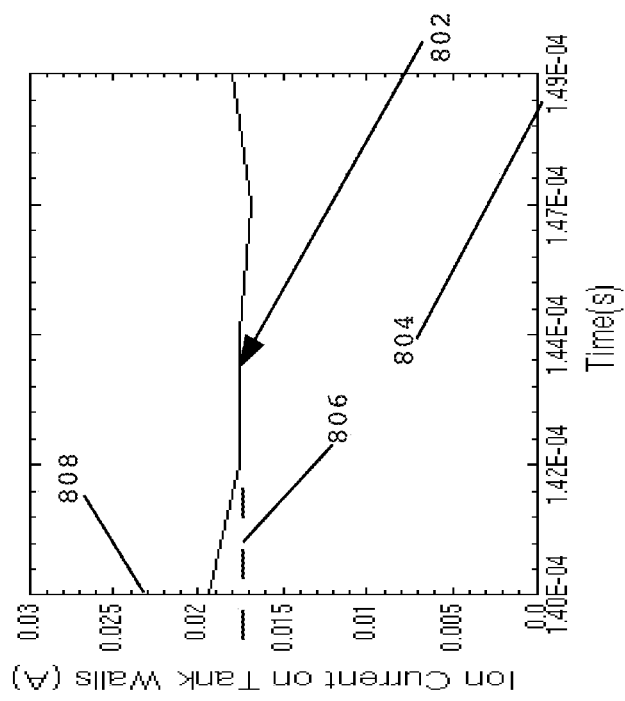
FIG. 8A show the electrical current of ions hitting all 4 tank walls as a function of time.

FIGS. 8A and 8B

As a step toward computing the break-even reactor size, the power balance of the small scale model reactor was needed. The importance of maximizing power balance was discussed above. The bigger the power balance is, the smaller the break-even reactor size will be. The expression for power balance of the model reactor is $Q_m = P_{out}/P_{in}$. The previous section showed how the fusion power output $P_{out}$ was computed. This section shows how the power input $P_{in}$ was computed.

$P_{in}$ was the sum of three distinct power losses, ions' losses, electrons' losses, and magnets' resistive losses. Magnet losses were computed from the manufacturer's specification of the coil magnet chosen for the model simulation. Ions' and electrons' losses were computed from the simulation's diagnostic outputs.

Computing the expected magnet power loss was straightforward. The model reactor was simulated with six identical coil magnets. The simulation input file specified a scale factor, "radiusScale" shown in FIG. 5A (514) to have a value of 0.75. The GMW Associates catalog shows that standard magnets' power consumption scales in proportion to the cross-sectional area of their coils. A magnet with dimensions scaled down by a factor of 0.75 would consume less power than the catalog magnet by the factor $(0.75)^2$=0.56.

The magnet power for the catalog magnet was specified by GMW as 1.75 kilowatts. A scaled down magnet then would consume 0.56 times 1.75 kilowatts, or 1.0 kilowatts. Six such magnets would consume six times as much as one magnet, or 6.0 kilowatts total. In computing $P_{in}$, this magnet power consumption, 6.0 kilowatts, was added to the simulated power consumed by particle losses. The particle losses were computed from diagnostics as follows:

A substantial flow of electrons and ions continuously escaped from the confinement volume and hit the tank walls. Lesser flow rates also occurred onto the magnet boxes, but these rates were so small compared to losses on the tank they were ignored. Only the losses onto the tank were included in calculating $P_{in}$ for the power balance. Negligible error was made by ignoring other particle loss mechanisms.

The simulation program separately recorded the particles' lost current and the particles' lost energy. With the current expressed in amperes and the energy in electron-volts (eV), the power in watts can be calculated as the simple product of current times energy (in eV).

FIG. 8A shows the simulation's graph of lost-ion current (802) as a function of time during steady-state. Statistical variations in the current are seen in the graph. The simulation program counted lost ions in successive 2.5-microsecond time-intervals, assigned as a variable in FIG. 5C (556). The program internally computed the loss currents in amperes as particle-charge times particle-count divided by this time-interval. Limited particle-count in the time-interval caused statistical variations in the computed current. These variations are to be expected and would be familiar to anyone skilled in the art of nuclear event counting. Except for statistical variations, the loss current is seen to be constant in time, an expected feature of steady-state.

Returning to FIG. 8A, the average ion current is indicated by the dashed line (806). The current value was read as the intersection point of the dashed line with the vertical axis (808). The vertical-axis scale, according to the convention of the simulation, was calibrated in units of amperes (A). The average ion loss-current, so determined, was 0.017 amperes.

To compute the power consumed by lost ions, the average ion-particle's energy was also required. FIG. 8B shows the energy/position spectrum of ions hitting the left-hand tank wall. Ion counts are indicated by the lengths of vertical lines. The lines group into 3 peaks (812, 813, and 814). The horizontal positions of the lines within the peaks show the ions' energy-distribution, as measured along a horizontal energy-axis (816, 817). The energy-axis is marked in electron-volts. Ten scale divisions span energies from zero (816) to 50,000 (817) electron-volts. The average ion energy was read as the intersection of the dashed line (818) with the energy axis. This average ion-energy reads as 4e4 electron-volts, or 40 kilo-electron-volts (keV) in conventional units.

Multiplying the ions' average loss-energy with the ions' loss-current yielded the power loss of ions as follows: 40 kilovolts times 0.017 amperes equals 680 watts. This power loss is for ions lost from the central slab only, not the whole volume of the cubic reactor. To compute the ions' total power loss required multiplying this one slab-loss by the number of slabs in the whole cubic reactor. The number of slabs in the cube was found by the method to be described in the next section of this Specification.

Examining the other features of FIG. 8B gave additional understanding of the loss mechanism of ions. The integer numbers shown along the vertical axis (819) are PIC cell-numbers measuring position along the left-hand tank-wall. The peak (812) at cell "00" is from ions hitting the lower-left corner of the tank. The peak (813) at cell "36" is from ions hitting the center of the left-hand tank wall. These ions emerged through the left-hand gas-cell and along the left-hand cusp-line through the magnet. Finally, the peak (814) at cell "72" is from ions hitting the top-left corner of the tank. These ions emerged through the gap between the left-hand and top magnets. The other positions along the tank wall, other than "00", "36" or "72", were shielded by the left-hand magnet. No ion counts reached the tank wall at these other positions along the wall.

Evaluating the Rate of Particles' Power Loss

FIG. 8C

In the First Embodiment, the largest single source of power loss was from electrons hitting the tank walls. Electron power loss dominated over magnet and ion power losses in determining $P_{in}$. The electron power loss of the central slab was computed from the simulation diagnostics by a method similar to the one described in the previous section for the ions.

FIG. 8C shows the energy/position spectra of electrons hitting the left-hand tank wall. Once again the energy spectra appeared divided into 3 peaks. The 3 peaks again were separated in distance along the left-hand tank wall, as indicated on the position axis (819). A smaller peak (832) occurred at center and two larger peaks occurred at the bottom and top ends of the wall. The lengths of the vertical lines inside the 3 peaks measured the number of electrons hitting the wall at each electron-energy and electron-position. In this Figure, the energy axis (834) spans a smaller range, zero to 1e4 electron-volts. Energy divisions are at 1 keV intervals along this axis (834).

A value for the average electron energy was needed to compute the power loss. The mathematical centroid of the electrons' energy distributions is shown marked with a dashed line (836). The average energy of all the lost electrons was read as the intersection point of the dashed line with the energy axis (834). This method determined the average lost-electrons' energy to be 1.5 keV per electron.

Also needed to compute the electrons' power-loss was the electrons' loss-current on the tank walls. This number could have been read from a diagnostic display similar to FIG. 8A for ions. More accurately, the electron current was calculated from the physics principles of particle- and charge-conservation. By the definition of steady-state, the total number of electrons in the plasma was constant in time. To maintain this condition, the net current of electrons into and out-of the tank must total zero.

The flow of electrons into the tank was known to be the sum of current from the electron-emitter plus a current of electrons created by gas ionization. The emitter current had been optimized by trial and error to give the best model-reactor power-balance. This optimized value of current, 2.0 amperes, was assigned as the variable "elecIgnitionCurrent," as shown in FIG. 5B (533).

By charge and particle conservation, the lost-electron current from gas ionization must be equal to the lost-ion current. The lost-ion current was determined in the previous section to be 0.017 A. This is a very small current compared to the 2.0 amperes from the electron-emitter. Two significant digits were all that were needed to compute the electron power loss. The small additional current from gas ionization could be ignored compared to the 2.0 amperes from the electron-emitter.

Returning to FIG. 8C, the 10 keV energy range spanned by the electrons' energy axis (834) was 5 times smaller than the ions' energy range in the previous Figure (816,817). The electrons' average-energy at the wall was much smaller than the ions' average-energy. In traveling from the core to the tank walls, electrons run uphill against the potential. By doing this, they convert most of their kinetic energy to potential energy before hitting the wall. This conversion of kinetic to potential energy occurs in vacuum and so is entirely lossless. This process enables an efficient resetting of up-scattered electrons' energies.

In a net-power reactor, the energy lost by electrons at the tank wall will be converted to electricity and re-injected via the high-voltage power supply. Such recycling of lost energy is limited by the efficiency factor η, as discussed previously. Inefficient recycling applies only to a small fraction of injected energy, only the fraction remaining to an up-scattered electron after its uphill run to the tank. The efficient correction of up-scattering, using lossless conversion of kinetic to potential energy, is an important feature of Polywell confinement. When combined with the new ion source specified in this embodiment, it produces a superior fusion reactor design.

The electron power loss was computed as the product of electron energy, expressed in volts, times electron current, expressed in amperes. The electron power loss was 1.5 kilovolts times 2.0 amperes which equals 3.0 kilowatts. This was the simulated power carried away by the electrons lost from the central slab of the cubic reactor. In computing the central-slab's power loss, this 3.0 kilowatts adds to the 680 watts lost by the ions, as computed in the previous section of this Specification.

Evaluating the 3D Power Loss from the Simulated 2D Power Loss by Stacking Slabs

Adding the electrons' 3.0 kilowatts to the ions' 680-watt power loss, the total particle power loss from the central slab was 3.7 kilowatts, again expressed to two significant digits. To extrapolate to the power loss of the cubic reactor required an estimate of how many slabs must be stacked up to make a cube of plasma. By symmetry, the stacked plasma cube must have the same height as the width of the square plasma cloud in the slab. The number of slabs required was computed as the width of the plasma square divided by the thickness of the slab, both width and thickness to be determined.

The thickness of the simulated slab was computed as the ratio of the 2D electron-density divided by the 3D electron-density. The simulated central electron density was read from FIG. 6B as the position where the dashed line (622) intersected the vertical axis (610). This density reads as 4e14 electrons per square meter. The 3D density was previously computed as $n_e$=5.6e16 electrons per cubic meter. Combining these factors, the slab thickness was found to be (4e14 m$^{-2}$)/(5.6e16 m$^{-3}$), which equals 0.0071 meters.

This slab thickness was surprisingly found to be approximately equal to the PIC cell-size. To see this, PIC cell-size can be computed by hand from diagnostics. Cell-size is the ratio of tank diameter in meters divided by tank diameter in cells, 0.622 m/72=0.0086 m. PIC cell-size was originally specified to be just small enough to avoid artifacts in simulating the smallest in-plane plasma features. Fortuitously, the slab thickness (0.0071 m) turned out to be about the same size as the cell-size. The previously-selected cell-size (0.0086 m) was therefore already small enough to validate this method of determining slab thickness as 2D density divided by 3D density.

Since the plasma cloud is cube-shaped, determining its width also determines its height. The width was determined from the marked position of the surface point (640) in FIG. 6C. The x-coordinate of this point, marked by the vertical line (642), was noted previously as x=0.19 m. By symmetry, the diameter of the square containing the central cloud of electrons is twice the distance of this edge-point from the cube's center-point. The x-coordinate of the cube's center-point is 0.311 m, as marked in FIG. 6C (646). The horizontal dimension of the plasma cube, by this measure, was computed to be 2(0.311 m−0.19 m), which equals 0.24 m. The number of slabs to make a cube was computed to be this diameter of the electron cloud divided by the slab thickness, 0.24 m/0.0071 m which equals 34 slabs. It would take 34 slabs stacked up to make a cube-shaped volume of electron plasma.

The power lost by particles from the entire cubic reactor was computed as the product of the number of slabs (34) times the power lost from the simulated central slab (3.7 kilowatts). This product equals 126 kilowatts, the total power loss of the ions and electrons from the whole cubic reactor. Adding the power loss of the magnets (6.0 kilowatts) gave the total power loss of the whole reactor as 132 kilowatts. This is the value of $P_{in}$ required to compute the power balance for a D+D fueled model reactor in the First Embodiment of the invention. Retrieving the value of $P_{out}$ computed previously, the power balance follows immediately to be $Q_m$=$P_{out}$/$P_{in}$=1.65e-5/132e3=1.22e-10. This power balance was used in the empirical scaling formula to compute the break-even reactor size as follows:

Determining the Exponent "s" in the Power Balance Scaling Formula

The whole point of carefully computing the power balance has been to use it to estimate the size of a break-even reactor to be constructed according to the First Embodiment. The numerator of $Q_m$ is known to scale as the 7th power of magnet size. The exponent governing the scaling of the denominator of $Q_m$ was determined as follows:

FIG. 8C showed that the magnets' face cusps (832) leak electrons at a much lower rate that the corner cusps. The corner-cusp peaks, shown above and below the face-cusp peak (832), have many more electron counts, as shown by the lengths of the vertical bars forming the peaks. The dominance of the corner cusps over the face cusps continues to increase as the size of the magnets grows toward break-even. As an approximation, the electron leakage through the face cusps was ignored in deriving the scaling of $P_{in}$. This approximation gets better as the size of the simulated reactor was increased. Ignoring the face cusps, the electron leakage scales as the 2nd power of the reactor size. This scaling was derived by the following logical argument.

Electron power loss has been shown to be proportional to the number of slabs and inversely proportional to the slab thickness. The number of slabs is proportional to the linear size of the reactor. The slab thickness, like the PIC cell-size, is inversely proportional to the size of the reactor. The product of these two factors increases as the 2nd power of size. This logic leads directly to a 2nd power scaling of electron power loss with magnet size.

Ions' losses are also expected to scale approximately as the 2nd power of size. As seen in FIG. 8B, ions' losses are also dominated by corner-cusps' losses, though not as completely as electrons' losses. The approximate dominance of the corner cusps was enough to show the ions' losses scale approximately as the 2nd power. Ions contribute only a small fraction to the overall particle losses; therefore, approximate loss-scaling is good enough to enable a valid scaling of power-balance to break-even.

The 2nd power scaling of particle losses with magnet size has also been confirmed by Bussard's experiments on actual Polywell reactors. Quoting from 2008-Bussard, "[0207] Tests made on a large variety of machines, over a wide range of drive and operating parameters have shown that the loss power scales as . . . the square of the system size (radius)."

$P_{in}$ is the sum of particles' power loss plus magnet resistive power loss. The magnet power loss also scales as the 2nd power of size. This is known theoretically from the properties of liquid cooled copper conductors. Resistive power loss is produced in proportion to the cross-sectional area of the magnet coils. This area increases as the 2nd power of the coil diameter. This theoretical scaling of magnet power loss was empirically verified by comparing the power requirements of all the standard magnets in the GMW Associates catalog. Drive-power requirements were seen to vary from magnet to magnet in proportion to coil-area.

$P_{in}$ is the sum of two contributions, both of which scale as the 2nd power of magnet size. It does not matter in what proportions the power loss is divided between particles' lost power and magnets' lost power. As long as both terms scale with the same exponent (=2), the sum still scales as the 2nd power of size. The combined effect of the numerator scaling as the 7th power of size and the denominator scaling as the 2nd power of size makes the quotient $P_{out}$/$P_{in}$ scale as the 5th power of size. The logic of this section leads to the conclusion that the scaling exponent "s" equals 5.

Applying the Power Balance Scaling Formula to Predict Break-Even Reactor Size

The power balance scales with reactor size in a predictable fashion. As the size of the model reactor increases toward break-even size, the magnetic field strength will rise in proportion to the increase in magnets' size. The scaling relationship between magnet size and power balance results in the following expression for break-even magnet size as a function of model power balance: $D_b = D_m/(Q_m)^{(1/s)}$, where $D_b$ is the diameter of the break-even magnet, $D_m$ is the diameter of the model magnet, $Q_m$ is the power balance of the model reactor, and "s" is a scaling exponent, now known to be s=5, as shown in the previous section.

Substituting the values of $D_m$, $Q_m$, and "s" from the previous analyses resulted in the following estimate of break-even magnet size for a D+D fueled reactor built according the First Embodiment of the invention: $D_b(DD)=(0.75*0.315 \text{ m})/(1.22e-10)^{(1/s)}=0.26 \text{ m}/0.0104=25$ meters. This size estimate is coincidentally the same size as ITER. The embodiment has a decided advantage over ITER in that it burns "advanced" fuel instead of ITER's troublesome tritium.

A still smaller break-even size was desirable. To compare directly with ITER, the fuel was changed from D+D to D+T, leaving the other reactor design parameters the same. At the crucial sample points shown in FIG. 1B (111, 112, and 113), the cross-section curve for DT (102) is approximately parallel to the curve for DD (104). The D+T fusion cross-section (102) is seen to be a factor 160 times larger than the D+D cross-section (104). The factor of 160 holds for all three sample points (111, 112, and 113). Applying this scaling factor to the integral in FIG. 7 (716) was the only adjustment needed to replace the D+D fuel by D+T fuel.

Applying this factor resulted in a 160-fold increase in the model reactor's power balance. The power balance increased from the $Q_m(DD)=1.22e-10$, shown above, to 160 times 1.22e-10, which made the new power balance $Q_m(DT)=2.0e-8$. Using the same formula, $D_b=D_m/(Q_m)^{(1/s)}$, resulted in the break-even size estimate for a D+T reactor $D_b(DT)=D_b(DD)/(160)^{(1/s)}=25 \text{ m}/2.8=9$ meters. Burning D+T fuel instead of D+D fuel would reduce this embodiment's break-even reactor's magnet size from 25 meters to 9 meters diameter.

Not only is the size of the break-even reactor of interest, the power output is too. $P_{out}$ rises as the 7th power of size. The ratio of the break-even size to the model size, in the case of D+D fueled reactor, was 25 m/0.26 m=96. For a 96-fold increase in size, the fusion power output would rise by a factor of $96^7$, which is 7.6e13. Multiplying this factor by the model $P_{out}$ gave the projected power output of a break-even D+D reactor to be 1.65e-5 watts times 7.6e13 which equals 1.25 gigawatts (GW). If electrical power is produced from thermal power by the Rankine cycle, an efficiency factor of $\eta=0.4$ applies. The resulting net electrical power then projects to 1.25 GW times 0.4 which equals 0.5 GW. This level of power output is well within the range of power output covered by the many conventional nuclear reactors operating in the U.S. Nuclear reactors in the U.S. range in power output from 0.5 to 4.0 GW. D+D fueled reactors built according to the First Embodiment may well replace all the nuclear reactors currently in the U.S.

DETAILED DESCRIPTION

Second Embodiment

FIGS. 9A and 9B

In addition to the many useful features of the First Embodiment just described, further improvements are possible. FIG. 9A shows a section-drawing of a Second Embodiment of the invention. The drawing is similar to the drawings of the First Embodiment, FIGS. 2A, 3A, etc., but with the addition of an extractor electrode (910). The extractor electrode is shown in FIG. 9A as a horizontal line (910) just inside the bottom wall of the tank. In the 3D world, this electrode would be a round metal plate which absorbs and removes up-scattered electrons. To maintain steady-state, these lost electrons would be continuously replaced by electrons of the correct energies from the electron-emitter (230).

FIG. 9A also includes a snapshot of simulated electron positions (912), each electron represented by a black dot. In all, 120 thousand dots were plotted in the Figure. Inside the cloud, the dots run together to form a predominantly black area. The boundaries of the cloud are visible as the locus of transitions from black to white.

The effect of the electrode was to largely eliminate electron losses on the tank walls. This can be seen as the shrinking of the length of the electrons' radial extent along the cusp-lines. The outer ends of the cusp-lines of electrons have pulled in, away from the tank walls in all 8 directions. Recirculating electrons almost never reach the tank. Endpoints of electrons along two typical cusp-lines are indicated by lead lines, one for a typical corner cusp (914) and one for a typical face cusp (916). The lack of dots in the spaces between the ends of the cusp-lines (914 and 916) and the top tank wall (918) shows that electrons are prevented from hitting the tank wall. The same is true of the other tank walls.

This electron-loss pattern contrasts sharply with the pattern in the First Embodiment, as shown in FIG. 6C. In FIG. 6C, the electrons' distributions along the cusp-lines extend all the way to the tank walls. Electrons were lost at all eight points where the cusp-lines met the tank walls. Eliminating the electron losses on the tank reduced the overall electron loss rate of the Second Embodiment compared to the First Embodiment.

FIG. 9B shows a snapshot of the steady-state ion positions (920), taken at the same time as the electrons in FIG. 9A (912). Comparing this ion distribution with an analogous one from the First Embodiment (FIG. 4C), the introduction of the new electrode did not significantly change the escaping ions' spatial distribution. Typical ions escaping through a corner cusp (922) and a face cusp (924) are shown in FIG. 9B.

The power lost to ions in the Second Embodiment was the same as in the First Embodiment. In the First Embodiment, power loss was dominated by the electrons' loss, 3.0 kilowatts vs. only 680 watts lost by ions. Because electrons dominated the losses, reducing the electrons' losses made a substantial reduction to the overall power loss, $P_{in}$. Reducing $P_{in}$ proportionately increases the power balance, $Q_m$. Increasing the power balance reduces the break-even reactor size, $D_b$. Smaller size means smaller capital cost, which will improve the marketability of this reactor design to the power companies.

Defining the Electrode Using Simulation Variables

FIGS. 5B and 5G

FIG. 5B shows the code lines assigning certain input variables. Of interest here are those defining the size and shape of the new electrode. The variable "extractorDiameter2" (536) specified the half-diameter of the electrode. The variable "extractorinset" (537) specified the distance the electrode was set inward from the bottom wall of the tank. It was a characteristic of the compiler that all physical structures were automatically placed on the nearest cell boundaries, even if specified at positions fractionally between cells. The assignment of "extractorinset" to be equal to "cellSize" (537) placed the electrode as close to the tank wall as possible, while assuring the compiler would not move it from its true position to coincide with the wall.

The same block of assignments contained definitions of the position and size of the electron-emitter (230). The variables "emitCathodeDia2" and "emitGunInset" (534) defined the size and position of the electron-emitter, analogously to the previously described variables defining the extractor. Placing extractor and emitter the same distance from the tank walls also placed them the same distance from the center of the potential well.

That the electron-emitter and electron-extractor were placed at the same distance from center is an important feature of the simulation. Un-scattered electrons return again and again to the same distance from center, namely to the distance of their birthplace in the emitter. By placing emitter and extractor at the same distance from center, up-scattered electrons hit either one or the other with approximately equal probability. Un-scattered electrons turn around at positions short of the tank walls, regardless of which cusp-line they happen to exit on.

FIG. 5G shows the section of code defining the extractor in the Region block of the simulation's input file. The "Dielectric" code line (590) implies an opening brace for the block of code following "Dielectric." This block ends with a closing brace (598). The "QuseFlag=0" line of code (592) specifies that the charge accumulated on the extractor is automatically drained off. The effect of this option was to maintain the voltage on the extractor to be the same as the voltage of the electrostatic potential field in the surrounding vacuum. By this means the extractor acts as a sink for up-scattered electrons without altering the electric field from what it would have been without the electrode present. By not disturbing the field, the extractor made itself invisible to the electrons until they actually hit it.

The electron-emitter was defined similarly to the extractor in the Region block. For details, the reader is referred to the previous "Simulation Source Code Listing" section of this Specification. An "EmitPort" code line defining the extractor follows the final code line of the "MCC" block of code, as shown in FIG. 5F (588). A sizable fraction of the up-scattered electrons impacted the emitter. The fraction was controlled by variables defining the sizes of emitter and extractor, as previously discussed in reference to FIG. 5B (534 and 536).

The similarity of the "EmitPort" code block defining the emitter and the "Dielectric" (590) code block describing the extractor was a choice made to simplify the simulation. The simulated size and shape of the emitter are those of commercial "emitter cathodes", such as the $LaB_6$ one described in 2014-Park (pg. 9). Various other types of emitters have also been disclosed in the prior art and may substitute for the one simulated. For example, 2010-Bussard (paragraph [0236]) discloses the use of tungsten headlight filaments as emitters and 2010-Rogers (FIG. 4D) discloses a commercially available "electron-gun." Possible advantages of choosing one or another electron-emitter would be obvious to ones skilled in the prior art and various choices are intended to be within the scope of the embodiments.

Determining the Power Output of the Second Embodiment

Figure 10B:
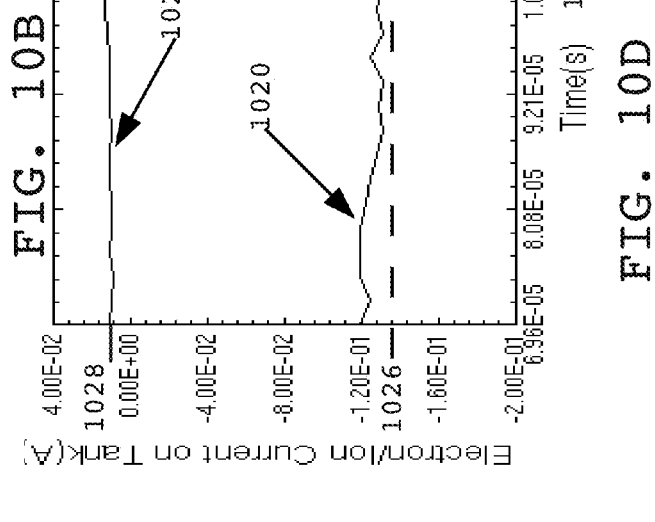
FIG. 10B shows time sequence of electron (1020) and ion (1022) loss-currents on tank.
Figure 10D:
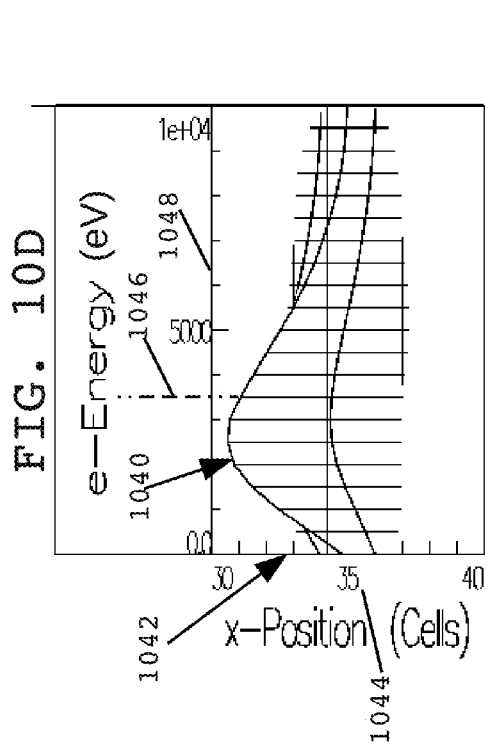
FIG. 10D shows the energy/position spectrum of electrons hitting the extractor.
Figure 10A:
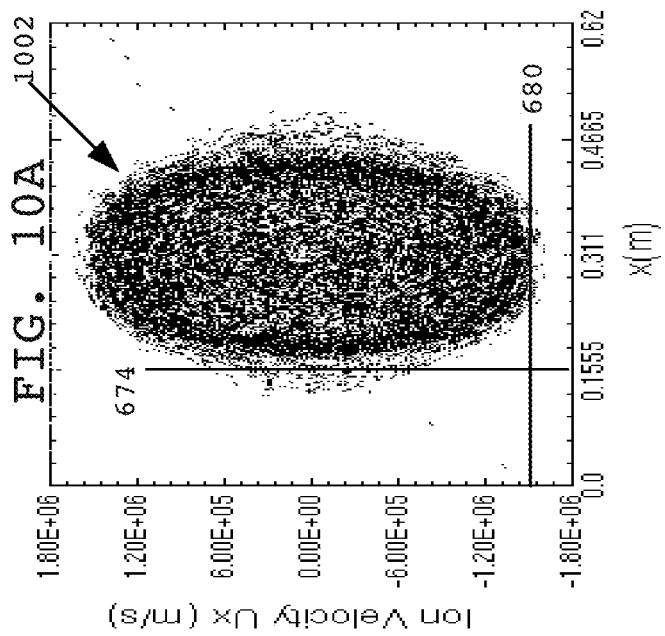
FIG. 10A shows a snapshot of ions in velocity/position space, 2nd embodiment.
Figure 10C:
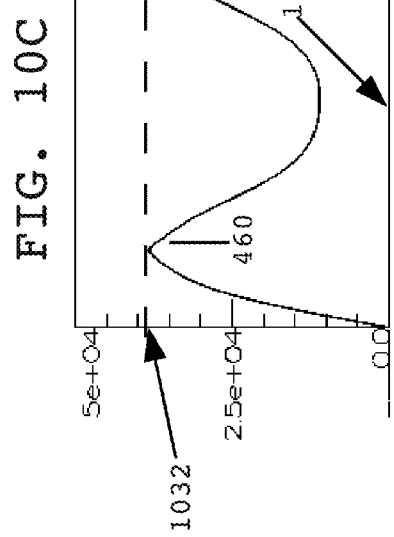
FIG. 10C shows a snapshot of the potential voltage along a horizontal line through center.

FIGS. 10A and 10C

The power output $P_{out}$ is still defined as the product of reactivity, volume, and the ion-density-squared. FIG. 10A shows a snapshot of the steady-state ion cloud (1002), each dot representing one ion in velocity-position space. The distribution looks very similar to FIG. 6F of the First Embodiment, already analyzed. In FIG. 10A the maximum-velocity (680), and x-dimension (674), marking the boundaries of the cloud in velocity-position space, are the same as for the First Embodiment. This means that the diameter of the ion cloud and the central velocity of the ions were the same as before. These factors fixed the volume and reactivity <R> of the ion plasma to be the same as for the First Embodiment.

The density "n" was computed as before by solving the Beta=unity equation at the surface of the electron plasma. Beta depends on the magnetic field and electron velocity at the surface. The magnetic field was the same as before. It was set by the variable assignments defining the magnets' size, positions, and electric-current to be the same as before. The remaining factor in Beta was the kinetic energy of the electrons at the surface. This energy was again determined by finding the voltage of the bounding equipotential contour.

FIG. 10C shows a snapshot of the potential as a function of horizontal position through the center of the tank. The horizontal axis (1030) spans x-dimensions from zero to 0.622 meters, as before. The potential looks very similar to the one of the First Embodiment, shown in FIG. 4D. The height and positions of the peaks (460 and 462) at the surface of the electron cloud are the same in both cases. These similarities between the two simulations allowed the re-use of the same $P_{out}$, as was determined for the First Embodiment. With no change in $P_{out}$, the improvement in the Second Embodiment came entirely from reduction of losses, as expressed by $P_{in}$. For the model reactor, the power balance was again represented by the symbol $Q_m$, which was computed as the ratio $P_{out}/P_{in}$.

Determining the Electrons' Contribution to Power Loss

FIGS. 10B, D, E, and F

The addition of the extractor modified the distribution of lost electrons' currents on the various internal structures of the model reactor. FIG. 10B shows the electron (1020) and ion (1022) loss-currents on the tank, as functions of time. The latest time shown, 115 microseconds (1024), was still somewhat short of steady-state. The approach of electron density to steady-state is exponential, as was shown previously in FIG. 2B (254). By 115 microseconds after time-zero, the electron density was within a few percent of its steady-state value. At this latest time shown in FIG. 10B (1024), the plasma parameters were close enough to steady-state to make reliable calculations of power balance, leading to a reliable estimate of break-even size. The simulation was stopped at 115 microseconds (1024) to save computer time.

The important feature of FIG. 10B was that the electron loss current on the tank, shown approximately by the dashed line (1026), was reduced by more than an order-of-magnitude from what it had been previously without the extractor. For comparison, FIG. 10E shows a graph of the previous electron loss current on the tank (1050), as simulated for the First Embodiment. This previous loss current was constant at 2.0 amperes (1052). The new loss current on the tank, extrapolated from the dashed line in FIG. 10B (1026), was approximately 0.15 amperes.

Figure 10F:
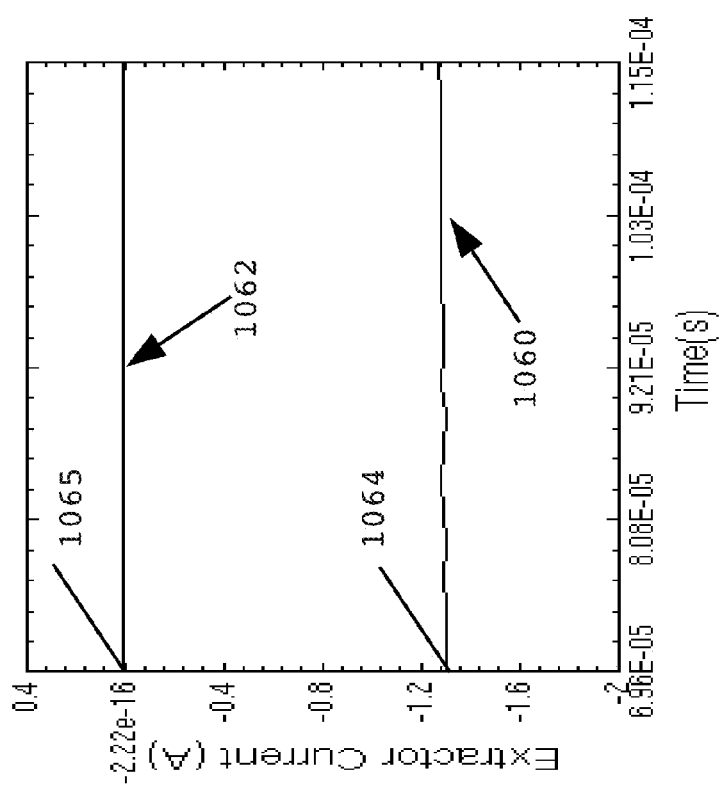
FIG. 10F shows time sequence of electron loss current (1050) on the extractor.
Figure 10E:
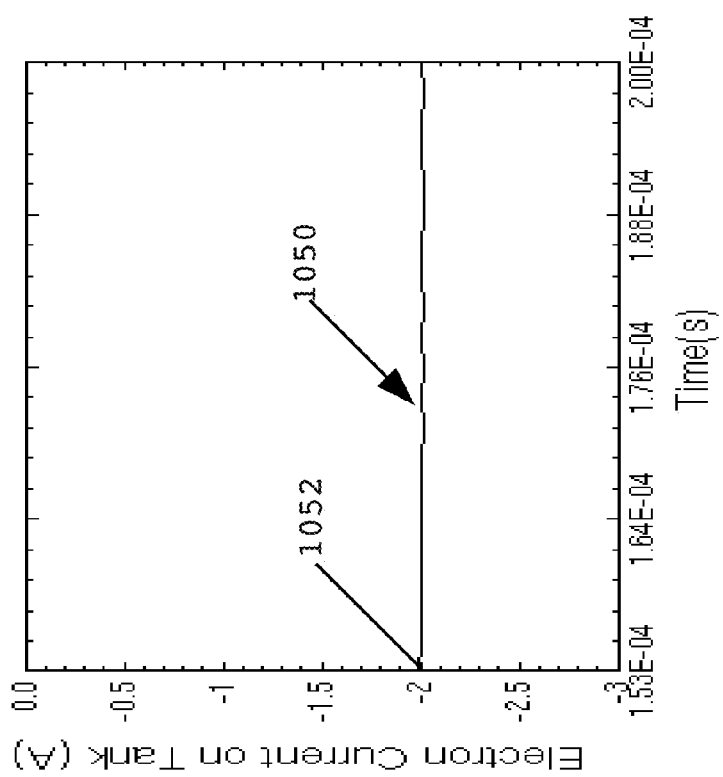
FIG. 10E shows time sequence of electron loss current (1050), first embodiment.

FIG. 10F shows a graph of electron current (1060) and ion current (1062) on the extractor. The electron current, as read from the vertical axis (1064), was 1.3 amperes. The value of the ions' current (1065) was too small to read on the vertical scale of FIG. 10F. Ion losses were determined more accurately by other means, to be described in the next section of this Specification.

From charge conservation, the total lost-electron current was 2.0 amperes. Subtracting the amounts measured on tank and extractor determined that approximately 0.7 amperes was lost on the emitter. This loss was not measured directly but was deduced by charge conservation. The symmetry between extractor and emitter assured that the energy spectrum of the lost electrons was the same on both. The electrons' lost power was estimated as the product of 2.0 amperes times the average energy of the lost electrons, as measured on the extractor.

FIG. 10D shows the energy/position spectrum of electrons on the extractor. A single peak (1040) was observed, surrounded by white spaces. The vertical scale (1042) in the Figure measured the horizontal position of the peak in units of PIC cells. By the input assignments, cell number 35 (1044) marked the approximate center of the spatial extent of electrons hitting the extractor. The peak (1040) spanned 3 cells in x-position, consistent with its apparent width in FIG. 9A (919). White space above and below the peak (1040) indicated that no electrons escaped the extractor on either side. The extractor width had been assigned by input variable "extractorDiameter2" (536), chosen wide enough to assure that up-scattered electrons hit the extractor not the lower tank wall.

Returning to FIG. 10D, the lengths of the vertical lines inside the peak (1040) were proportional to the electron counts at equally spaced energy-divisions. The geometric centroid of the energy distribution was computed and marked by a vertical dashed line (1046) in the Figure. The dashed line (1046) intersects the energy axis (1048) at a scale value of 3.5 keV. This energy-value, 3.5 keV, was taken to represent the average energy of all lost electrons, including those lost on emitter and on tank walls, not shown. Multiplying this average energy, 3.5 keV, by the total injected electron current, 2.0 amperes, gave 7.0 kilowatts as the total lost-electrons' lost-power, according to the simulation.

This 7.0 kilowatts was the electrons' lost power in the entire cubic reactor. By placing the extractor and emitter in face cusps, electron losses were confined to the central slab only. This contrasted sharply to the losses in the First Embodiment, where the losses were mainly through corner cusps.

Corner cusps in the simulation expand to be line cusps in the actual 3D reactor. The electrons exiting the core through corner cusps in the simulation will fill "loss-planes" in 3D. These "loss planes" pass through the edges of the cube perpendicular to the central plane simulated. When translated from the 2D simulation to the 3D world of the actual reactor, the losses through the corners fill the entire 3D volume, not just lines along the axes of magnets.

Face cusps have a fundamentally different structure than corner cusps. Face cusps are called "point cusps" because the electron stream recirculates through a single geometric point on each face. The "point cusps" are located at the exact centers of the polygonal faces on which the magnets are mounted. In the case of the cubic reactor, the polygonal faces are squares. Other polyhedra would have a different number and different shaped faces. In these other polyhedra, the face cusps will still have the same "point-cusp" structure as for the square faces. In other shapes the face-cusp losses still intersect the polygonal-faces at the center-points of the faces. The advantages gained in the Second Embodiment, as described in this section and elsewhere in the Specification, apply to model reactors constructed using any shape of polyhedron, not just cubes.

The essential feature of the extractor and emitter was that they aligned with point cusps. This avoided most of the electron loses that formerly occurred on the tank through the corner cusps. Electron losses were confined to two selected point cusps, and therefore occurred in only a single slab of the 3D reactor. The 7.0 kilowatts estimated above was a good estimate of the electrons' power loss in the entire cubic reactor. There was no need to multiply this slab power-loss by the number of slabs, as was done in the First Embodiment.

Electron-extractor and electron-emitter could have been mounted on any other two face cusps or coaxingly on a single face cusp. Any number of such electrodes can be used, as many as there are faces in the polyhedron. In the case of the cube, there could be from one to six such electrodes. The design of this Embodiment covers any number of extractor-electrodes equal to or greater than one, as long as they are all mounted on face cusps only, not on corner cusps.

In the simulation, the electron losses occurred only in the central slab and only to two small electrodes. This was not the case for the ions. Ions were still lost mainly into the corners of the tank. To compute power balance and break-even size, it was necessary to include ion losses in the calculation of $P_{in}$, as will be discussed further in the next section.

Estimating the Ions' Contribution to Power Loss

FIGS. 10B, D, E, and F

FIG. 10B shows a wavy line (1022) graphing the ions' loss current on the tank, as a function of time. Except for the usual statistical variations, the current is seen to be constant in time, characteristic of steady-state. The line intersects the vertical axis at a point (1028) one small-division above zero. The vertical axis was calibrated in amperes. On this scale, one small-division equaled 0.008 amperes. The average lost ion current thus reads as 0.008 amperes. To compute the lost power loss in watts, the 0.008 amperes ion current was multiplied by the ion particles' average energy at the tank wall, expressed in electron-volts.

Returning attention to FIG. 10C, up-scattered ions reach the tank by starting with near-zero kinetic energy at the peaks of the potential (460 or 462). From there they fall down the outer flanks of the potential, impacting one of the tank walls with the kinetic energy they gained in the fall. The tank walls were, by design, held at zero voltage. The left tank wall is shown as the left axis (1032) in the Figure. By the time they hit this wall, the ions have gained kinetic energy equal to the potential energy they had when they started from the potential peak (460). Reading the voltage where the dashed line intersects the vertical axis (1032) shows the ions started with approximately 40 kilovolts of potential. Multiplying this voltage times the ions' lost current gave the ions' power drain; 0.008 amperes times 40 kilovolts is 320 watts. This number is the ions' power drain in the simulated central slab.

FIG. 8B showed that ion losses occurred mostly in the 4 corner cusps (812, 814). The dominance of the corner-cusp losses over face-cusp losses (813) will increase as the model reactor size grows toward break-even. Corner-cusp losses will be approximately the same in each of the slabs stacked up to make a cubic reactor. The number of slabs stacked to make a 3D reactor from a 2D simulation was the same here in the Second Embodiment as was found previously for the First Embodiment. Multiplying this number of slabs, 34, by the ion power loss to the central slab, 320 watts, yielded the estimate of 10.9 kilowatts for the ions' steady-state power-loss in the whole cube.

Calculating the Power Balance and Break-even Reactor Size

Second Embodiment

As disclosed so far, the Second Embodiment is characterized by an electron power-loss of 7.0 kilowatts and an ion power loss of 10.9 kilowatts. To these must be added the power lost to magnet heating. Magnet heating was the same as before, 6.0 kilowatts for the 6 magnets of the small-model cubic reactor. Adding the 3 contributions to $P_{in}$, the estimated power loss for a small-model D+D fueled reactor was 7.0+10.9+6.0=23.9 kilowatts. The power balance was computed as $Q_m = P_{out}/P_{in} = 1.65\text{e-}5$ watts divided by 23.9 kilowatts; $Q_m = 6.9\text{e-}10$.

The estimated magnet size of the break-even reactor was computed by the same formula as before, substituting only the new value of $Q_m$; $D_b = D_m/(Q_m)^{(1/s)} = 0.26$ m/$(6.9\text{e-}10)^{0.2} = 0.26$ m/$0.0147 = 18$ meters. This magnet size is significantly smaller than the 24-meter magnet diameter predicted for ITER. The main result of these disclosures is to specify a design that will produce a compact reactor to surpass the performance of other fusion reactor designs. In addition to its smaller size, the reactor designed according to the Second Embodiment can burn the advanced fuel, D+D, instead of ITER's troublesome tritium.

The power output of the break-even reactor was estimated by multiplying $P_{out}$ for the small-scale reactor by the 7th power of the ratio of magnet sizes between break-even and small-scale model. The size-ratio was 18 meters divided by 0.26 meters which equals 69. Raised to the 7th power, the power-ratio was $69^7$ which equals 7.6e12. Multiplying $P_{out}$ by this power-ratio and the Rankine-cycle efficiency ($\eta=0.4$) gave the break-even power output as 1.65e-5 watts times 7.6e12 times 0.4 which equals 50 megawatts electrical.

This power output may be more useful than the 500-megawatts-electrical output predicted for the comparable reactor of the First Embodiment. For any reactor design, the break-even power output is the minimum useful output of a reactor of that design. Due to the 7th power scaling in these Embodiments, vast increases in power outputs can be obtained by increasing the size beyond break-even. For example, to double the power output would only require increasing the magnet size by a factor of 1.1 [$=2^{(1/7)}$]. The 18 meter break-even size would need to only increase from 18 to 19.8 meters to double the power output.

Reactors built according to the embodiments of the invention are envisioned to fill the needs of a wide range of applications from small-scale to large-scale power plants. Planes and rockets can use reactors only slightly larger than break-even (18 m), producing net power around 100 megawatts. Towns and cities will need larger reactors. The 7th power scaling of the power output with size allows the embodiments to serve a wide range of power needs from 100 megawatts upward to 100 gigawatts or more. Only the scale of the reactor need be increased to vastly increase its power output. Building a reactor twice the size increases the power 128-times ($=2^7$). Multiplying the break-even reactor's 50 megawatts by this factor yields 6.4 gigawatts as the electrical-power output of a reactor twice as large as the 18 m break-even one.

Conclusions, Ramifications, and Scope

The reader accordingly will see that the fusion device of the inventive embodiments can be used to construct useful scale-model reactors. Building larger and larger scale-models will lead to development of economical net-power reactors. For the first time it is now possible to ionize and inject fuel ions into the core of an Inertial Electrostatic Confinement (IEC) reactor without consuming too much power in the process. Accurate and reliable computer simulations were disclosed to show that the size of a net-power, advanced-fuel reactor can be as small as 18 meters in diameter. The projected power output of an 18-meter reactor would be only 50 megawatts, making the design appropriate for a wide range of power-generating applications. These applications range from powering towns and cities to powering vehicles such as boats, planes, and spacecraft.

Advantages of the Embodiments

Many fuel choices are available. Deuterium, tritium, helium, boron, etc. can be burned.

Increasing the reactor size dramatically increases its power, up to hundreds of gigawatts.

Mechanical and electrical construction is simple, providing for easy maintenance.

Super-conducting magnets are optional, unlike ITER and tokamaks which require them.

Scope of the Embodiments

The basic design of the fusion device incorporates magnets mounted on all the faces of a predefined polyhedron. The magnets are all the same size and produce identical magnetic fields, all pointing inward toward the center of the polyhedron. This arrangement of magnetic fields creates a number of cusp-lines, one cusp-line down the bore of each magnet. Electrons circulate in and out of the reactor core along cusp-lines. Aligned with the central bores of some or all of the magnets are mounted gas-cells, electron-emitters, and optionally electron-extractors.

These useful apparatuses, gas-cell, e-emitter, and e-extractor, may each be duplicated on any or all of the polyhedron-face cusp-lines. Two or 3 types may even be mounted on a single cusp-line. Only the extractor is necessarily opaque to electrons. Emitters of filament design are largely transparent to electrons and so may be mounted co-linearly on a cusp-line with a gas-cell and extractor. The number of each of the 3 types of apparatus may vary from application to application. The principles of the design of the embodiments admit to various number and placement of the 3 types of mounted apparatus. Many such variations may prove useful and all such variations are claimed in this patent application.

A computer simulation was tailored to analyze a cubic reactor burning deuterium fuel. The cube is only one of the many polyhedra that could be chosen as the basic frame for mounting the magnets. Other polyhedra might be useful and might improve performance. For example, a reactor based on an icosahedron would have 20 magnets instead of six. The down-side of using more magnets is that extra input-power is required to power the magnets. Input-power is a factor in power balance. Increasing input-power would increase the size of the break-even reactor. Larger-sized reactors are more expensive to build and less efficient to operate.

On the other hand, the shape of the icosahedron is closer to the shape of a sphere than is the shape of the cube. A perfect sphere would have perfect convergence. It might turn out that the central-density convergence sought by Bussard will someday be found in the icosahedron. If convergence were obtained, it would raise the power output by raising the central ion density. The net effect of convergence would be to raise the power balance and thereby shrink the size of the break-even reactor, which would be a positive result. A more detailed computer analysis could answer the question of whether higher-order polyhedra might be better than the cube. The possibility of smaller reactor size makes the use of higher-order polyhedra a useful addition to these embodiments. The advantages of the disclosed ion-source and electron-extractor apply equally well to designs with higher-order polyhedra.

The operating point of the reactor was characterized by simulating fixed knob values in software. In an actual reactor the electron current, electron energy, gas pressure, and ion density can be simultaneously varied by a human operator turning knobs. The operator would naturally "tune" the knob values to increase the power-balance. This tuning might well be faster in hardware than in software. For the same reason, the graphic-equalizer on a stereo amplifier is better tuned using more than one knob at a time, so might the reactor be better tuned varying more than one knob at a time. It was not possible to explore every possible knob value in simulation. The computer took about 100 hours to try just one set of knob values. It is to be understood that tuning might improve power-balance over the performance presented in these disclosures. A complete range of possible knob values, as provided by all possible adjustments of the hardware components, are obvious variants of the specified embodiments and so are also claimed below.

The geometry of the model-reactor was set by making certain other choices in assigning the simulation variables. For example, the spacing of the magnets one from the other, the so called "gap width", was fixed by setting the variable "magCornerGap," as seen in FIG. 5A (525). Changing the value of this setting produced wide-ranging effects. The smaller the value, the stronger was the magnetic field in the corners between the magnets. Stronger field reduced the rate of electron leakage through the corners to the tank. But smaller "gap width" also caused more electrons to be lost by hitting the magnets. The ideal value for "gap width" might best be found by trial and error in hardware rather than running the simulation over and over. Other important variables' settings controlled the shape of the magnet coils. The coils in the simulation were taken from catalog specifications, approximately square in coil cross-section and round in plan-view.

Many shapes of magnets can be produced by standard manufacturing techniques. The coils are made by winding copper wire on a spool with an open central bore. The technique of winding can produce magnets with a variety of cross-sectional shapes and a variety of plan-view shapes with equal ease. For example, a square spool would produce magnets having square plan-view instead of the round plan-view as shown in FIG. 2. Square coils would produce an equally narrow gap along the sides of the square faces of a cubic reactor. A long thin gap would have reduced electron leakage to the tank but would also suffer more electrons' lost to hitting the magnets. Different choices of plan-view are exemplary of the flexibility of the design. Exercising this flexibility can improve the performance of the model-reactor. Improvement in performance from such changes in magnet-spacing and magnet-shape are anticipated as obvious extensions of these disclosures.

In addition to the shape of the coil winding spool, the cross-sectional shape of the coil may also be changed from what was simulated. FIG. 1A (410) shows an alternative chamfered coil shape, having a trapezoidal cross-section. A chamfered shape would allow magnets of a chosen outside-diameter to be mounted closer together, on a smaller polyhedron, thus increasing the corner magnetic-field and reducing corner particle-losses. The standard technique of building up a coil by winding many turns of copper wire on a spool can easily produce other cross-sectional shapes, not only the chamfered one shown in FIG. 1A. Different coil cross-sectional shapes may be combined with different coil plan-views, as described in the previous paragraph. These various shapes produce variants of the basic principles of the disclosed embodiments, and so are claimed.

In addition to magnets wound from copper wire, magnets may be wound from super-conducting wire or tape. Super-conducting magnet coils may have advantages over copper-wound coils. Super-conducting coils have much reduced electrical resistance and therefore reduced resistive heating compared to copper. In principle, this feature would allow the coils to be smaller and still produce the strong fields required for break-even. The principle of the embodiments described would be the same with super-conducting coils as with copper coils. Super-conducting coils must be maintained at cryogenic temperatures which would require additional thermal insulation to protect the coils from the heat radiating from the plasma. The extra engineering required to keep the magnets cold poses a potential draw-back to using super-conducting coils. Even so, the principles of the designs disclosed in these embodiments apply equally well with super-conducting coils. Whether they give a net advantage will depend on the cost and size of the additional hardware needed to keep the super-conducting magnets cold.

As described in the Specification, the vacuum tank had dual functions. It kept out the air and also functioned as a grounded electrode to accelerate electrons from the emitter. In an actual reactor, the grounded-electrode function might be provided by a separate Faraday cage disposed inside the vacuum tank and surrounding the magnets. Faraday cages are well-known devices for providing electrical shielding. In an actual reactor, a Faraday cage might have the same shape as the vacuum tank, or a different shape such as sphere or non-cubic polyhedron. One advantage provided by a Faraday cage would be to leave room outside the cage and inside the tank for mounting a spherical, direct-conversion energy-device such as disclosed in 2011-Greatbatch.

The use of Faraday cages of various shapes would be extensions of the embodiments described and obvious to one skilled in the art of electrode design. The terminology "vacuum tank" and "Faraday cage" should be considered interchangeable and identical terms for means providing the functions of the outer, grounded-electrode described in the Specification.

The next logical step in the time following this disclosure is to build and test one or more small-scale model reactors according to the disclosed embodiments. The measured power balance of such model reactors may well exceed the power balance predicted by the simulation disclosed herein. Diamagnetism is an important physical phenomena not yet included in the simulation. The true magnetic field at the surface of the plasma will be the sum of a field from the coil magnets plus an opposing field from the diamagnetism of the plasma. Diamagnetism is a well-known physics term for magnetic fields generated by internal currents in materials.

Due to diamagnetic effects, the size of the actual plasma cloud will turn out to be larger than the simulated size. Diamagnetic fields can be simulated, but such simulations were beyond the capability of the applicant's computer. Diamagnetic effects in a cubic reactor have been measured and reported recently in 2014-Park. Park's coils measured 14 cm outside-diameter compared to 26 cm outside-diameter for the small-scale coils of this Specification. Diamagnetic fields generally increase the size of the plasma cloud when adding to the applied magnetic field. This size increase is what Bussard called the "wiffle-ball effect."

With diamagnetic fields properly included, the simulated power output from the plasma would increase as the 3rd power of the size increase caused by diamagnetism. This would improve the predicted power balance and shrink the predicted break-even magnet size. The net effect of including diamagnetism in the model analysis would be to improve simulated performance of the subject embodiments. Omitting diamagnetism from the simulation, as disclosed herein, set a lower limit on the power balance of the small-scale model. The predicted performance of the embodiments is already an improvement over the prior art. Diamagnetism will make it more so.

Although the description above contains many specificities, these should not be construed as limiting the scope of the embodiments but as merely providing illustrations of some of the presently preferred embodiments. For example, the knob values controlling the reactor may be varied by a human operator; also magnet spacings and magnet currents may be changed to improve power balance.

Thus, the scope of the embodiments should be determined by the appended claims and their legal equivalents, rather than by the examples given.

I claim:

1. A fusion energy device comprising:
(a) a vacuum tank having an interior tank surface, an interior vacuum pressure, an exterior tank surface and an outside tank diameter, said vacuum pressure being generally predetermined from a range of 1 micro Torr to 0.1 Torr, and said outside tank diameter being generally predetermined from a range of 0.5 meters to 100 meters;
(b) a plurality of magnetic coils disposed to lie inside said interior tank surface, said magnetic coils having cross-sectional outlines selected from the group consisting of circle, ellipse, and polygon, said magnetic coils having plan-view outlines selected from the group consisting of circle, ellipse, and polygon, said magnetic coils having open bores passing respectively through said plan-view outlines, said plan-view outlines disposed to lie respectively parallel to the faces of a polyhedron, said polyhedron having a polyhedral center and plural surrounding polygonal faces, said polygonal faces having polygonal centers, said polygonal centers having a plurality of surrounding polygonal edges, said magnetic coils carrying electrical currents such that a plurality of magnetic field vectors are disposed to lie respectively at said polygonal centers, said magnetic field vectors having polarities and magnitudes, said polarities being oriented to point from said polygonal centers towards said polyhedral center, said magnitudes being generally predetermined from a range of 100 gauss to 100 kilogauss;
(c) a plurality of airtight containers respectively surrounding said magnetic coils, said airtight containers being approximately conformal to said cross-sectional outlines and approximately conformal to said plan-view outlines, said airtight containers being disposed to lie respectively on said polygonal faces, said airtight containers being spaced apart from said surrounding edges of said polygonal faces by spacing distances, said spacing distances being generally predetermined from a range of 1 millimeter to 1 meter;
(d) a plurality of hollow airtight legs, said legs having interiors, said legs having ends and opposite ends, said ends sealed to said interior tank surface, said opposite ends sealed to said metal containers, said legs urging said plurality of airtight containers respectively onto said plurality of polygonal-faces, said urging being against the force of gravity and against the force of magnetic pressure;
(e) at least one high-voltage-power-supply positioned outside said exterior tank surface and electrically connected to said airtight containers by a plurality of electrical wires, said wires passing through said interiors of said legs, said wires carrying voltages generally predetermined from a range of 1 kilovolt to 1 megavolt;
(f) one or more electron emitters, each of said electron emitters disposed in position at a predetermined emitter-inset-distance from said interior tank surface and disposed in orientation so as to emit electrons in a direction generally toward said polyhedron center, said emitter-inset-distance being generally in the range 1 millimeter to 1 meter;
(g) a plurality of recirculating electron beams, said beams being respectively disposed inside said open bores of said plurality of coils, said electron beams being comprised of electrons having energies generally in a range of 1 kilo-electron-volt to 1 mega-electron-volt;
(h) one or more gas-cells, each of said cells having a cell-inside and a cell-outside, each of said cells sealed and bounded by a pair of aperture plates disposed to lie perpendicular to a selected one of said electron beams and disposed to lie inside a corresponding one of said open bores, said pair of aperture plates being separated from each other by a distance predetermined and selected from the range 1 millimeter to 1 meter, said pair of aperture plates penetrated respectively by a pair of holes of predetermined diameters from the range 1 millimeter to 1 meter, said pair of holes disposed so that said electron beam passes freely through said pair of holes and also through said cell-inside, each of said cells containing a fuel gas, said gas having a gas-pressure, said gas-pressure being regulated by gas supplied through a gas delivery tube, said tube being connected from said cell-inside to said exterior tank surface;
(i) one or more vacuum pumps located outside said exterior tank surface and connected to said vacuum tank respectively though one or more pumping ports, so that said interior vacuum pressure is smaller than said gas-pressure, the ratio of said gas-pressure to said vacuum-pressure being generally in the range 2 to 10,000 and;
(j) one or more concentrically arranged pumped volumes surrounding at least one of said gas-cells, said pumped volumes being of progressively increasing size from an innermost volume to an outermost volume and having progressively decreasing internal gas pressures from said innermost volume to said outermost volume, and being respectively connected to a plurality of auxiliary vacuum pumps, and being respectively sealed and bounded by a plurality of pairs of auxiliary aperture plates aligned so as to pass said selected one of said electron beams through said one of said gas-cells;
whereby at least one internal fuel supply is provided such that a fusion reactor is fueled by ions created by electron beams' ionizing gas confined inside one or more gas-cells by multiple pairs of aperture plates containing small holes to let the electron beams pass freely through the gas while hindering the flow of neutral gas out through the holes.

2. The fusion energy device of claim 1 further including:
one or more electron-extractor electrodes, each of said electrodes including a thin plate of material chosen from the group metal and ceramic, said plate having a thickness generally in the range 1 mm to 1 cm, said late having a diameter generally, in the range 1 cm to 100 cm, said plate being rigidly mounted inside a selected one of said open bores, said plate having an inner face and an outer face, said inner face being disposed to lie facing said polyhedral center, said outer face being connected electrically and mechanically to said interior tank surface;

whereby a means is provided for selectively removing up-scattered electrons, thereby reducing the overall power lost to electrons, thereby increasing the power balance, and thereby reducing the projected break-even reactor size.

\* \* \* \* \*